US007751914B2

(12) United States Patent
Hashimoto et al.

(10) Patent No.: US 7,751,914 B2
(45) Date of Patent: *Jul. 6, 2010

(54) SIGNAL PROCESSING APPARATUS

(75) Inventors: Hiroyuki Hashimoto, Ibaraki (JP); Kenichi Terai, Shijonawate (JP); Isao Kakuhari, Ikoma (JP)

(73) Assignee: Panasonic Corporation, Osaka (JP)

( * ) Notice: Subject to any disclaimer, the term of this patent is extended or adjusted under 35 U.S.C. 154(b) by 1346 days.

This patent is subject to a terminal disclaimer.

(21) Appl. No.: 11/214,397

(22) Filed: Aug. 29, 2005

(65) Prior Publication Data

US 2006/0009986 A1 Jan. 12, 2006

Related U.S. Application Data

(62) Division of application No. 09/963,902, filed on Sep. 26, 2001, now Pat. No. 6,961,632.

(30) Foreign Application Priority Data

Sep. 26, 2000 (JP) ............................ 2000-293168
Sep. 14, 2001 (JP) ............................ 2001-280809

(51) Int. Cl.
*G06F 17/00* (2006.01)

(52) U.S. Cl. ........................................................ 700/94

(58) Field of Classification Search ....................... None
See application file for complete search history.

(56) References Cited

U.S. PATENT DOCUMENTS

| | | | |
|---|---|---|---|
| 6,108,584 | A | 8/2000 | Edwards |
| 6,782,535 | B1 | 8/2004 | Dal-Santo et al. |

FOREIGN PATENT DOCUMENTS

| | | |
|---|---|---|
| JP | 09-200897 | 7/1997 |
| JP | 11-055799 | 2/1999 |
| JP | 11-285099 | 10/1999 |

*Primary Examiner*—Andrew C Flanders
(74) *Attorney, Agent, or Firm*—Snell & Wilmer L.L.P.

(57) ABSTRACT

A signal processing apparatus includes an input attribute determination section for determining an input attribute representing at least one of a type of an audio codec, a sampling frequency and a number of channels of an input signal; and an input signal processing section for processing the input signal. The input signal processing section determines whether the input attribute has been changed based on a determination result provided by the input attribute determination section; and when a calculation remainder generated in the input signal processing section by the change in the input attribute, the input signal processing section assigns at least apart of the calculation remainder to processing of the input signal.

30 Claims, 38 Drawing Sheets

SIGNAL PROCESSING APPARATUS

CROSS-REFERENCE TO RELATED APPLICATIONS

This application is a Divisional Application of U.S. application Ser. No. 09/963,902 (filed Sep. 26, 2001) and entitled "SIGNAL PROCESSING APPARATUS", which application is incorporated herein by reference.

FIELD OF INVENTION

The present invention relates to a signal processing apparatus having a function of reproducing multiple-channel audio signals.

DESCRIPTION OF THE RELATED ART

Recently, multiple-channel audio signals represented by an audio codec such as Dolby AC-3 or DTS system are now handled by a reproduction apparatus such as a DVD (e.g., DVD-Video or DVD-Audio) apparatus. Reproduction of multiple-channel audio signals generally uses a plurality of speakers provided in front of or behind the listener. (One speaker is used for a signal of each channel.)

For example, FIG. 30 shows an exemplary arrangement of speakers for reproducing 5.1-channel audio signals in the case of the Dolby AC-3 or DTS system. As shown in FIG. 30, six speakers 5*a* through 5*f* are required.

In actuality, however, not all listeners can necessarily use six speakers (including amplifiers for driving the speakers) due to available space in their houses. Since conventional audio apparatuses such as CD apparatuses usually operate on a two-channel signal systems (left and right channels), most of the listeners are considered to be able to use two speakers. However, when multiple-channel signals are reproduced with two speakers, desired sound field effects are not obtained.

For example, it is possible that a listener who wants to enjoy sound from a DVD late at night cannot reproduce the sound at a high volume, considering that a high volume of sound will disturb the neighbors. This problem can be solved by using headphones, but desired sound field effects cannot be obtained since multiple-dhannel audio signals need to be reproduced using the two channels (left and right) of the headphones. There is another problem of the acoustic image being localized in the listener's head, which is specific to the headphones.

In order to solve these problems, various signal processing apparatuses for reproducing multiple-channel audio signals of, for example, the Dolby AC-3 and DTS systems using two speakers have been conceived and proposed.

FIG. 29 shows a conventional signal processing apparatus described in Japanese Laid-Open Publication No. 11-55799.

Hereinafter the conventional signal processing apparatus will be described with reference to the figures.

FIG. 29 is a block diagram of the conventional signal processing apparatus described in Japanese LaidOpen Publication No. 11-55799.

Referring to FIG. 29, reference numeral 2 represents a DVD player as a sound source, and reference numeral 3 represents a decoder for decoding a bit stream signal from the DVD player 2. Reference numerals 5*a* and 5*b* represent speakers for reproducing audio signals processed by sound image localization control through an amplifier (not shown). Reference numeral 6 represents headphones for reproducing audio signals processed by sound image localization control through an amplifier (not shown). Reference numeral 25*a* represents a first digital processing circuit, reference numeral 25*b* represents a second digital processing circuit, reference numerals 26*a* through 26*p* represent FIR filters, and reference numerals 27*a* through and 27*d* represent adders.

An operation of the signal processing apparatus shown in FIG. 29 will be described below.

A bit stream signal from the DVD player 2 is decoded by the decoder 3 into a woofer signal, a center signal, a front R signal, front L signal, a surround R signal, and a surround L signal, which are then input to the first digital processing circuit 25*a*. The first digital processing circuit 25*a* performs sound image localization control of each signal via the FIR filters 26*a* through 261. Here, it is controlled so that the sound reproduced using the speakers 5*a* and 5*b* sounds as if it was reproduced using six speakers 5*a* through 5*f* shown in FIG. 30.

As an example, the case where sound from the center speaker 5*c* (shown in FIG. 30) is reproduced will be described. Where the transfer function of the FIR filter 26*c* is X1 and the transfer function of the FIR filter 26*d* is X2, expression (1) is formed.

$$CR=SrrX1+SlrX2$$

$$CL=SrlX1+SllX2 \quad (1)$$

By finding X1 and X2 which fulfill the simultaneous equations in expression (1), the sound from the center speaker 5*c* (the speaker indicated by the dashed line in FIG. 29) can be reproduced using speakers 5*a* and 5*b*.

Namely, the transfer functions X1 and X2 of the FIR filters 26*c* and 26*d* can be found by expression (2).

$$X1=(SllCR-SlrCL)/(SrrSll-SrlSlr)$$

$$X2=(SrrCL-SrlCR)/(SrrSll-SrlSlr) \quad (2)$$

By performing the same processing for the signals of the other channels, it is controlled so that the sound reproduced using the speakers 5*a* and 5*b* sounds as if it was reproduced using six speakers 5*a* through 5*f* shown in FIG. 30.

Then, the output from the first digital signal processing circuit 25*a* is input to the second digital signal processing circuit 25*b*. Thus, sound image localization control is performed for the case of using the headphones 6. It is controlled so that the sound reproduced by the headphones 6 sounds as if it was reproduced using the speakers 5*a* and 5*b*.

Where the transfer function of the FIR filter 26*m* is Y1, the transfer function of the FIR filter 26*n* is Y2, the transfer function of the FIR filter 26*o* is Y3, and the transfer function of the FIR filter 26*p* is Y4, expression (3) is formed.

$$Srr=HrrY1$$

$$Srl=HllY2$$

$$Slr=HrrY3$$

$$Sll=HllY4 \quad (3)$$

In expression (3), Hrr is the transfer function from the right speaker of the headphones 6 to the right ear of the listener, and Hll is the transfer function from the left speaker of the headphones 6 to the left ear of the listener. By finding Y1, Y2, Y3 and Y4 which fulfill the equations of expression (3), the sound from the speakers 5*a* and 5*b* can be reproduced using the headphones 6.

Namely, the transfer functions Y1, Y2, Y3 and Y4 of the FIR filters 26*m* through 26*p* can be found by expression (4).

$$Y1=Srr/Hrr$$

$$Y2=Srl/Hll$$

$$Y3=Slr/Hrr$$

$$Y4=Sll/Hll \quad (4)$$

Hereinafter, another conventional signal processing apparatus will be described.

FIG. 31 is a block diagram of another conventional signal processing apparatus.

Referring to FIG. 31, reference numeral 2 represents a DVD player as a sound source, and reference numeral 3 represents a decoder for decoding a bit stream signal from the DVD player 2. Reference numeral 4 represents a DSP for performing sound image localization control. Reference numerals 5*a* and 5*b* represent speakers for reproducing audio signals processed by sound image localization control performed by the DSP 4 through an amplifier (not shown). Reference numeral 6 represents headphones for reproducing audio signals processed by sound image localization control performed by the DSP 4 through an amplifier (not shown). Reference numeral 7 represents a transfer function correction circuit implemented by a program executed by the DSP 4. Reference numerals 9*a* through 9*l* represent FIR filters included in the transfer function correction circuit 7. Reference numerals 11*a* and 11*b* represent adders implemented by a program executed by the DSP 4. Reference numerals 12*a* and 12*b* represent subtractors implemented by a program executed by the DSP 4. Reference numerals 13*a* and 13*b* represent crosstalk cancel circuits implemented by software of the DSP 4.

An operation of the signal processing apparatus shown in FIG. 31 will be described below.

A bit stream signal from the DVD player 2 is decoded by the decoder 3 into a woofer signal, a center signal, a front R signal, front L signal, a surround R signal, and a surround L signal, which are then input to the DSP 4. The DSP 4 performs sound image localization control of each signal by the transfer function correction circuit 7. The output signal from the transfer function correction circuit 7 is divided into two channels by the adders lla and lia and then output to the headphones 6 or the speakers 5*a* and 5*b*. When the speakers 5*a* and 5*b* are used, the crosstalk cancel circuits 13*a* and 13*b* and the subtractors 12*a* and 12*b* act to remove the influence of crosstalk transfer functions Srl and Slr from the speakers 5*a* and 5*b* to the left and right ears of the listener.

The transfer function correction circuit 7 performs sound image localization control of the signal of each channel in the case when the speakers 5*a* and 5*b* or the headphones 6 is used. Specifically, the signal of each channel is convoluted with the coefficient which represents each transfer function by each of the FIR filters 9*a* through 9*l*.

As an example, the case where sound from the center speaker 5*o* (shown in FIG. 30) is reproduced using the speakers 5*a* and 5*b* will be described. In the following description, the transfer function of the FIR filter 9*c* is X1 and the transfer function of the FIR filter 9*d* is X2.

The crosstalk cancel circuits 13*a* and 13*b* act as follows. The output from the crosstalk cancel circuits 13*b* is subtracted from the output from the adder 11*a*, and thus the crosstalk transfer function Srl from the right speaker 5*a* to the left ear of the listener is counteracted. The output from the crosstalk cancel circuits 13*a* is subtracted from the output from the adder 11*b*, and thus the crosstalk transfer function Slr from the left speaker 5*b* to the right ear of the listener is counteracted. Due to such an action of the crosstalk cancel circuits 13*a* and 13*b*, expression (5) is formed.

Transfer function of crosstalk cancel circuit 13*a*=$Srl/Sll$

Transfer function of crosstalk cancel circuit 13*b*=$Slr/Srr$ expression (5)

$$CR=Srr\{X1-(Slr/Srr)X2\}+Slr\{X2-(Srl/Sll)X1\}$$

$$CL=Srl\{X1-(Slr/Srr)X2\}+Sll\{X2-(Srl/Sll)X1\} \quad \text{expression (6)}$$

By finding X1 and X2 which fulfill expression (6), the sound from the center speaker 5*c* (the speaker indicated by the dashed line in FIG. 31) can be reproduced using speakers 5*a* and 5*b*.

Namely, the transfer functions X1 and X2 of the FIR filters 9*c* and 9*d* can be found by expression (7).

$$X1=SllCR/(SrrSll-SlrSlr)$$

$$X2=SrrCL/(SrrSll-SrlSlr) \quad (7)$$

By performing the same processing for the signals of the other channels, it is controlled so that the sound reproduced using the speakers 5*a* and 5*b* sounds as if it was reproduced using six speakers 5*a* through 5*f* shown in FIG. 30.

Hereinafter, the case where the sound from the center speaker 5*c* is reproduced using the headphones 6 will be described.

Where the transfer function of the FIR filter 9*c* is X1 and the transfer function of the FIR filter 9*d* is X2, expression (8) is formed.

$$CR=HrrX1$$

$$CL=HllX2 \quad (8)$$

In expression (8), Hrr is the transfer function from the right speaker of the headphones 6 to the right ear of the listener, and Hll is the transfer function from the left speaker of the headphones 6 to the left ear of the listener. By finding X1 and X2 which fulfill the equations of expression (8), the sound from the speaker 5*c* can be reproduced using the headphones 6.

Namely, the transfer functions X1 and X2 of the FIR filters 9*c* and 9*d* can be found by expression (9).

$$X1=CR/Hrr$$

$$X2=CL/Hll \quad (9)$$

By performing the same processing for the signals of the other channels, it is controlled so that the sound reproduced using the headphones 6 sounds as if it was reproduced using six speakers 5*a* through 5*f* shown in FIG. 30.

As can be appreciated from the above description, in this conventional example, the coefficients of the FIR filters 9*a* through 9*l* need to be changed in the case where speakers 5*a* and 5*b* are used from in the case where the headphones 6 are used.

In this conventional example, it is intended that the transfer function including reflection is realized by the FIR filters 9*a* through 9*l*. Therefore, the number of taps of each of the FIR filters 9*a* through 9*l* needs to be sufficient to fully simulate the impulse response of the room to be mimicked. FIGS. 32 and 33 show the coefficients when the number of taps is 1024. (In FIG. 31, the number (1024) provided regarding the FIR filters 9*a* through 9*l* represent the number of taps.) FIG. 33 shows the coefficients by expanding the curve in FIG. 32 in the direction of the level so that the reflection component is more clearly shown. Since the sampling frequency is 48 kHz, the time length of 1024 taps is about 21 msec. This is converted into a distance of about 6 m. This approximately corresponds to a 8-"tatami mat" listening room, in which the primary reflection is barely accommodated. Higher-order reflection such as a reverberation component cannot be reproduced at all. In a larger room, even the primary reflection is not accommodated, and a larger number of taps are necessary. In accordance with this, the calculation amount and the memory capacity are increased.

Hereinafter, still another conventional signal processing apparatus will be described.

FIG. 34 is a block diagram of still another conventional signal processing apparatus.

Referring to FIG. 34, reference numeral 2 represents a DVD player as a sound source, and reference numeral 3 represents a decoder for decoding a bit stream signal from the DVD player 2. Reference numeral 4 represents a DSP for performing sound image localization control. Reference numerals 5*a* and 5*b* represent speakers for reproducing audio signals processed by sound image localization control performed by the DSP 4 through an amplifier (not shown). Reference numeral 6 represents headphones for reproducing audio signals processed by sound image localization control performed by the DSP 4 through an amplifier (not shown). Reference numeral 7 represents a transfer function correction circuit implemented by a program executed by the DSP 4. Reference numeral 8 represents a reflection circuit implemented by a program executed by the DSP 4. Reference numerals 9*a* through 9*l* represent FIR filters included in the transfer function correction circuit 7. Reference numerals 10*a* through 10*l* represent delay lines included in the reflection circuit 8. Reference numerals 11*a* and 11*b* represent adders implemented by a program executed by the DSP 4. Reference numerals 12*a* and 12*b* represent subtractors implemented by a program executed by the DSP 4. Reference numerals 13*a* and 13*b* represent crosstalk cancel circuits implemented by software of the DSP 4.

The signal processing apparatus shown in FIG. 34 includes the reflection circuit 8 connected in series to the transfer function correction circuit 7, in addition to the structure of the signal processing apparatus shown in FIG. 31. The number of taps of each of the FIR filters 9*a* through 9*l* included in the transfer function correction circuit 7 is smaller than that of the signal processing apparatus shown in FIG. 31 (i.e., 128 taps). That is, the transfer function correction circuit 7 and the reflection circuit 8 in FIG. 34 are intended to realize a transfer function which is equivalent to the transfer function of the transfer function correction circuit 7 shown in FIG. 31.

FIG. 35 shows an internal structure of each of the delay lines 10*a* through 10*l* included in the reflection circuit 8.

Referring to FIG. 35, reference numerals 14*a* through 14N represent N number of delay devices, reference numerals 15*a* through 15N represent N number of level adjusters, reference numerals 16*a* through 16N represent N number of frequency characteristic adjustment devices, and reference numerals 17*a* through 17N represent N number of adders.

A signal input to each of the delay lines 10*a* through 10*l* is output through the adders 17*a* through 17N without being processed. The signal is also processed as follows. The signal is provided with a predetermined delay time by each of the delay devices 14*a* through 14N, and the outputs from the delay devices 14*a* through 14N are level-adjusted by the respective level adjusters 15*a* through 15N. The output from the level adjusters 15*a* through 15N are frequency-adjusted as predetermined by the respective frequency characteristic adjustment devices 16*a* through 16N. The frequency adjustment is, for example, to vary the level of a component of a certain frequency band or to perform low pass filtering. Then, the outputs from the frequency characteristic adjustment devices 16*a* through 16N are added, by the adders 17*a* through 17N, together and with the signal component which has been input to each of the delay lines 10*a* through 10*l* but which has not been processed. In other words, the delay lines 10*a* through 10*l* each add a direct sound component as an input signal (i.e., an output signal from the respective one of the FIR filters 9*a* through 9*l*) and N number of independent reflection components processed by the delay devices 14*a* through 14N, the level adjusters 15*a* through 15N, the frequency characteristic adjustment devices 16*a* through 16N and the adders 17*a* through 17N.

Accordingly, signals other than the direct sound component, i.e., components from a front portion of the impulse response (a primary reflection obtained by the floor is located at a relatively front portion) to a rear portion (reverberation component or the like) are realized by the reflection circuit 8. In other words, the reflection circuit 8 simulates the impulse response of the listening room to be mimicked. Therefore, the number of taps of each of the FIR filters 9*a* through 9*l* can be reduced. The reason for this is because the FIR filters 9*a* through 9*l* need to only reproduce the direct sound component instead of the impulse response of the entire listening room, as opposed to the case of FIG. 31 in which the FIR filters 9*a* through 9*l* need to reproduce the impulse response of the entire listening room. The measurement of the direct sound component in the case of FIG. 34 may be performed in an anechoic chamber. FIG. 36 shows the coefficients measured in an anechoic chamber when the number of taps is 128 (In FIG. 34, the number (128) provided regarding the FIR filters 9*a* through 9*l* represent the number of taps.)

The calculation time of the delay lines 10*a* through 10*l* can usually be suppressed to be shorter than the calculation time of the FIR filters, which have a large number of taps. Hence, the structure in FIG. 34 can reduce the calculation time as compared to the structure in FIG. 31.

As described above, the structure shown in FIG. 34 provides approximately the same level of sound image localization control effect as that of the structure shown in FIG. 31.

The conventional structures shown in FIGS. 29, 31 and 34, however, have the following problems.

In the conventional structures shown in FIG. 29, the first digital processing circuit 25*a* performs virtual sound image localization control of multiple-channel signals for the speakers 5*a* and 5*b*, and the second digital processing circuit 25*b* performs virtual sound image localization control of the signals reproduced by the speakers 5*a* and 5*b* for the headphones 6. Accordingly, the audio signals twice processed with virtual sound image localization control are obtained through the headphones 6. Usually, even when the virtual sound image localization control is performed once, it is difficult to perfectly reproduce the sound produced by, for example, the speakers 5*a* and 5*b* in FIG. 30 located in a certain room due to individual differences, dispersion in the speaker or headphone characteristics, processing precision errors (e.g., precision of the FIR filter coefficients) and the like. Thus, even the sound image localization of the output signal from the first digital processing circuit 25*a* is not as precise as desired. When the sound image localization is performed again by the second digital processing circuit 25*b*, the effect is further deteriorated to the level of being useless.

The conventional signal processing apparatus shown in FIG. 29 assumes only a multiple-channel signal source of six channels or 4 channels (for example, a DVD player). Structures for performing sound image localization control of a conventional stereo sound-source such as a CD player are not described. Even if the structure shown in FIG. 29 is used for the stereo sound source, it is merely that the signals other than the front L signal and the front R signal are not input. Use of the calculation amount and the memory capacity which were required for the center signal and the surround signals in order to improve the processing precision of the front L signal and the front R signal is not described. The DVD Standards include PCM 2-ch mode in addition to the multiple-channel mode, in which case a similar problem occurs.

In other words, the structure shown in FIG. 29 cannot be used for effectively utilizing a limited calculation amount in accordance with the number of input channels.

In the structures shown in FIGS. 31 and 34, virtual sound image localization is performed once by the transfer function correction circuit 7. Like the structure in FIG. 29, the structures shown in FIGS. 31 and 34 are not for effectively utilizing a limited calculation amount in accordance with the number of input channels.

SUMMARY OF THE INVENTION

A signal processing apparatus according to the present invention includes an input attribute determination section for determining an input attribute representing at least one of a type of an audio codec, a sampling frequency and a number of channels of an input signal; and an input signal processing section for processing the input signal. The input signal processing section determines whether the input attribute has been changed based on a determination result provided by the input attribute determination section; and when a calculation remainder is generated in the input signal processing section by the change in the input attribute, the input signal processing section assigns at least a part of the calculation remainder to processing of the input signal.

In one embodiment of the invention, when the input attribute is changed so as to reduce the sampling frequency of the input signal, the input signal processing section assigns at least a part of the calculation remainder generated by the reduction in the sampling frequency to the processing of the input signal.

In one embodiment of the invention, when the input attribute is changed so as to reduce the number of channels of the input signal, the input signal processing section assigns at least a part of the calculation remainder generated by the reduction in the number of channels to the processing of the input signal.

In one embodiment of the invention, when the input attribute is changed so as to reduce a calculation amount based on the audio codec of the input signal, the input signal processing section assigns at least a part of the calculation remainder generated by the reduction in the calculation amount to the processing of the input signal.

In one embodiment of the invention, where a maximum sampling frequency is fs, the input signal processing section controls the processing of the input signal so that a calculation time of the input signal is 1/fs or more regardless of a change in the sampling frequency.

In one embodiment of the invention, where a maximum number of input channels is Nmax and a total calculation amount of the input signal processing section when the number of input channels is maximum is Cmax, the input signal processing section controls the processing of the input signal so that the total calculation amount of the input signal is $Cmax \cdot Nx/Nmax$ or more when the number of input channels is Nx, where Nx is an arbitrary integer in the range of 1 through Nmax.

In one embodiment of the invention, the input signal processing section controls the processing of the input signal so that a total calculation amount of the input signal processing section is substantially constant regardless of the change in the input attribute.

In one embodiment of the invention, the input signal processing section includes a plurality of programs executed by a digital signal processor or a microprocessor unit, and the input signal processing section controls a calculation amount thereof by switching the plurality of programs in accordance with the determination result provided by the input attribute determination section.

In one embodiment of the invention, when the input attribute is changed, the input signal processing section initializes one of the plurality of programs in use.

In one embodiment of the invention, input attribute information representing the input attribute is recorded on a recording medium. The input attribute determination section determines the input attribute based on the input attribute information recorded on the recording medium.

In one embodiment of the invention, the input attribute determination section receives an attribute signal which is output from a decoder for generating an audio signal, and determines the input attribute based on the attribute signal.

In one embodiment of the invention, the input attribute determination section includes a decoder for receiving a bit stream signal from a sound source as an input signal and generating an audio signal by decoding the bit stream signal. The decoder determines the input attribute during decoding of the bit stream signal.

In one embodiment of the invention, the input attribute determination section includes an input determination circuit for receiving a plurality of audio signals as the input signal and determining the input attribute by detecting a level of each of the plurality of audio signals.

In one embodiment of the invention, the input attribute determination section includes an attribute input circuit for allowing a user to input, to the signal processing apparatus, input attribute information representing the input attribute. The attribute input circuit determines the input attribute based on the input attribute information.

In one embodiment of the invention, the input signal processing section includes a transfer function correction circuit for mainly reproducing an acoustic characteristic of a direct sound component from a plurality of virtual speakers provided at predetermined positions to each of the ears of the listener, and a reflection circuit for mainly reproducing an acoustic characteristic of a reflection component from the plurality of virtual speakers to each of the ears of the listener.

In one embodiment of the invention, the input signal processing section adds an output from the transfer function correction circuit and an output from the reflection circuit to generate an addition signal, and inputs the addition signal to two speakers or headphones, to perform sound image localization control so that an acoustic characteristic of a sound reproduced by the two speakers or the headphones is substantially equal to an acoustic characteristic of a sound reproduced by the plurality of virtual speakers.

In one embodiment of the invention, the input signal processing section inputs an output from the transfer function correction circuit to the reflection circuit and inputs an output from the reflection circuit to two speakers or headphones, to perform sound image localization control so that an acoustic characteristic of a sound reproduced by the two speakers or the headphones is substantially equal to an acoustic characteristic of a sound reproduced by the plurality of virtual speakers.

In one embodiment of the invention, the transfer function correction circuit includes a plurality of digital filters. The input signal processing section controls the processing of the input signal by adjusting a number of taps of at least one of the plurality of digital filters in accordance with the change in the input attribute.

In one embodiment of the invention, the reflection circuit includes a plurality of delay devices and a plurality of level adjusters which are respectively connected in series to the plurality of delay devices. The input signal processing section controls the processing of the input signal by adjusting a number of the plurality of delay devices and a number of the plurality of level adjusters in accordance with the change in the input attribute.

In one embodiment of the invention, when the input signal is two channel audio signals including a front L signal and a front R signal, the input signal processing section adds the front L signal and the front R signal and adjusts the level of the resultant signal to generate a center signal, and performs sound image localization control of the center signal.

In one embodiment of the invention, when the input signal is two channel audio signals including a front L signal and a front R signal, the input signal processing section obtains a difference between the front L signal and the front R signal to generate a surround signal, and performs sound image localization control of the surround signal.

In one embodiment of the invention, when the input signal is 5.1-channel or 5-channel audio signals including a surround L signal and a surround R signal, the input signal processing section adds the surround L signal and the surround R signal and adjusts the level of the resultant signal to generate a surround back signal, and performs sound image localization control of the surround back signal.

Thus, the invention described herein makes possible the advantages of providing a signal processing apparatus which effectively utilizes a limited calculation amount in accordance with the number of input channels from a multiple-channel sound source, the audio codec, or the sampling frequency. According to a signal processing apparatus of the present invention, the calculation amount of the maximum number or less of input channels is matched to the calculation amount of the maximum conceivable number of input channels. Or, the total calculation amount is matched to the calculation amount of the maximum sampling frequency. Thus, the calculation precision is improved, or the effects of sound image localization are enhanced.

These and other advantages of the present invention will become apparent to those skilled in the art upon reading and understanding the following detailed description with reference to the accompanying figures.

DESCRIPTION OF THE PREFERRED EMBODIMENTS

Hereinafter, the present invention will be described by way of illustrative examples with reference to the accompanying drawings.

Example 1

Figure 1:
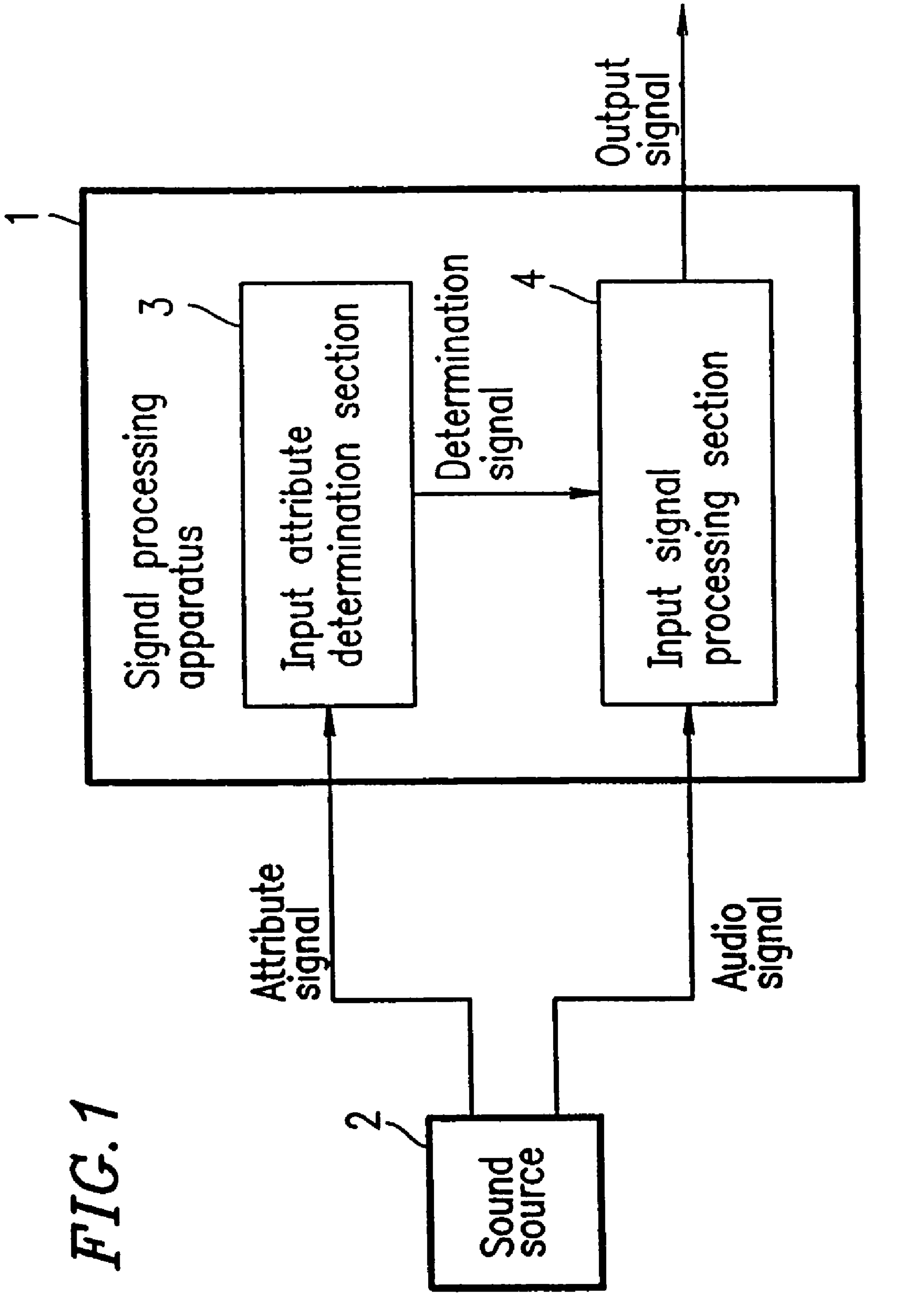
FIG. 1 is a block diagram illustrating an exemplary schematic structure of a signal processing apparatus 1 according to a first example of the present invention.

FIG. 1 shows one exemplary schematic structure of a signal processing apparatus 1 according to a first example of the present invention.

The signal processing apparatus 1 includes an input attribute determination section 3 for determining an input attribute of an input signal, and an input signal processing section 4 for processing the input signal.

A sound source 2 outputs an attribute signal representing an input attribute of an input signal to the input attribute determination section 3, and outputs an audio signal to the input signal processing section 4. The sound source 2 is a device for, for example, processing voice and video data. Alternatively, the sound source 2 may be a device for processing both the voice and video data and information.

The input attribute determination section 3 receives the attribute signal from the sound source 2 and determines the input attribute of the input signal based on the attribute signal. The determination result provided by the input attribute determination section 3 is output to the input signal processing-section 4 in the form of a determination signal. Herein, the input attribute of an input signal is defined to refer to one of a type of an audio codec of the input signal, a sampling frequency, or a number of channels. Known audio codecs include, for example, AC-3 and DTS systems which are representative compression systems of audio data and linear PCM.

The input signal processing section 4 receives the audio signal from the sound source 2 as the input signal, and receives the determination signal from the input attribute determination section 3. Based on the determination signal, the input signal processing section 4 processes the audio signal. The audio signal processed by the input signal processing section 4 is output from the input signal processing section 4 as an output signal.

Figure 2:
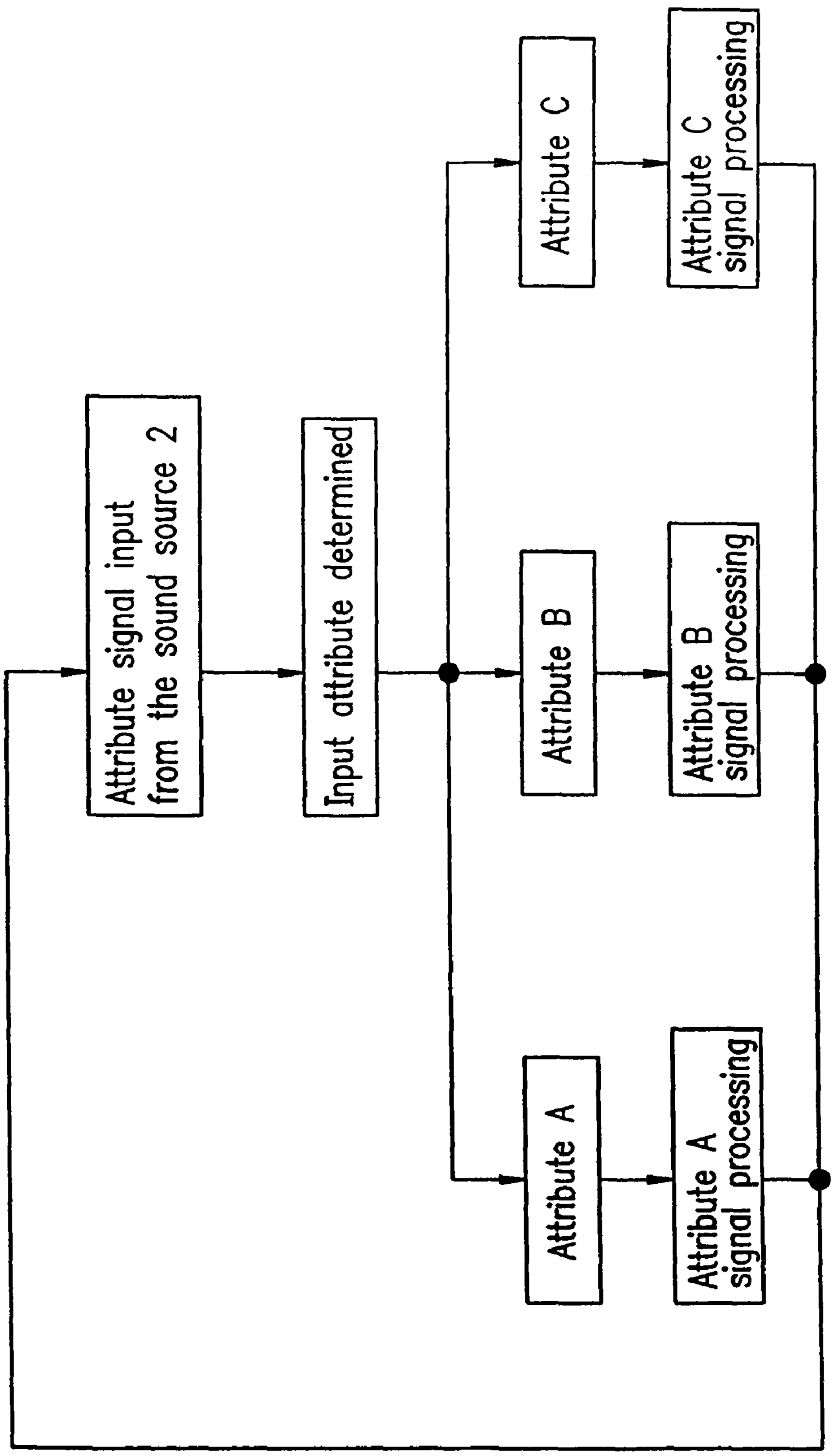
FIG. 2 is a flowchart illustrating an exemplary operation of the signal processing apparatus 1.

FIG. 2 is a flowchart illustrating an exemplary operation of the signal processing apparatus 1. As shown in FIG. 2, the signal processing apparatus 1 receives the attribute signal from the sound source 2, and determines the input attribute of the input signal. Then, based on the determination result, the signal processing apparatus 1 selects an appropriate type of processing to be performed for the input signal. Namely, when the input attribute of the input signal is attribute A, the input signal the signal processing apparatus 1 performs "attribute A signal processing". When the input attribute of the input signal is attribute B, the input signal the signal processing apparatus 1 performs "attribute B signal processing". When the input attribute of the input signal is attribute C, the input signal the signal processing apparatus 1 performs "attribute C signal processing".

The signal processing for each input attribute is performed so that the contents of the signal processing is changed in accordance with the type of input attribute but the total calculation amount of the signal processing is substantially constant. For example, when one input attribute has a smaller number of channels, the calculation amount assigned per channel can be increased. In this manner, the effect of signal processing can be improved or additional functions other than signal processing, which was originally to be provided, can also be provided.

When input attribute information representing the input attribute is recorded in a recording medium, the sound source 2 reproduces the recorded input attribute information so as to output an attribute signal based on the input attribute information. Alternatively, when the sound source 2 includes a built-in decoder for generating an audio signal, the decoder may output the attribute signal to the input attribute determination section 3.

Figure 3:
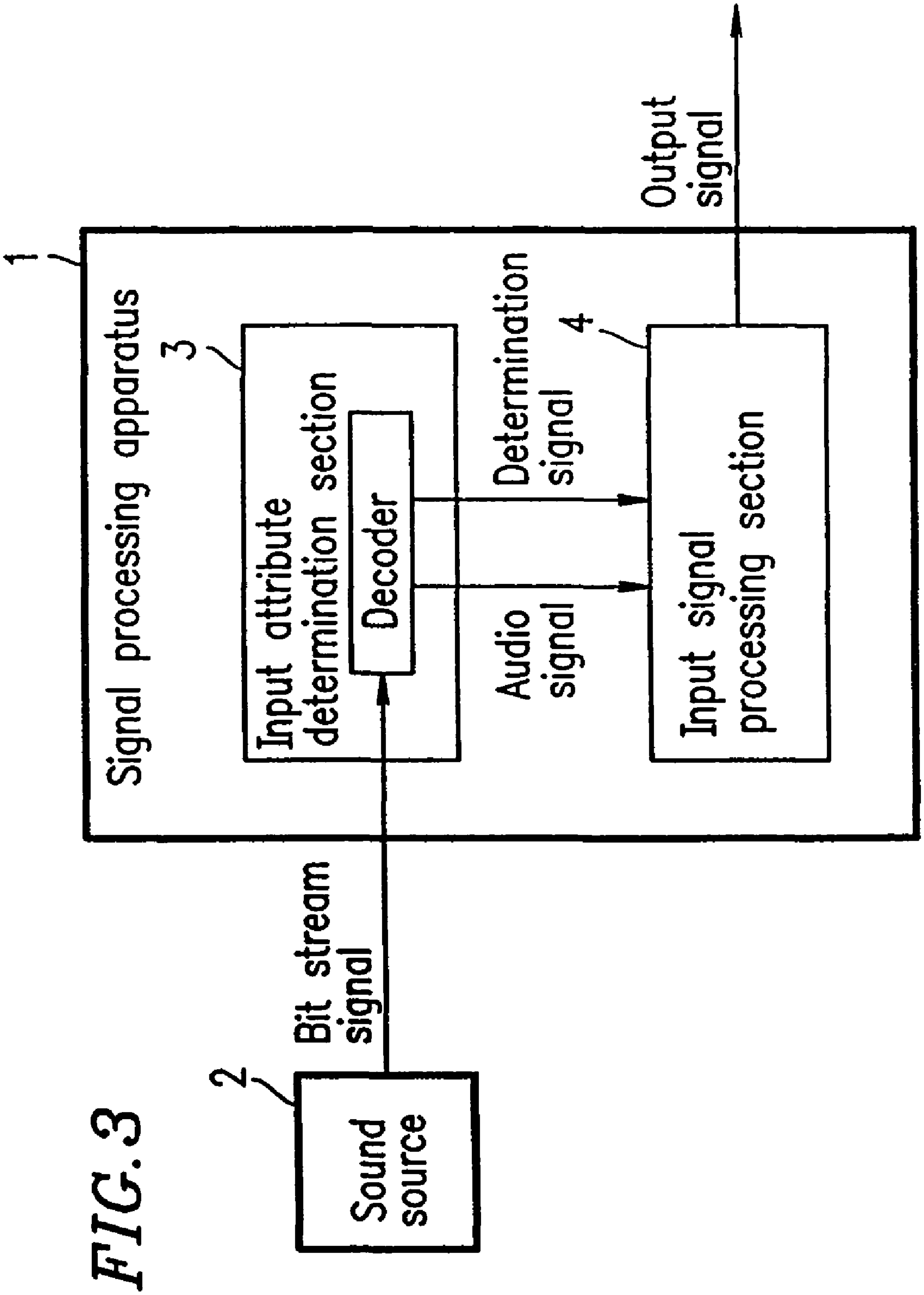
FIG. 3 is a block diagram illustrating another exemplary schematic structure of a signal processing apparatus 1 according to a first example of the present invention.

FIG. 3 shows another exemplary schematic structure of a signal processing apparatus 1 according to the first example of the present invention.

The signal processing apparatus 1 includes an input attribute determination section 3 for determining an input attribute of an input signal, and an input signal processing section 4 for processing the input signal.

A sound source 2 outputs a bit stream signal to the input attribute determination section 3.

The input attribute determination section 3 includes a decoder for receiving the bit stream signal as an input signal and decoding the bit stream signal to generate an audio signal. The audio signal is output to the input signal processing section 4. The decoder determines the input attribute of the input signal during decoding of the bit stream signal. The determination result provided by the decoder is output from the input signal processing section 4 as an output signal.

The input signal processing section 4 receives the audio signal and the determination signal from the input attribute determination section 3 and processes the audio signal based on the determination signal. The audio signal processed by the input signal processing section 4 is output from the input signal processing section 4 as an output signal.

As described above, the signal processing apparatus 1 shown in FIG. 3 determines the input attribute of the input signal during decoding of the input signal, and selects an appropriate type of signal processing to be performed for the input signal based on the determination result. Such a selection of the type of signal processing provides the same effects as those of the signal processing apparatus 1 shown in FIG. 1.

In FIGS. 1 and 3, the "audio signal" is represented by one arrow, but the arrow does not necessarily mean an audio signal of one channel. The arrow may mean multiple-channel audio signals.

Similarly, in FIGS. 1 and 3, the "output signal" is represented by one arrow, but the arrow does not necessarily mean an output signal of one channel. The arrow may mean multiple-channel output signals.

Hereinafter, the structure and operation of the signal processing apparatus 1 will be described in more detail using sound image localization control as an exemplary signal processing process performed by the signal processing apparatus 1.

Figure 4:
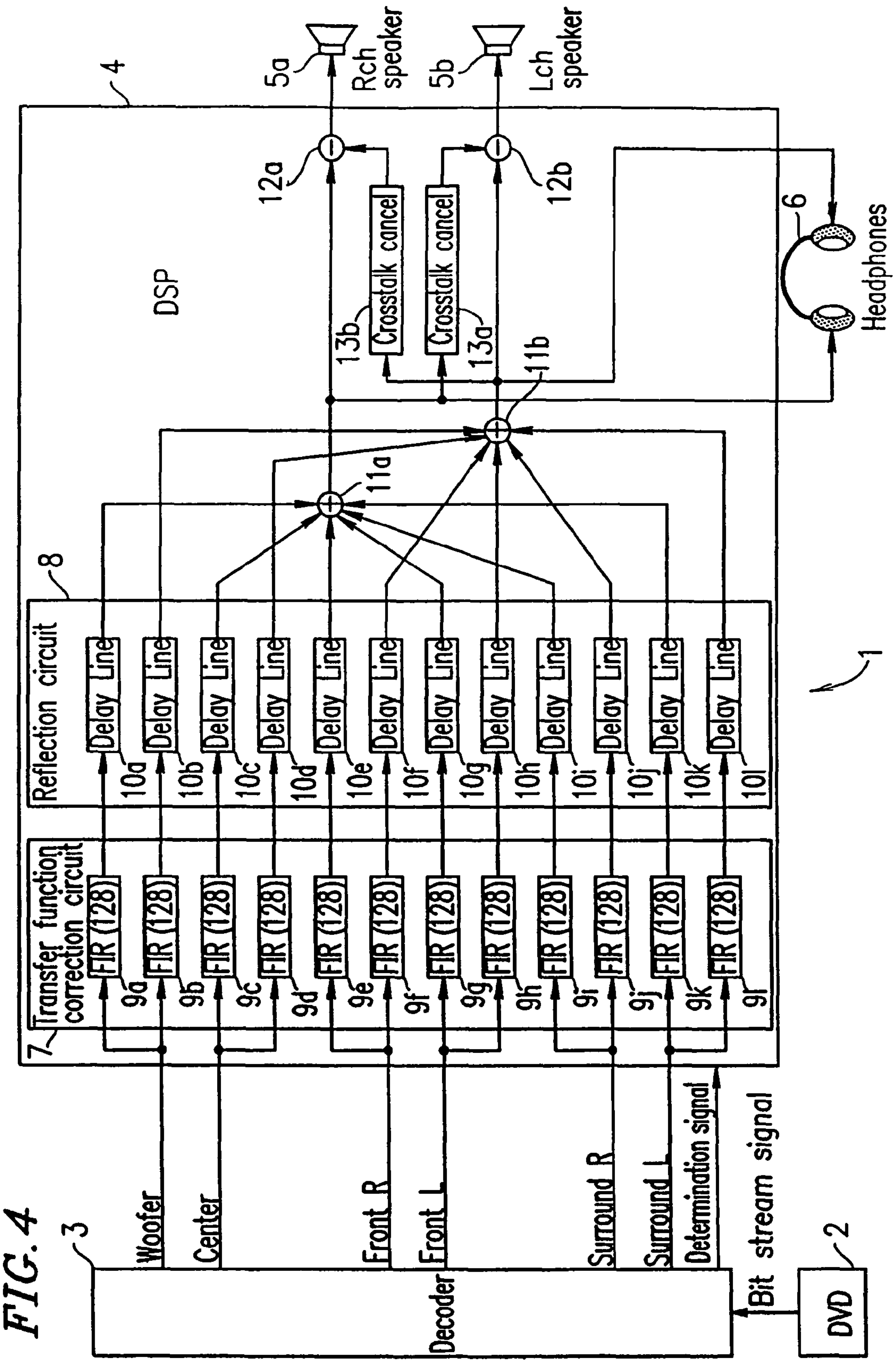
FIG. 4 is a block diagram illustrating an exemplary detailed structure of the signal processing apparatus 1 shown in FIG. 3.

FIG. 4 shows an exemplary detailed structure of the signal processing apparatus 1 shown in FIG. 3.

The signal processing apparatus 1 includes a decoder acting as the input attribute determination section 3 and a DSP (digital signal processor) acting as the input signal processing section 4. Instead of the DSP, an MPU (microprocessor unit) may be used.

The decoder 3 receives a bit stream signal from a DVD player acting as the sound source 2 as an input signal and decodes the bit stream signal to generate multiple channel audio signals (a woofer signal, a center signal, a front R signal, a front L signal, a surround R signal and a surround L signal) and a determination signal. The determination signal represents the determination result of the input attribute of the input signal.

The DSP 4 performs sound image localization control so that an acoustic characteristic of a sound reproduced by speakers 5*a* and 5*b* or by headphones 6 is substantially equal to an acoustic characteristic of a sound reproduced by a plurality of virtual speakers set at predetermined positions. The DSP 4 includes a transfer function correction circuit 7 for mainly reproducing acoustic characteristics of direct sound components from the plurality of virtual speakers set at the predetermined positions to the ears of the listener, and a reflection circuit 8 for mainly reproducing acoustic characteristics of reflection components from the plurality of virtual speakers set at the predetermined positions to the ears of the listener.

The transfer function correction circuit 7 includes FIR filters 9*a* through 9*l*. The transfer function correction circuit 7 performs predetermined processing of multiple-channel audio signals which are output from the decoder 3 and outputs output signals representing the processing results to the reflection circuit 8.

The reflection circuit 8 includes delay lines 10*a* through 10*l*. The reflection circuit 8 performs predetermined processing on the output signals from the transfer function correction circuit 7 and outputs output signals representing the processing results.

An adder 11*a* adds a part of the output signals from the reflection circuit 8 and outputs the resultant addition signal to the speaker 5*a* or the headphones 6.

An adder 11*b* adds a part of the output signals from the reflection circuit 8 and outputs the resultant addition signal to the speaker 5*b* or the headphones 6.

Subtractors 12*a* and 12*b* and crosstalk cancel circuits 13*a* and 13*b* have functions described above with reference to FIG. 34.

An amplifier used for reproducing the sound using the speakers 5*a* and 5*b* and the headphones 6 is omitted from FIG. 4.

The functions of the transfer function correction circuit 7, the reflection circuit 8, the adders 11*a* and 11*b*, the subtractors 12*a* and 12*b*, and the crosstalk cancel circuits 13*a* and 13*b* are implemented by a single program or a plurality of programs executed by the DSP 4.

Figure 34:
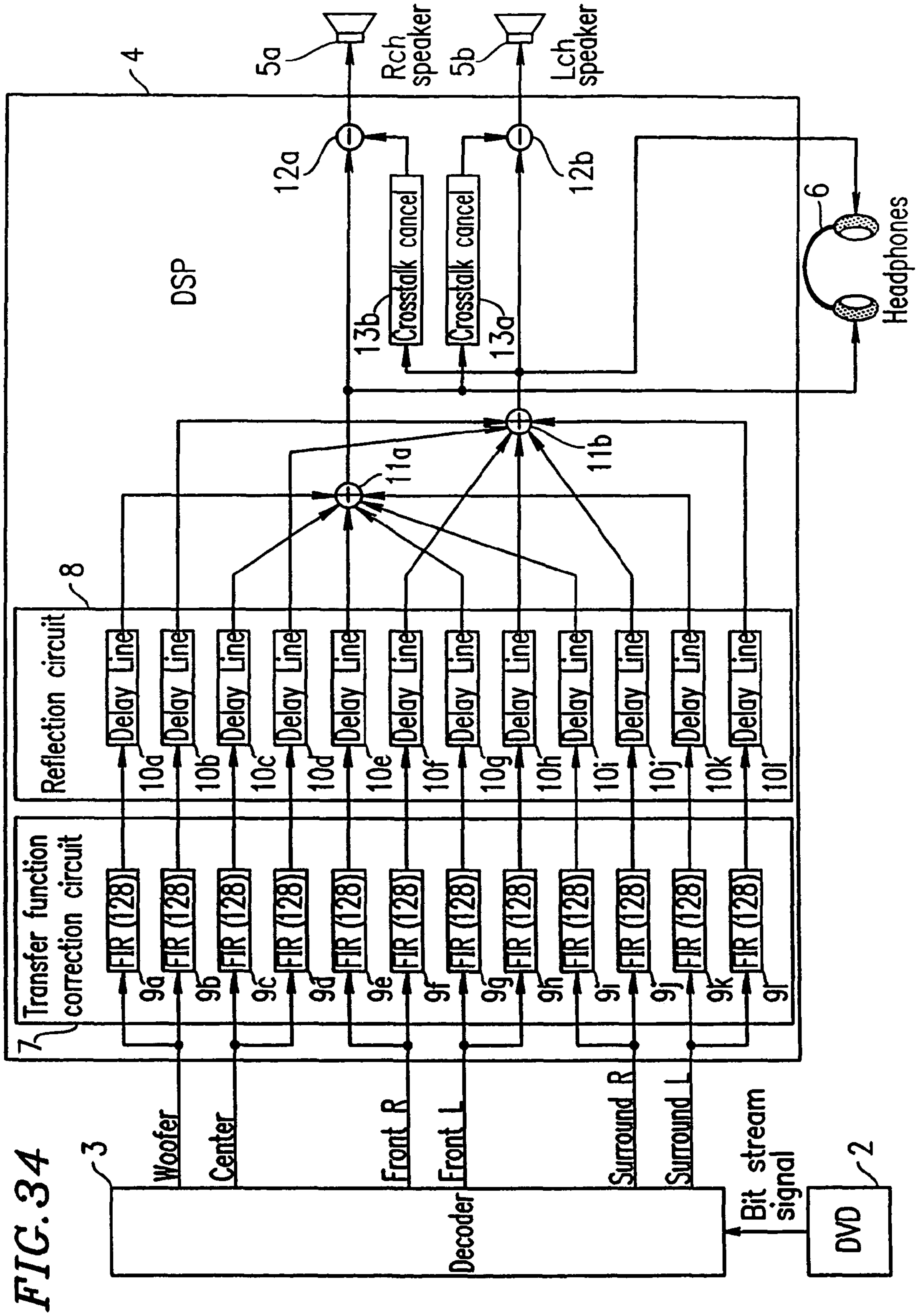
FIG. 34 is a block diagram illustrating a structure of still another conventional signal processing apparatus.

The structure of the DSP 4 shown in FIG. 4 is fundamentally similar to that of the DSP 4 of the conventional art shown in FIG. 34. Therefore, the sound image localization control will not be described in detail.

The DSP 4 shown in FIG. 4 is different from the DSP 4 shown in FIG. 34 in that the former receives the determination signal representing the determination results of the input attribute of the input signal from the decoder 3 and alters the type of processing to be performed on the multiple-channel audio signals based on the determination signal.

For example, the decoder 3 detects which audio codec (for example, the Dolby AC-3, DTS or PCM 2-ch system) the input signal is based on, and outputs a determination signal representing the detected audio codec to the DSP 4. Such detection is achieved by referring to information at a predetermined position of the bit stream signal since the format of the bit stream signal is predetermined by the Standards. The DSP 4 performs the sound image localization control which is optimum to the audio codec represented by the determination signal.

Figure 5:
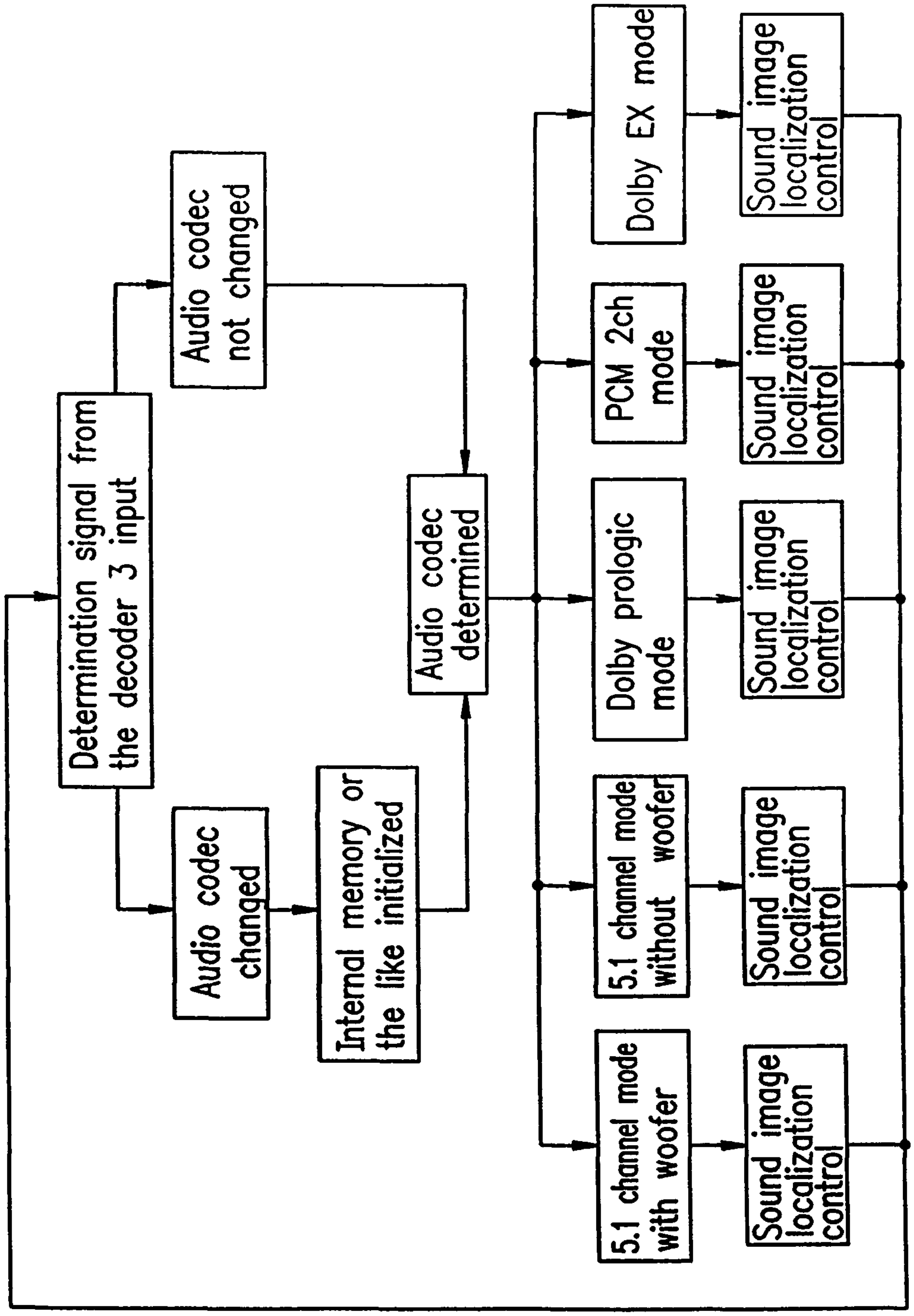
FIG. 5 shows steps of a main program executed by a DSP 4.

FIG. 5 shows steps of a program mainly executed by the DSP 4.

First, the DSP 4 receives the determination signal from the decoder 3 and checks whether the audio codec has been changed or not based on the determination signal. When the audio codec has been changed, the DSP 4 initializes an internal memory or the like and clears data accumulated so far. Such initialization is achieved by, for example, initializing the program. When the audio codec has not been changed, the data accumulated so far is continuously used.

Then, the DSP 4 determines the current audio codec based on the determination signal from the decoder 3 and performs the sound image localization control in accordance with the audio codec.

In the example shown in FIG. 5, the sound image localization control can be performed in five modes of "5.1-ch mode with woofer", "5.1-ch mode without woofer", "Dolby prologic mode", "PCM 2-ch mode" and "Dolby EX mode".

The structure of the DSP 4 shown in FIG. 4 is used for the "5.1-ch mode with woofer". The DSP 4 has a function of changing its own structure (for example, the structure of the transfer function correction circuit 7 or the reflection circuit 8) in accordance with the mode of the sound image localization control corresponding to the current audio codec (or the current number of channels). Such a change of the structure of the DSP 4 can be achieved by, for example, changing the program to be executed by the DSP 4.

Figure 6:
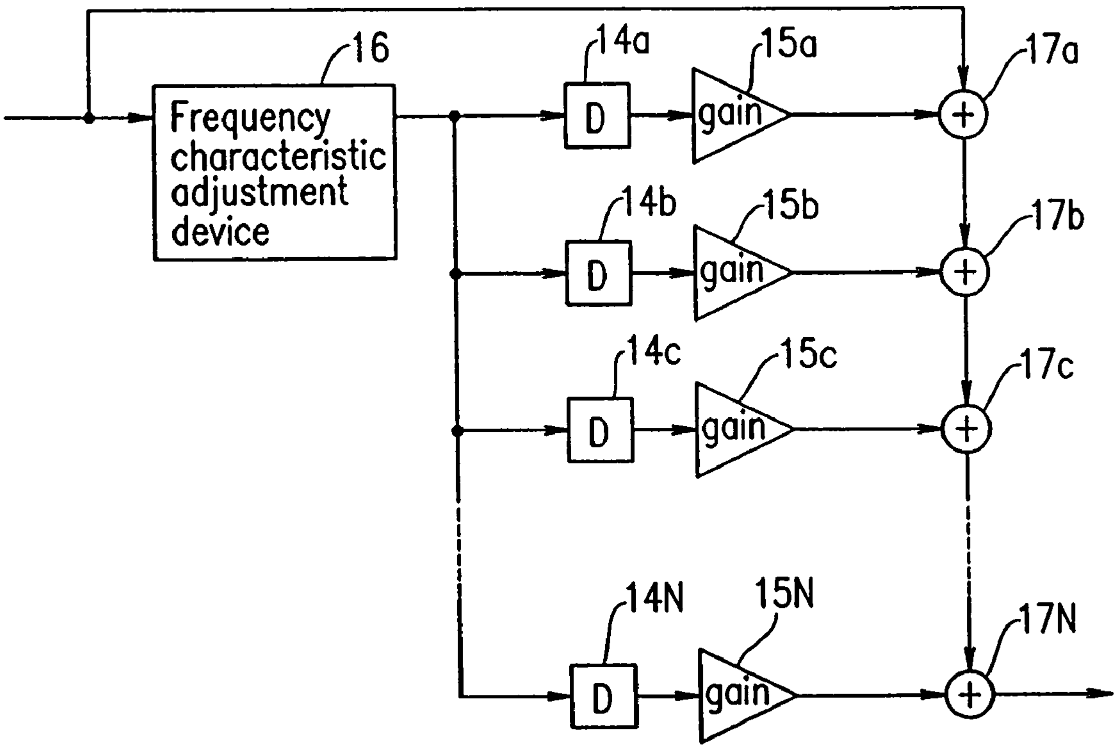
FIG. 6 is a block diagram illustrating an internal structure of a delay line included in a reflection circuit 8.
Figure 7:
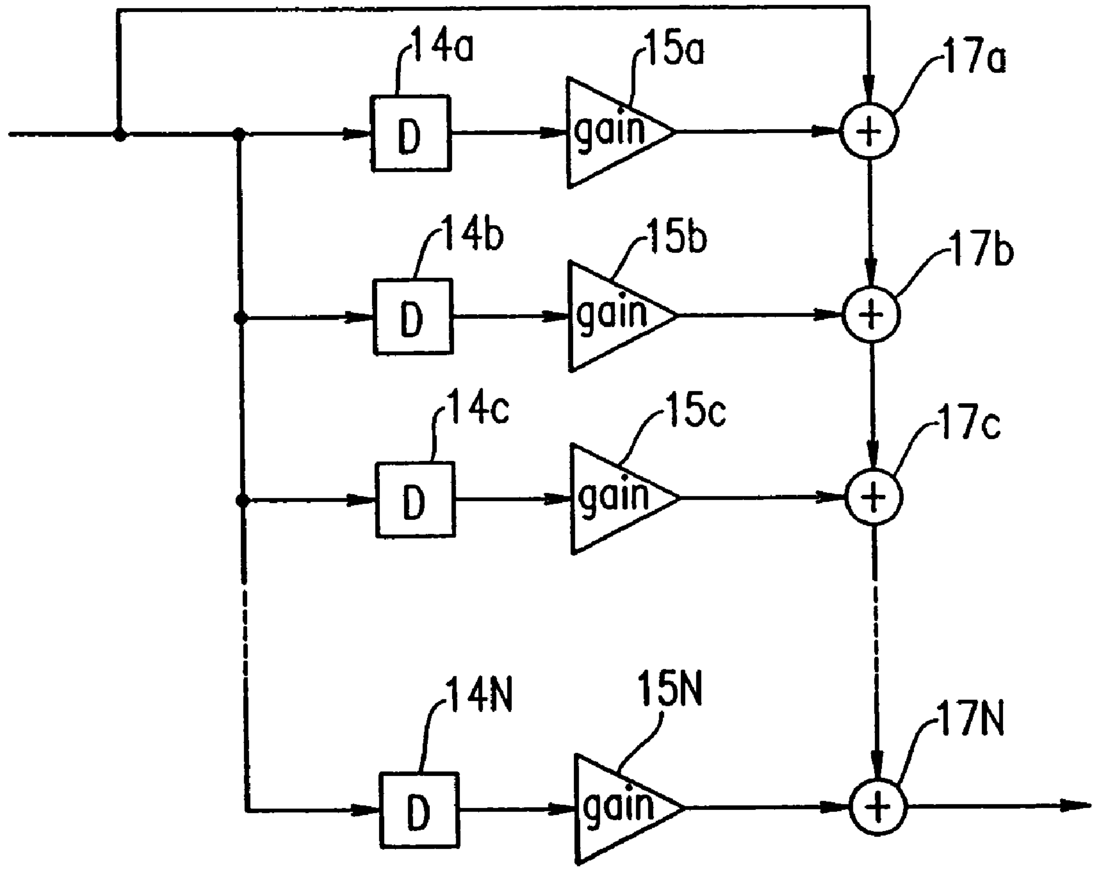
FIG. 7 is a block diagram illustrating another internal structure of a delay line included in the reflection circuit 8.
Figure 35:
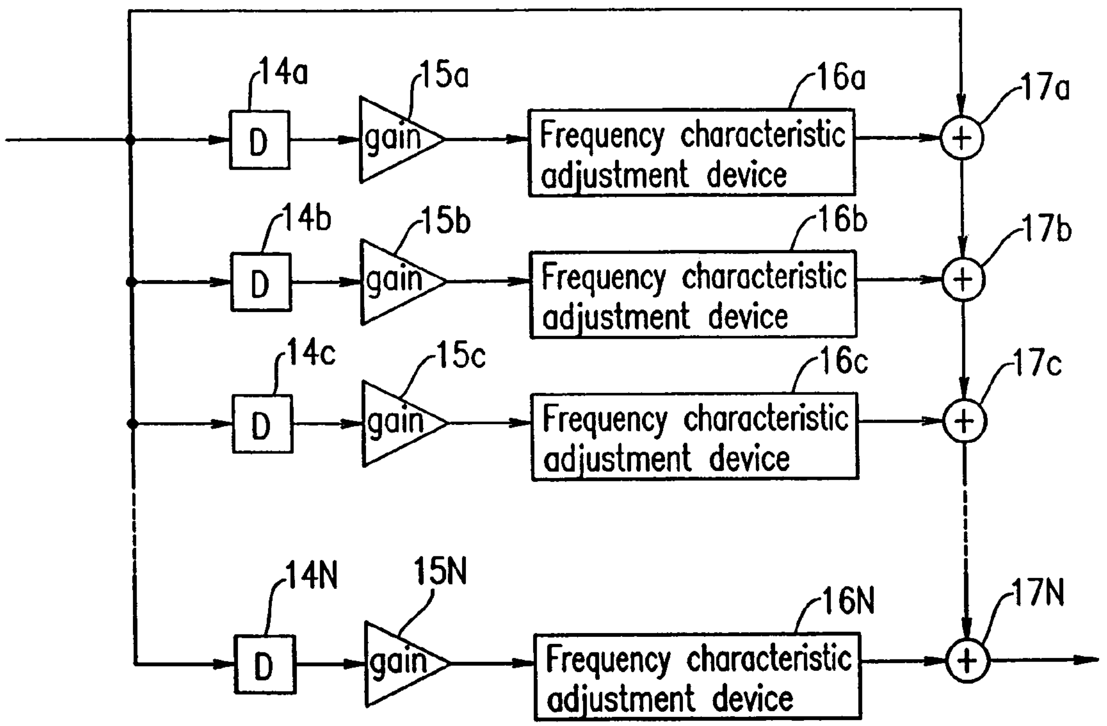
FIG. 35 is a block diagram illustrating an internal structure of a reflection circuit 8 in the conventional signal processing apparatus shown in FIG. 34.
Figure 36:
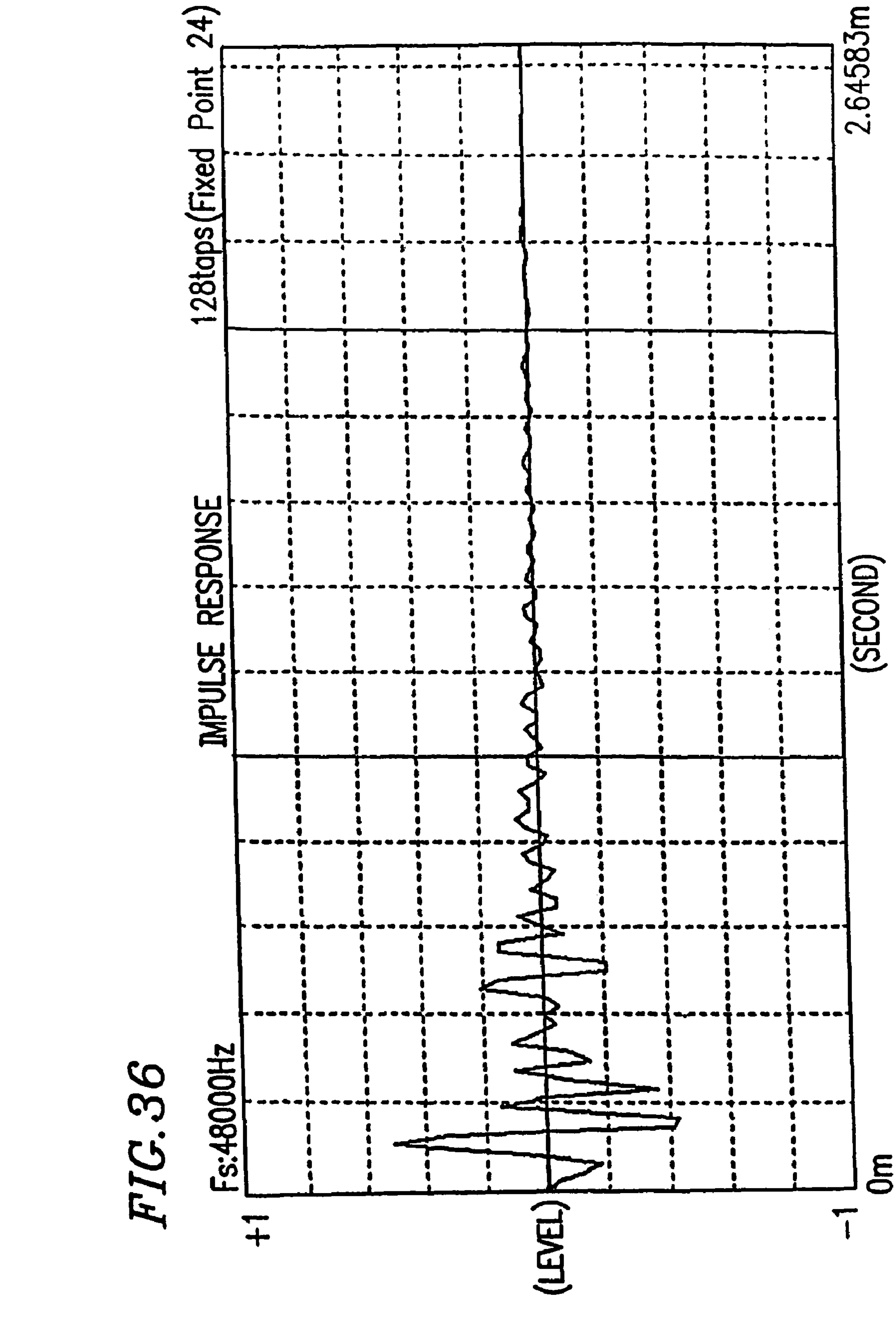
FIG. 36 is a block diagram illustrating an internal structure of a transfer function correction circuit 7 in the conventional signal processing apparatus shown in FIG. 34.

The reflection circuit 8 shown in FIG. 4 may have the structure described above in the conventional art with reference to FIG. 35, but may have a structure shown in FIG. 6 or 7. In the structure of FIG. 6, the reflection circuit 8 has one frequency characteristic adjustment device 16 for commonly adjusting the frequency characteristics of the reflection components. In the structure of FIG. 7, the reflection circuit 8 does not adjust the frequency characteristics.

As described above, the structure of the DSP 4 shown in FIG. 4 is for the "5.1 ch mode with woofer". The structure shown in FIG. 4 is a fundamental structure of various structures of the DSP 4 modified for each of the modes for sound image localization control.

Figure 8:
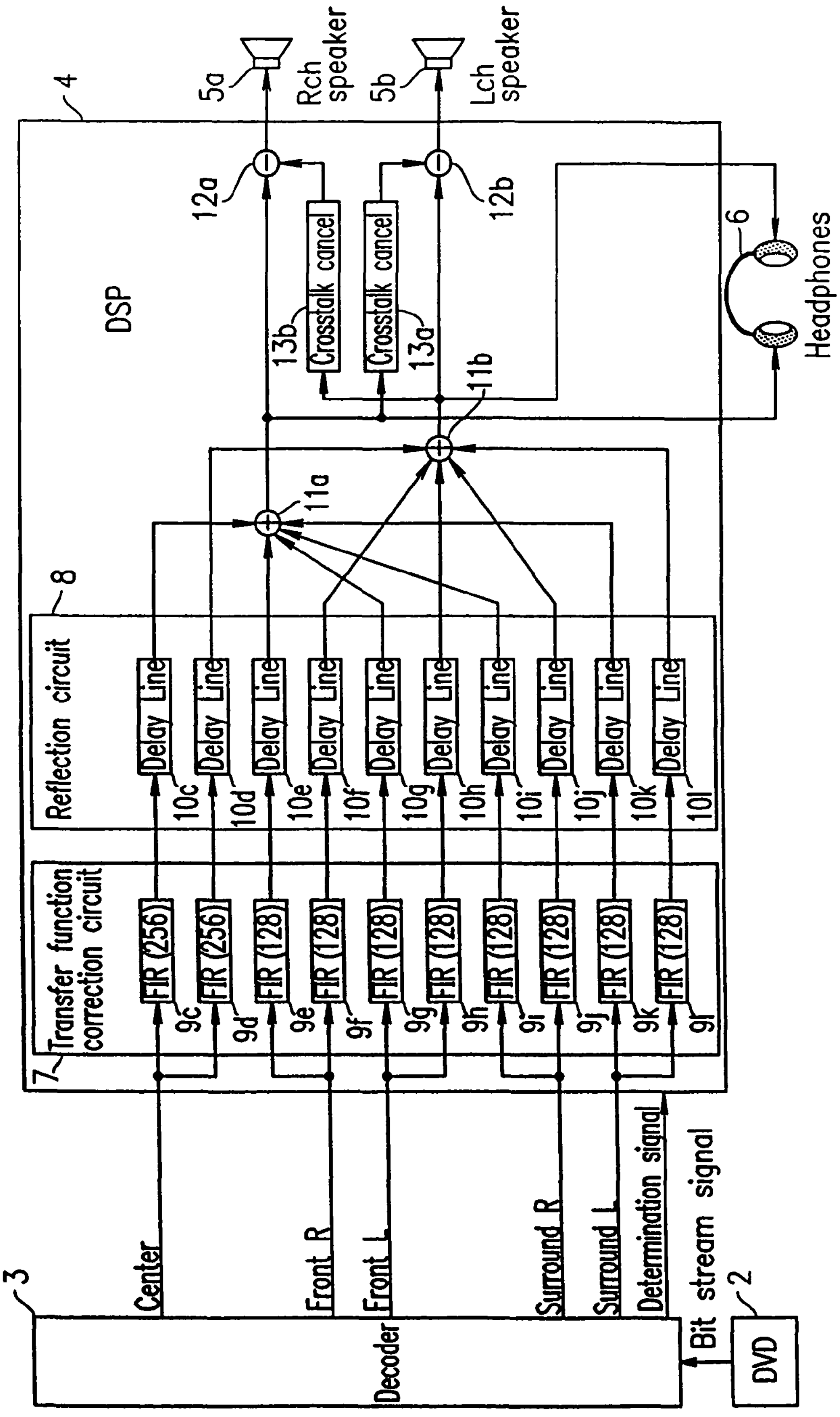
FIG. 8 is a block diagram illustrating an exemplary structure of the DSP 4 in the case of the "5.1-channel mode without woofer"

FIG. 8 shows an exemplary structure of the DSP 4 for the "5.1 ch mode without woofer".

The DSP 4 shown in FIG. 8 is different from the DSP 4 shown in FIG. 4 in that the former excludes the FIR filters 9*a* and 9*b* for the woofer signal from the transfer function correction circuit 7 and excludes the delay lines 10*a* and 10*b* for the woofer signal from the reflection circuit 8. In the DSP 4 shown in FIG. 8, the FIR filters 9*c* and 9*d* for the center signal each have 256 taps.

In FIG. 8, identical elements to those described with reference to FIG. 4 bear identical reference numerals and will not be described. The fundamental operation of the DSP 4 shown in FIG. 8 is similar to that of the DSP 4 shown in FIG.

Figure 9:
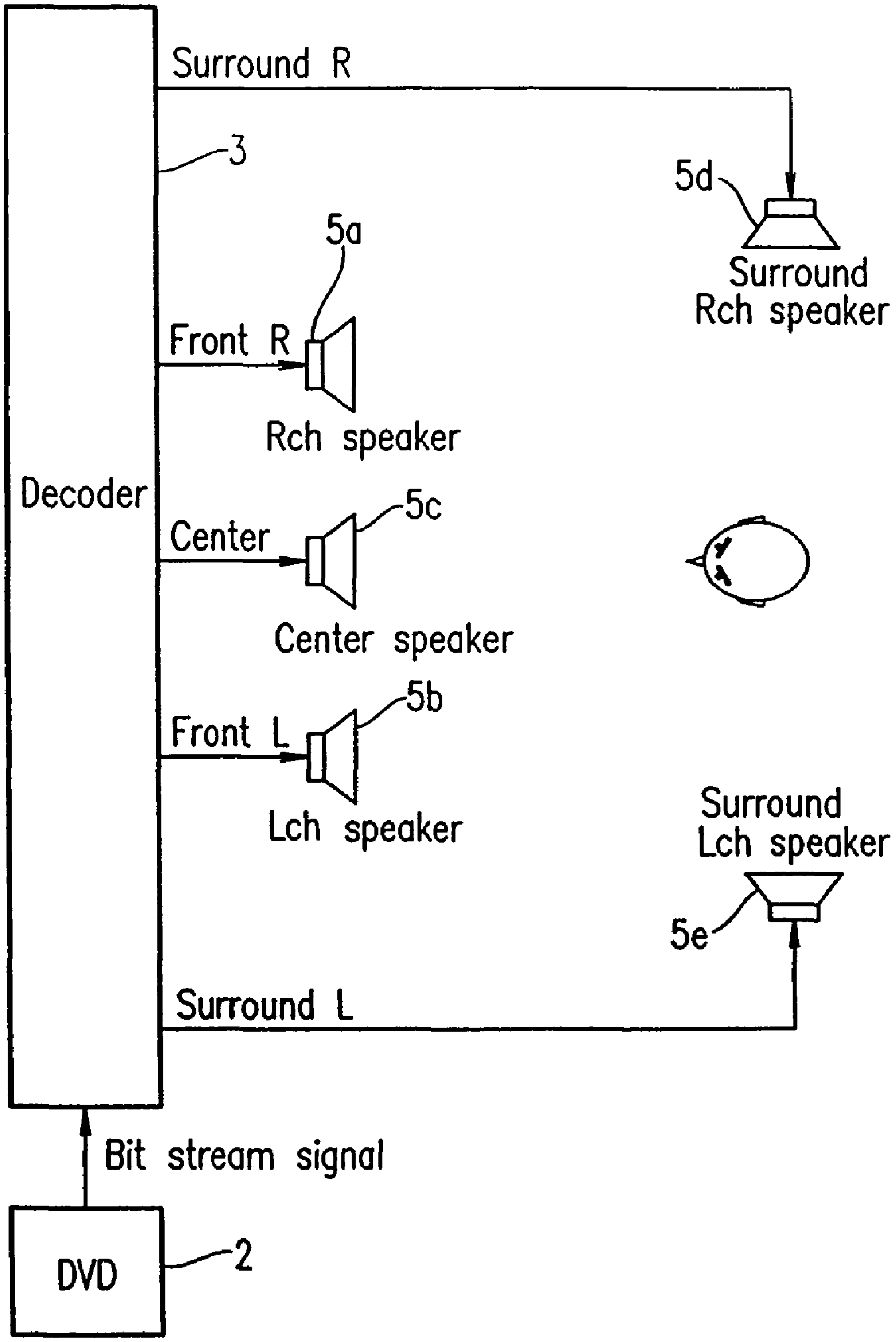
FIG. 9 shows an exemplary arrangement of speakers to be reproduced in the case of the "5.1-channel mode without woofer"

4 and will not be described in detail. In the case of the "5.1 ch mode without woofer", the arrangement of speakers to be reproduced is, for example, shown in FIG. 9.

In the DSP 4 shown in FIG. 4, the FIR filters 9*c* and 9*d* for the center signal each have 128 taps. Accordingly, the FIR filters 9*c* and 9*d* in the DSP 4 shown in FIG. 8 each have a filter length which is twice as long as the filter length of each filter of the DSP 4 shown in FIG. 4. As the filter length is greater, the precision of the filters is improved and thus the effect of the sound image localization control is improved. Especially, the quality and the listener's perception of sound image localization of the low sound is improved.

The calculation amount and the memory capacity of the DSP 4 shown in FIG. 8 are equal to those of the DSP 4 shown in FIG. 4. The calculation amount and the memory capacity of the transfer function correction circuit 7 of the DSP 4 shown in FIG. 8 correspond to 256 taps/filter×2+128 taps/filter×8=1536 taps. The calculation amount and the memory capacity of the transfer function correction circuit 7 of the DSP 4 shown in FIG. 4 correspond to 128 taps/filter×12=1536 taps. They are equal to each other.

The DSP 4 shown in FIG. 8 does not need to process woofer signal and thus uses the calculation amount and the memory capacity required for processing the woofer signal for sound image localization control of the center signal. Thus, the effect of the sound image localization control of the center signal can be improved.

The woofer signal is added to the front L signal or the front R signal by the decoder 3 in a predetermined method. (The method is defined in the AC-3 or DTS system.)

The "5.1 ch mode without woofer" is especially useful for reproduction using the headphones for the following reasons. (1) Since an absence or a presence of a low sound signal (a woofer signal is of 120 Hz or lower in the AC-3 or DTS system) does not greatly influence the listener's perception of the sound image localization (sound direction), addition of the woofer signal to the front L signal or the front R signal does not provide any significantly adverse effect on the quality of the low sound perceived by the listener. (2) Usually, the headphones are mostly inferior in the low frequency range reproduction capability to large speakers and dedicated sub-woofers. Therefore, it is preferable for reproduction through the headphones to reproduce a woofer signal by another speaker such as a front speaker than to forcibly reproduce the woofer signal so as to reproduce the characteristics of the large speakers or the dedicated sub-woofers.

When the speakers 5*a* and 5*b* have a sufficient low range reproduction capability, the DSP 4 shown in FIG. 4 may be used to perform the sound image localization control. Even when the speakers 5*a* and 5*b* are used for the reproduction, the low sound signal does not contribute to the listener's perception of the sound image localization (sound direction). Therefore, the DSP 4 shown in FIG. 8 may be used to perform the sound image localization control, with the focus being on the reproduction of the center signal.

In the example shown in FIG. 8, the FIR filters 9*c* and 9*d* each have 256 taps and the FIR filter 9*e* through 9*l* each have 128 taps. The number of taps is not limited to this, but may be freely set in the range permitted by the calculation amount and the memory capacity of the DSP 4.

Figure 37:
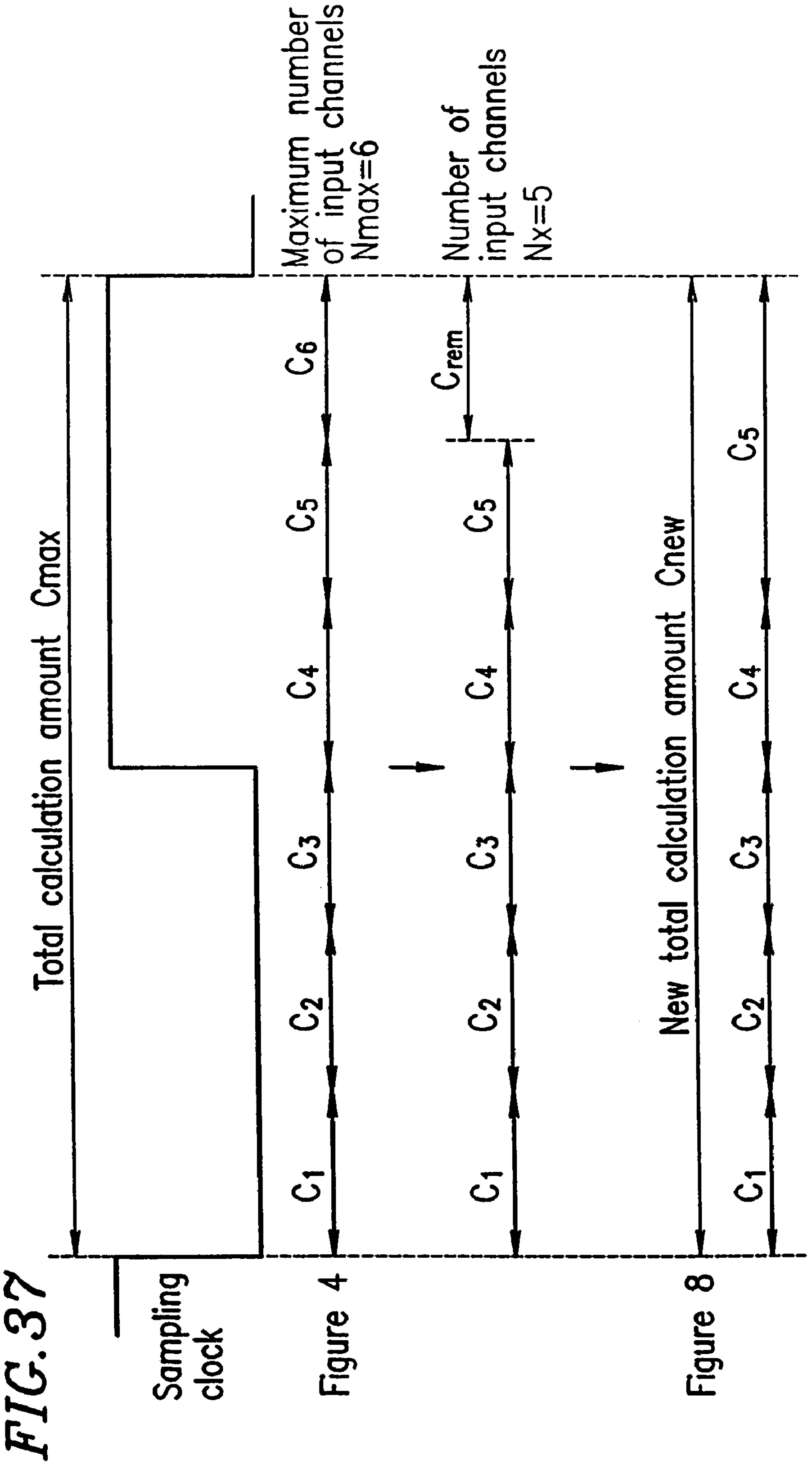
FIG. 37 schematically shows how a calculation remainder generated by a change in an input attribute of an input signal (the type of the audio codec or the number of input channels) is assigned to processing of the input signal.

FIG. 37 schematically shows how the calculation remainder generated by the change in the input attribute of the input signal (the type of the audio codec or the number of channels) is assigned to processing of the input signal.

It is assumed that a maximum number of input channels which are input to the DSP 4 is Nmax. Here, Nmax=6.

In the case of the "5.1 ch mode with woofer" (FIG. 4), the number of input channels is Nmax (=6). Since the signals of the Nmax channels are processed by the DSP 4, the total calculation amount of the DSP 4 is represented by Cmax=C1+C2+C3+C4+C5+C6. C1 through C6 represents a calculation amount required for processing the signal of the respective channel. C6 represents a calculation amount required for processing the woofer signal.

In the case of the "5.1 ch mode without woofer" (FIG. 8), the woofer signal is not input to the DSP 4. Therefore, the number of input channels is reduced to Nx (=5). As a result, assuming that the type of processing to be performed by the DSP 4 is not changed, the total calculation amount of the DSP 4 is represented by Cx=C1+C2+C3+C4+C5. Calculation remainder for Crem (=Cmax−Cx) is generated. In the example shown in FIG. 8, the calculation remainder Crem is assigned to processing of the center signal. As a result, C5 (the calculation amount assigned to processing of the center signal) is increased by the calculation remainder Crem.

In FIG. 8, the calculation remainder Crem is assigned to processing of the center signal so that a new total calculation amount Cnew after the input attribute of the input signal is changed is equal to the total calculation amount Cmax. The present invention is not limited to this. At least a part of the calculation remainder Crem may be assigned to processing of at least one input signal of one channel. Thus, the calculation remainder Crem may be arbitrarily used.

The total calculation amount Cnew after the input attribute of the input signal is changed is sufficient as long as it is Cmax·Nx/Nmax (in the case of FIG. 8, Cmax·5/6) or more.

As described above, when the input attribute is changed so as to reduce the number of channels of the input signal, the DSP 4 assigns at least a part of the calculation remainder generated by the reduction in the number of channels to processing of the input signal (for example, processing of the sound image localization control of the center signal). When the input attribute is changed so as to reduce the calculation amount based on the audio codec of the input signal, the DSP 4 assigns at least a part of the calculation remainder generated by the reduction in the calculation amount to processing of the input signal (for example, processing of the sound image localization control of the center signal). Thus, the calculation remainder, which is excessive, can be effectively utilized.

Figure 10:
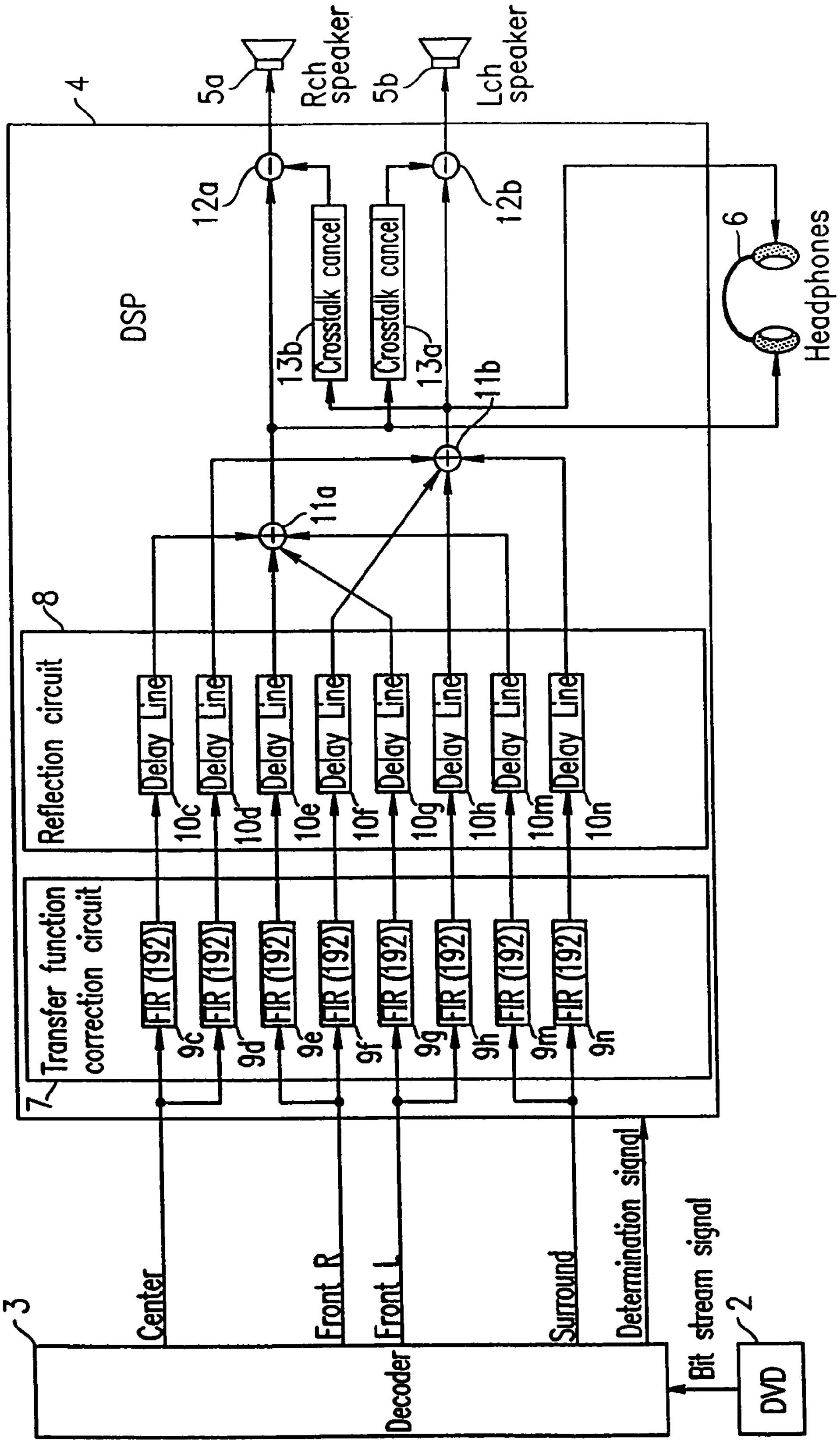
FIG. 10 is a block diagram illustrating an exemplary structure of the DSP 4 in the case of the "Dolby prologic mode"

FIG. 10 shows an exemplary structure of the DSP 4 for the "Dolby prologic mode".

The DSP 4 shown in FIG. 10 is different from the DSP 4 shown in FIG. 8 in that the former includes FIR filters 9*m* and 9*n* of the transfer function correction circuit 7 in place of the FIR filters 9*i* through 9*l* for the surround L signal and the surround R signal, and also includes delay lines 10*m* and 10*n* of the reflection circuit 8 in place of the delay lines 10*i* through 10*l* for the surround L signal and the surround R signal. In the DSP 4 shown in FIG. 10, the FIR filters 9*c* through 9*h* and 9*m* and 9*n* each have 192 taps.

In FIG. 10, identical elements to those described with reference to FIGS. 4 and 8 bear identical reference numerals and will not be described. The fundamental operation of the DSP 4 shown in FIG. 10 is similar to that of the DSP 4 shown in FIGS. 4 and 8 and will not be described in detail. In the case of the "Dolby prologic mode", the arrangement of speakers to be reproduced is, for example, shown in FIG. 11.

Figure 11:
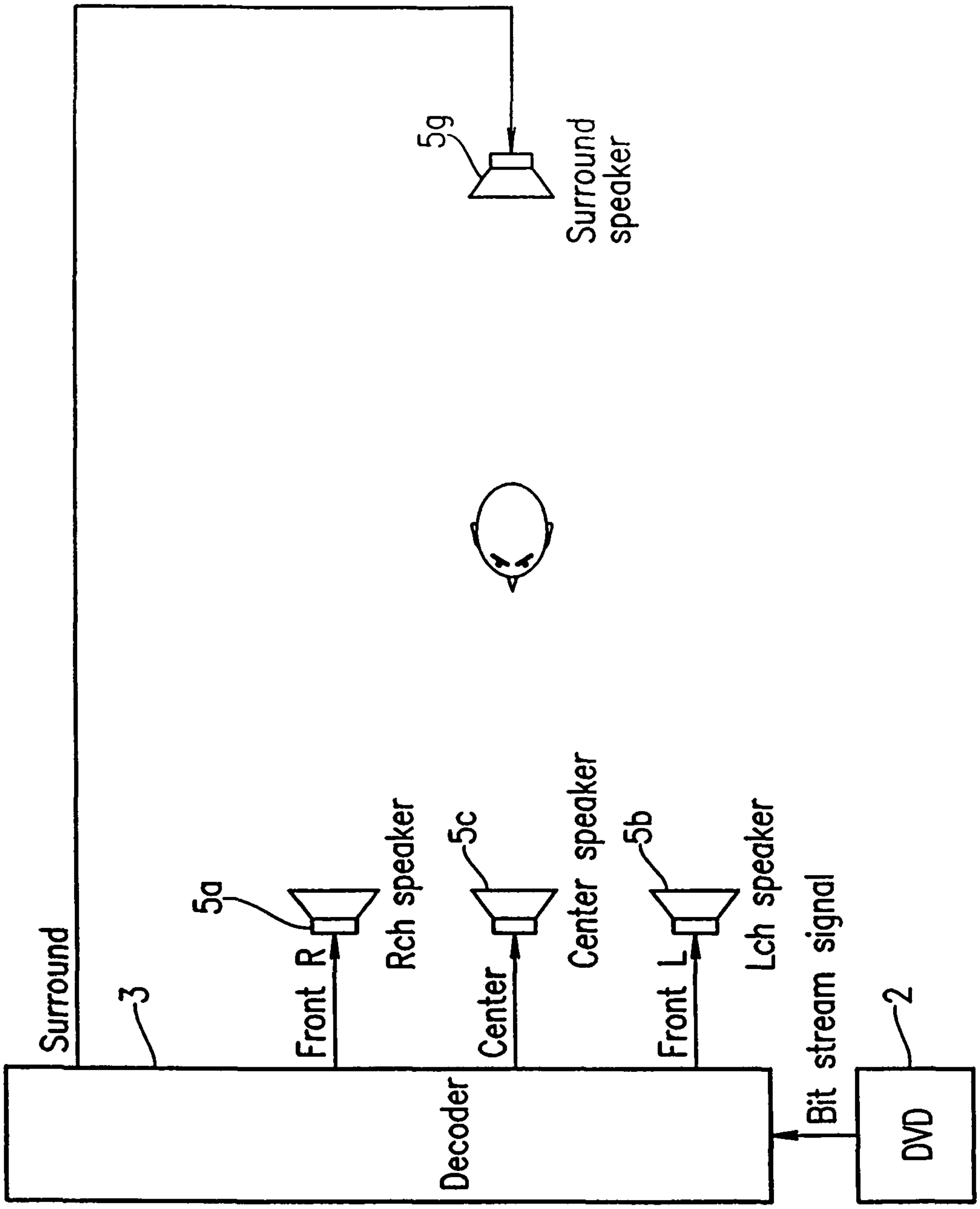
FIG. 11 shows an exemplary arrangement of speakers to be reproduced in the case of the "Dolby prologic mode"

As shown in FIG. 11, there is one surround speaker 5*g*. Therefore, the transfer function correction to the surround signals shown in FIG. 10 is performed using the FIR filters 9*m* and 9*n*, and the reflection addition to the surround signals shown in FIG. 10 is performed using the delay lines 10*m* and 10*n*.

In the DSP 4 shown in FIG. 8, the FIR filters 9*e* through 9*h* for the front L signal and the front R signal each have 128 taps, and the FIR filters 9*i* through 9*l* for the surround L signal and the surround R signal each have 128 taps. Accordingly, the FIR filters 9*e* through 9*h*, 9*m* and 9*n* in the DSP 4 shown in FIG. 10 each have a filter length which is 1.5 times the filter length of each filter of the DSP 4 shown in FIG. 8. As the filter length is greater, the precision of the filters is improved and thus the effect of the sound image localization control is improved. Especially, the quality and the listener's perception of sound image localization of the low sound are improved. In the DSP 4 shown in FIG. 8, the FIR filters 9*c* and 9*d* for the center signal each have 256 taps; whereas in the in the DSP 4 shown in FIG. 10, the FIR filters 9*c* and 9*d* each have 0.75 times the filter length of each filter of the DSP 4 shown in FIG. 8 (1.5 times the filter length of each filter of the DSP 4 shown in FIG. 4).

The calculation amount and the memory capacity of the DSP 4 shown in FIG. 10 are equal to those of the DSP 4 shown in FIG. 8. The calculation amount and the memory capacity of the transfer function correction circuit 7 of the DSP 4 shown in FIG. 10 correspond to 192 taps/filter×8=1536 taps. The calculation amount and the memory capacity of the transfer function correction circuit 7 of the DSP 4 shown in each of FIGS. 4 and 8 correspond to 1536 taps. They are equal to each other.

In the DSP 4 shown in FIG. 10, the sound signal is monaural. Therefore, at least a part of the calculation amount and the memory capacity required for processing the surround L signal and the surround R signal is assigned to the sound image localization control for the front L signal and the front R signal and the sound image localization control for the surround signals. Thus, the effect of the sound image localization control of the center signal and the surround signals is improved.

In the example shown in FIG. 10, the FIR filters 9*c* through 9*n*, 9*m* and 9*n* each have 192 taps. The number of taps is not limited to this, but may be freely set in the range permitted by the calculation amount and the memory capacity of the DSP 4. For example, when the focus is on the center signal as in the example shown in FIG. 8, the FIR filters 9*c* and 9*d* may each have 256 taps, the FIR filters 9*e* through 9*h* may each have 192 taps, and the FIR filters 9*m* and 9*n* may each have 128 taps. In this case also, the calculation amount and the memory capacity of the transfer function correction circuit 7 correspond to 1536 taps.

Surround signals are less important as compared to the center signal and the front signals. Therefore, the effect of the sound image localization control can be entirely improved by reducing the number of taps of the FIR filters for the surround signals and assigning the calculation remainder generated by the reduction in the number of taps to processing of the center signal or the front signals.

In the example of FIG. 11, one surround speaker 5*g* is provided to the rear of the listener. In an alternative structure, one surround speaker is provided at a rear right position and another surround speaker is provided at a rear left position with respect to the listener so as to reproduce the same surround signal. In some cases, it is recommended to use two surround speakers in this manner. In this case, the sound image localization control of the surround signal may be performed so that the acoustic characteristic of the sound from each surround speaker is reproduced by the transfer function correction circuit 7 and the reflection circuit 8.

Figure 12:
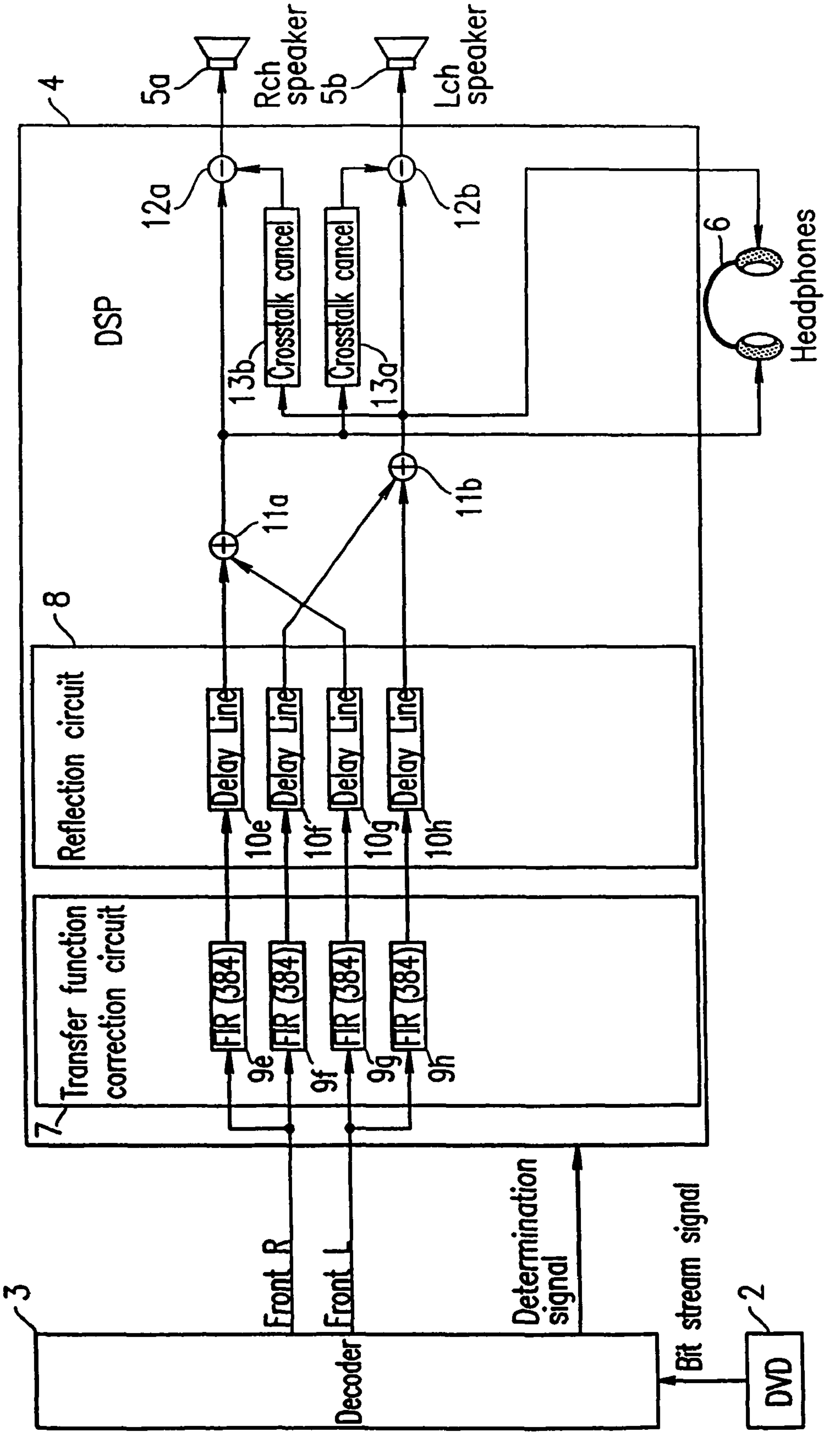
FIG. 12 is a block diagram illustrating an exemplary structure of the DSP 4 in the case of the "PCM 2-ch mode"

FIG. 12 shows an exemplary structure of the DSP 4 for the "PCM 2-ch mode".

The DSP 4 shown in FIG. 12 is different from the DSP 4 shown in FIG. 4 in that the former excludes the FIR filters 9*a* and 9*b* for the woofer signal and the FIR filters 9*c* and 9*d* for the center signal, and the FIR filters 9*i* through 9*l* from the transfer function correction circuit 7, and also excludes the delay lines 10*a*, 10*b*, 10*c*, 10*d*, and 10*i* through 10*l* from the reflection circuit 8. In other words, the structure of the DSP 4 shown in FIG. 12 is a so-called stereo structure. In the DSP 4 shown in FIG. 12, the FIR filters 9*e* through 9*h* for the front L signal and the front R signal each have 384 taps.

In FIG. 12, identical elements to those described with reference to FIG. 4 bear identical reference numerals and will not be described. The fundamental operation of the DSP 4 shown in FIG. 12 is similar to the processing of the front L signal and the front R signal performed by the DSP 4 shown in FIG. 4 and will not be described in detail. In the case of the "PCM 2-ch mode", the arrangement of speakers to be reproduced is, for example, shown in FIG. 13.

In the DSP 4 shown in FIG. 4, the FIR filters 9*e* through 9*h* for the front L signal and the front R signal each have 128 taps. Accordingly, the FIR filters 9*e* through 9*h* in the DSP 4 shown in FIG. 12 each have a filter length which is three times as long as the filter length of each filter of the DSP 4 shown in FIG. 4. As the filter length is greater, the precision of the filters is improved and thus the effect of the sound image localization control is improved. Especially, the quality and the listener's perception of sound image localization of the low sound are improved.

The calculation amount and the memory capacity of the DSP 4 shown in FIG. 12 are equal to those of the DSP 4 shown in FIG. 4. The calculation amount and the memory capacity of the transfer function correction circuit 7 of the DSP 4 shown in FIG. 12 correspond to 384 taps/filter×4=1536 taps. The calculation amount and the memory capacity of the transfer function correction circuit 7 of the DSP 4 shown in FIG. 4 correspond to 1536 taps. They are equal to each other.

The DSP 4 shown in FIG. 12 does not need to process the woofer signal, the center signal, the surround L signal and the surround R signal, and therefore assigns at least a part of the calculation amount and the memory capacity required for processing these signals to the sound image localization control for the front L signal and the front R signal. Thus, the effect of the sound image localization control of the front L signal and the front R signal is improved.

In the example shown in FIG. 12, the FIR filters 9*e* through 9*h* each have 384 taps. The number of taps is not limited to this, but may be freely set in the range permitted by the calculation amount and the memory capacity of the DSP 4.

Figure 14:
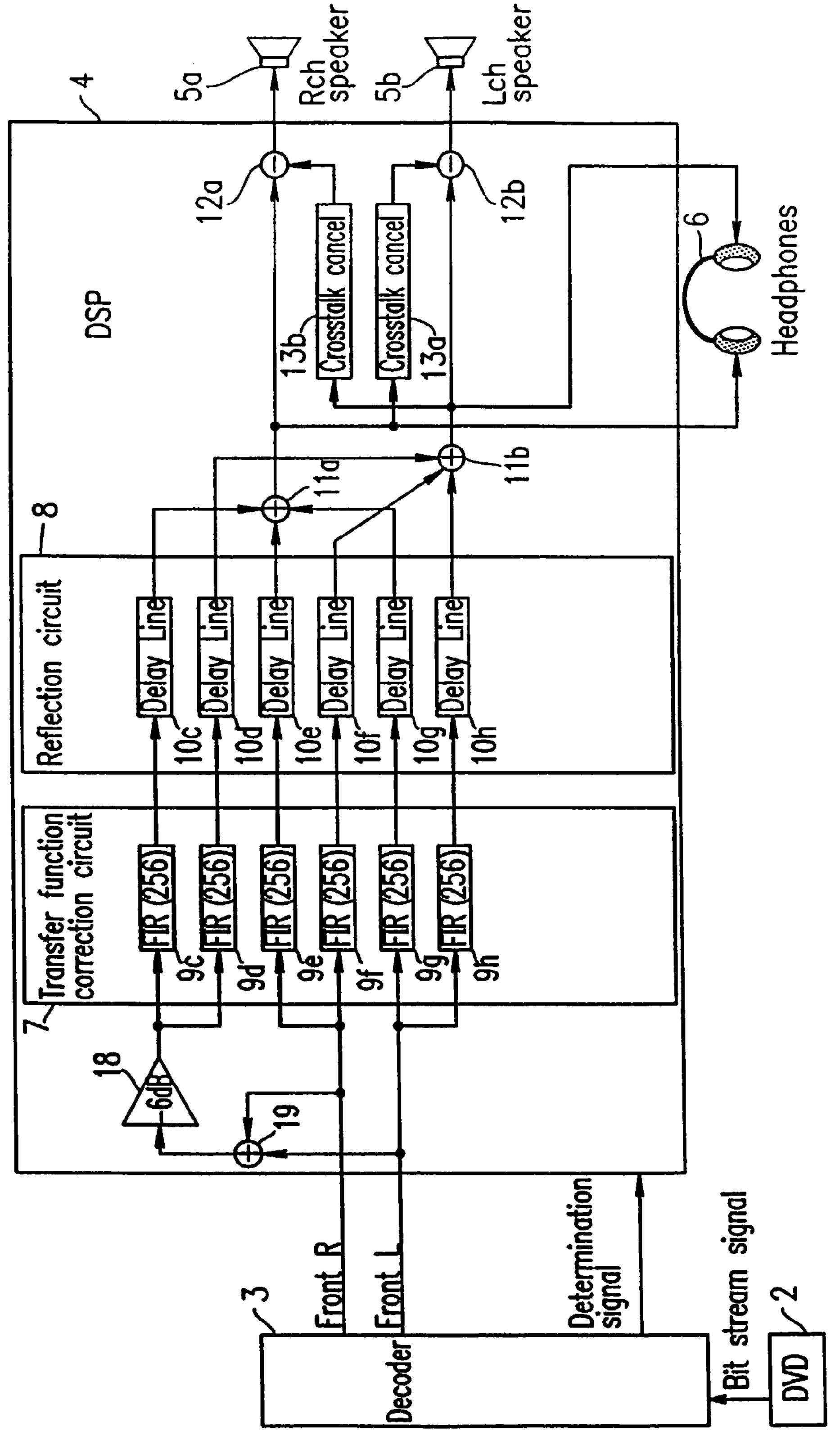
FIG. 14 is a block diagram illustrating another exemplary structure of the DSP 4 in the case of the "PCM 2-ch mode"

FIG. 14 shows another exemplary structure of the DSP 4 for the "PCM 2-ch mode".

The DSP 4 shown in FIG. 14 is different from the DSP 4 shown in FIG. 12 in that the former includes an adder 19 and a level adjuster 18, and also includes the FIR filters 9*c* and 9*d* in the transfer function correction circuit 7, and the delay lines 10*c* and 10*d* in the reflection circuit 8, in addition to the structure of the DSP 4 shown in FIG. 12.

In FIG. 14, identical elements to those described with reference to FIG. 12 bear identical reference numerals and will not be described. The fundamental operation of the DSP 4 shown in FIG. 14 is similar to that of the DSP 4 shown in FIG. 12 and will not be described in detail.

The adder 19 adds the front L signal and the front R signal to generate a center signal. The level adjuster 18 performs level adjustment of the center signal to output the post-level adjustment center signal to the FIR filters 9*c* and 9*d*.

The FIR filters 9c and 9d and the delay lines 10c and 10d perform sound image localization control of the post-level adjustment center signal.

It is assumed that the front L signal includes a signal component C and a signal component L and that the front R signal includes a signal component C and a signal component R. Namely, the component of the front L signal is C+L, and the component of the front R signal is C+R. Herein, C represents a component commonly included in the front L signal and the front R signal. L represents a component which is included in the front L signal but not included in the front R signal. R represents a component which is included in the front R signal but not included in the front L signal.

The adder 19 adds the front L signal and the front R signal, and therefore the component of the addition signal output from the adder 19 is 2C+L+R. The level adjuster 18 attenuates the level of the addition signal to ½, and thus the components of the signal output from the level adjuster 18 is C+(L+R)/2.

As can be appreciated, the signal output from the level adjuster 18 has an inphase component which is commonly included in the front L signal and the front R signal emphasized. The inphase component which is commonly included in the front L signal and the front R signal is the center component phantom-image-localized as a composite sound at a position between the Rch speaker 5a and the Lch speaker 5b shown in FIG. 13. Namely, the structure of the DSP 4 shown in FIG. 14 simulates the reproduction sound field provided by the speaker arrangement shown in FIG. 15 through the speakers 5a and 5b or through the headphones 6.

Figure 13:
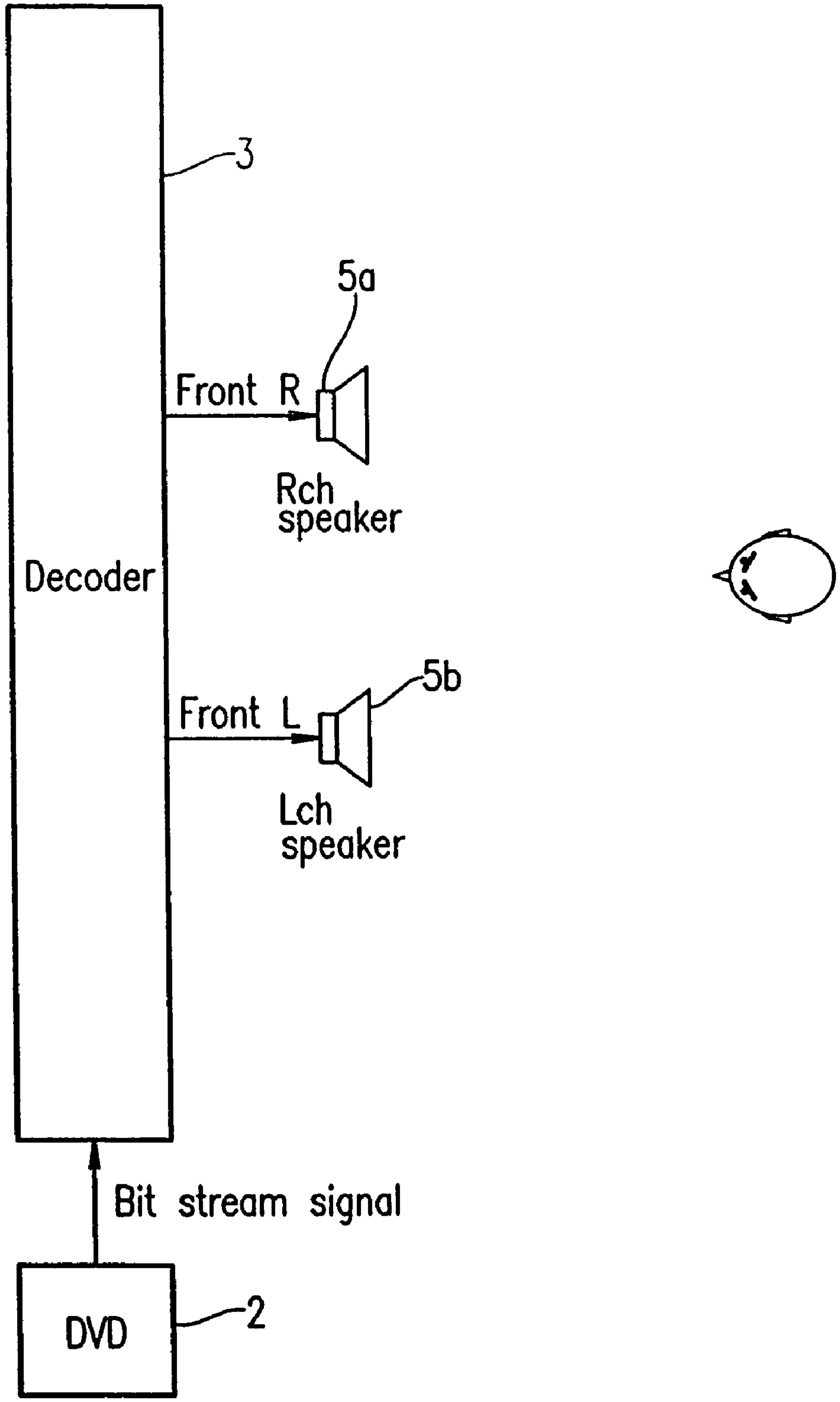
FIG. 13 shows an exemplary arrangement of speakers to be reproduced in the case of the "PCM 2-ch mode"
Figure 15:
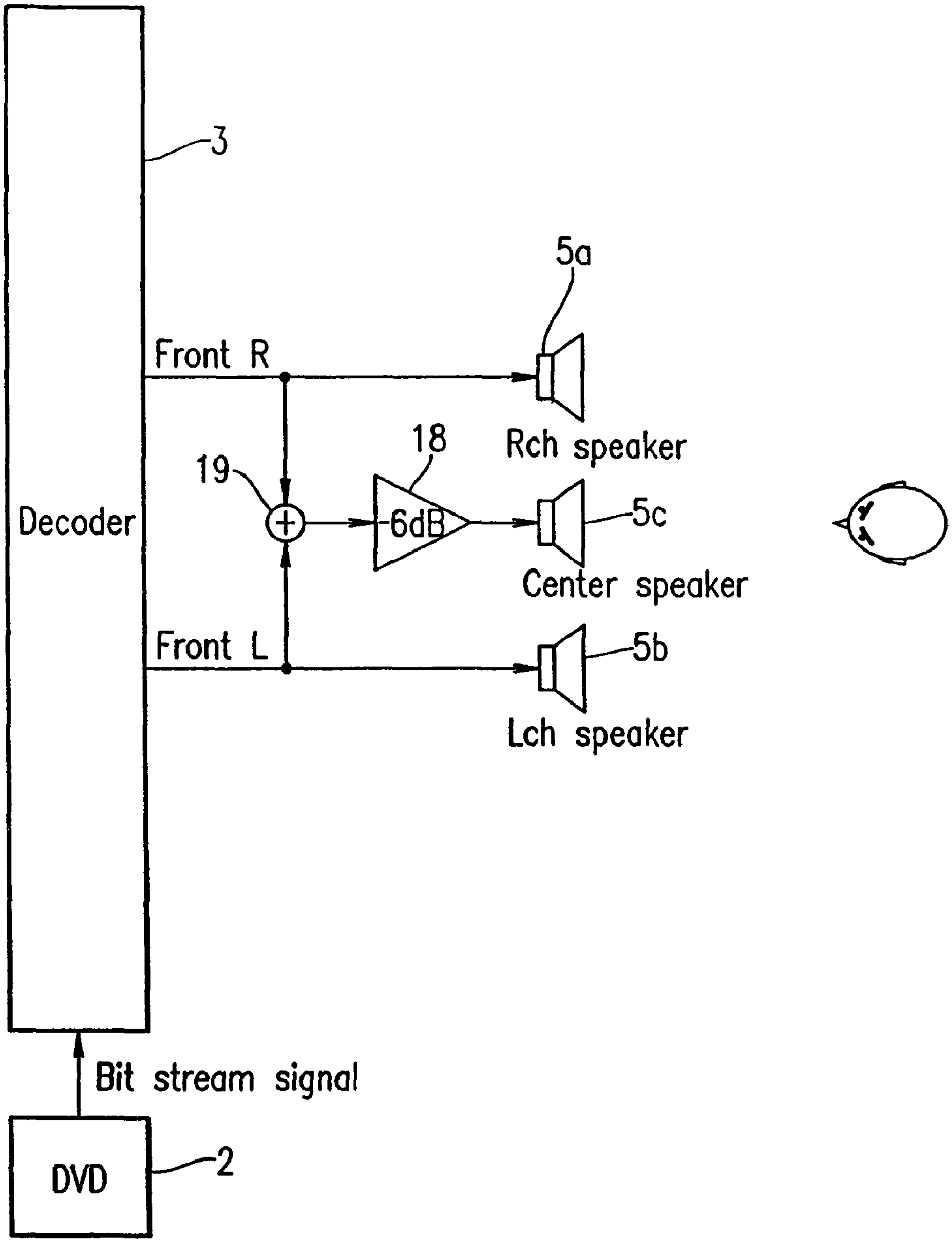
FIG. 15 shows another exemplary arrangement of speakers to be reproduced in the case of the "PCM 2-ch mode"

As compared to the speaker arrangement shown in FIG. 13, the speaker arrangement shown in FIG. 15 causes the listener to better perceive that the sound image is localized since it reproduces the center signal by the center speaker 5c. For reproducing the center signal by the speakers 5a and 5b, or by the headphones 6, it is significantly more effective to first generate the center signal and then perform sound image localization control of the center signal using the FIR filters 9c and 9d as shown in FIG. 14 than to perform sound image localization control of the Rch speaker 5a and the Lch speaker 5b using the FIR filters 9e through 9h and then phantom-image-localize the center sound as shown in FIG. 12.

In the case where the Rch speaker 5a and the Lch speaker 5b in FIG. 13 are excessively far from each other, the center sound generated at the phantom-image-localized speaker is not well reproduced, resulting in a so-called "missing of the center sound" phenomenon. By contrast, the structure shown in FIG. 15 reproduces the center sound from the actual speaker 5c, and therefore the "missing of the center sound" phenomenon does not occur. The structure shown in FIG. 15 also allows the Rch speaker 5a and the Lch speaker 5b to be significantly far from each other, and therefore the listener's perception of sound image localization and sound expansion is further improved.

In the DSP 4 shown in FIG. 14, the FIR filters 9c through 9h for the center signal, the front L signal and the front R signal each have 256 taps. In the DSP 4 shown in FIG. 4, the FIR filters 9c through 9h for the center signal, the front L signal and the front R signal each have 128 taps. Accordingly, the FIR filters 9c through 9h in the DSP 4 shown in FIG. 14 each have a filter length which is twice as long as the filter length of each filter of the DSP 4 shown in FIG. 4. As the filter length is greater, the precision of the filters is improved and thus the effect of the sound image localization control is improved. Especially, the quality and the listener's perception of sound image localization of the low sound are improved.

The calculation amount and the memory capacity of the DSP 4 shown in FIG. 14 are equal to those of the DSP 4 shown in FIG. 4. The calculation amount and the memory capacity of the transfer function correction circuit 7 of the DSP 4 shown in FIG. 14 correspond to 256 taps/filter×6=1536 taps. The calculation amount and the memory capacity of the transfer function correction circuit 7 of the DSP 4 shown in FIG. 4 correspond to 1536 taps. They are equal to each other.

The DSP 4 shown in FIG. 14 does not need to process the woofer signal, the surround L signal and the surround R signal, and therefore assigns at least a part of the calculation amount and the memory capacity required for processing these signals to the sound image localization control for the center signal, the front L signal and the front R signal. Thus, the effect of the sound image localization control of the center signal, the front L signal and the front R signal is improved.

In the example shown in FIG. 14, the FIR filters 9c through 9h each have 256 taps. The number of taps is not limited to this, but may be freely set in the range permitted by the calculation amount and the memory capacity of the DSP 4. For example, when the focus is on the center signal, the FIR filters 9c and 9d may each have 512 taps and the FIR filters 9e through 9h may each have 128 taps. Alternatively, the FIR filters 9c and 9d may each have 384 taps and the FIR filters 9e through 9h may each have 192 taps. In these cases also, the calculation amount and the memory capacity of the transfer function correction circuit 7 correspond to 1536 taps.

Figure 16:
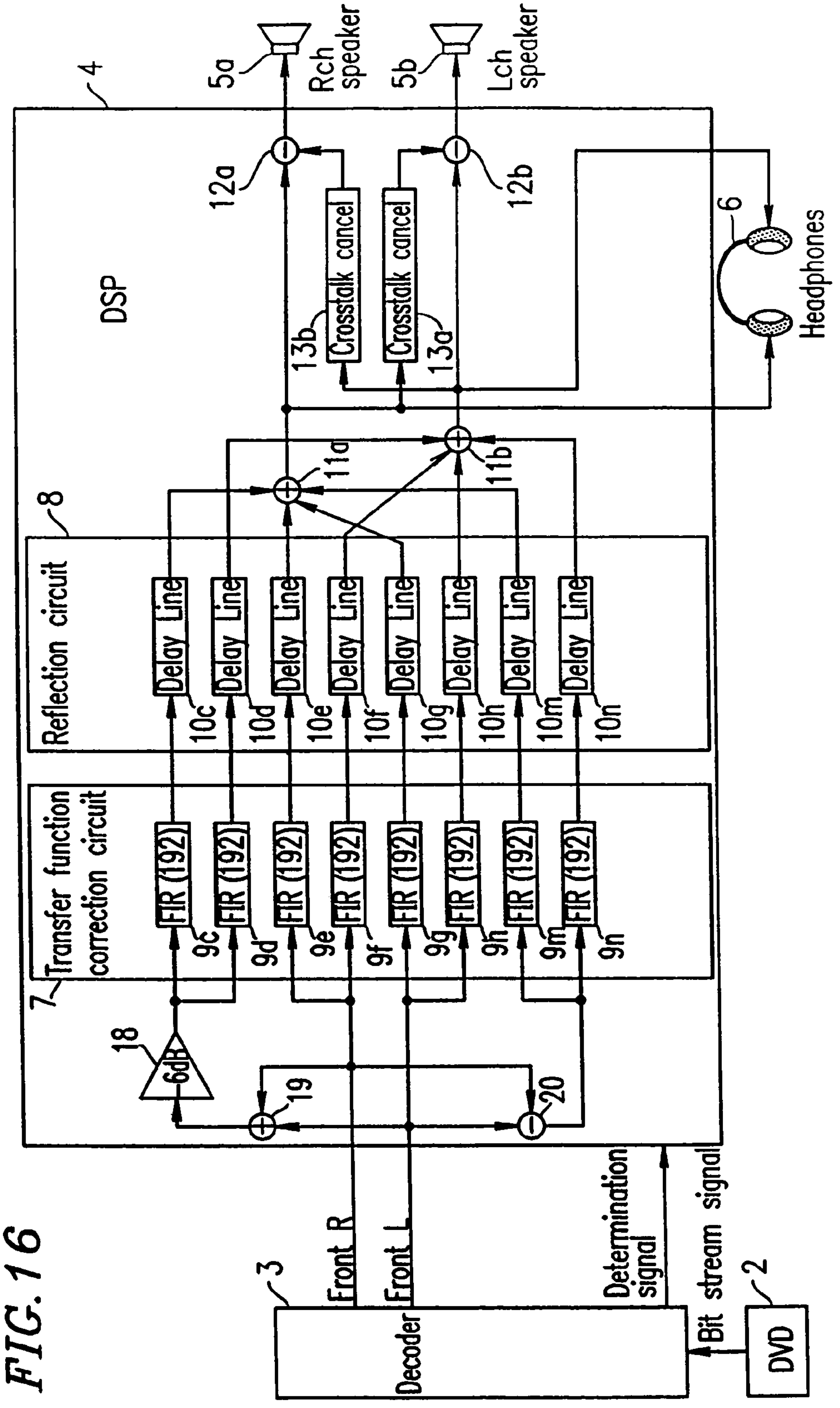
FIG. 16 is a block diagram illustrating still another exemplary structure of the DSP 4 in the case of the "PCM 2-ch mode"

FIG. 16 shows still another exemplary structure of the DSP 4 for the "PCM 2-ch mode".

The DSP 4 shown in FIG. 16 is different from the DSP 4 shown in FIG. 14 in that the former includes a subtractor 20 and also includes the FIR filters 9m and 9n in the transfer function correction circuit 7 and the delay lines 10m and 10n in the reflection circuit 8, in addition to the structure of the DSP 4 shown in FIG. 14.

In FIG. 16, identical elements to those described with reference to FIG. 14 bear identical reference numerals and will not be described. The fundamental operation of the DSP 4 shown in FIG. 16 is similar to that of the DSP 4 shown in FIG. 14 and will not be described in detail.

The subtractor 20 subtracts the front R signal from the front L signal (or subtracts the front L signal from the front R signal) to generate a surround signal. The surround signal is output to the FIR filters 9m and 9n.

The FIR filters 9m and 9n and the delay lines 10m and 10n perform sound image localization control of the surround signal.

It is assumed that the front L signal includes a signal component C and a signal component L and that the front R signal includes a signal component C and a signal component R. Namely, the component of the front L signal is C+L, and the component of the front R signal is C+R. Herein, C represents a component commonly included in the front L signal and the front R signal. L represents a component which is included in the front L signal but not included in the front R signal. R represents a component which is included in the front R signal but not included in the front L signal.

The subtractor 20 subtracts the front R signal from the front L signal (or subtracts the front L signal from the front R signal), and therefore the component of the differential signal output from the subtractor 20 is L−R (or R−L).

As can be appreciated, the differential signal output from the subtractor 20 does not include the inphase component which is commonly included in the front L signal and the front R signal, but includes the component inherent in the front L signal (component L) and the component inherent in the front R signal (component R). The differential signal including the component inherent in the front L signal (component L) and the component inherent in the front R signal (component R) further improves the listener's perception of sound image localization and sound expansion. Accordingly, such a differential signal corresponds to a surround signal. Namely, the structure of the DSP 4 shown in FIG. 16 simulates the reproduction sound field provided by the speaker arrangement shown in FIG. 17 through the speakers 5*a* and 5*b* or through the headphones 6. The speaker arrangement shown in FIG. 17 is the same as the speaker arrangement shown in FIG. 11.

As described above, the DSP 4 shown in FIG. 16 generates a center signal and a surround signal from the front L signal and the front R signal, and performs sound image localization control of the center signal and the surround signal. The DSP 4 shown in FIG. 16 provides an effect similar to that of the DSP 4 provided by the DSP 4 for the "Dolby prologic mode" shown in FIG. 10.

Regarding the number of taps of the FIR filters 9*c* through 9*n*, the same conditions as those of the DSP 4 shown in FIG. 10 are applicable.

Figure 17:
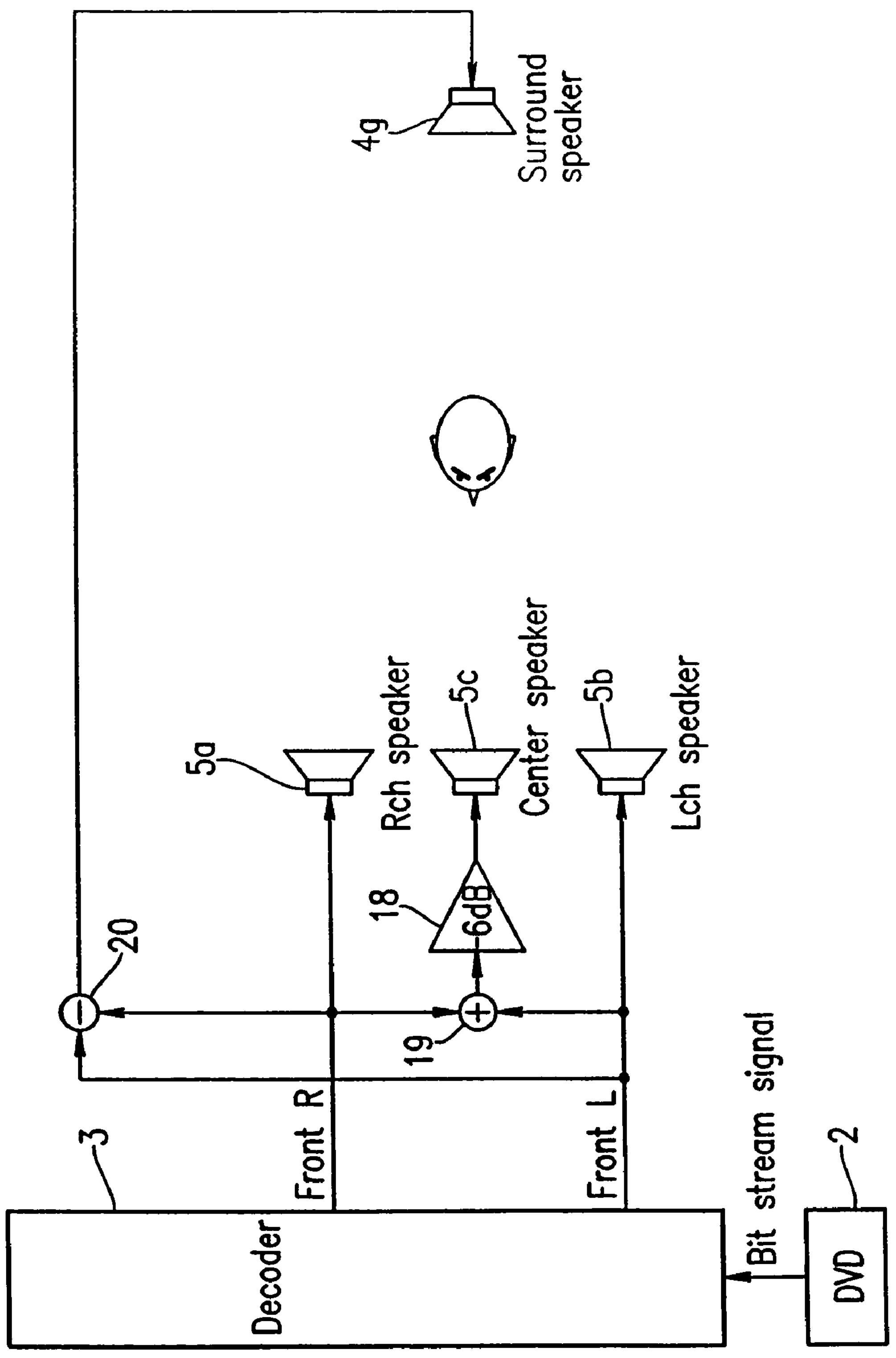
FIG. 17 shows still another exemplary arrangement of speakers to be reproduced in the case of the "PCM 2ch mode"

In the example of FIG. 17, one surround speaker 5*g* is provided to the rear of the listener as in the case of the "Dolby prologic mode". In an alternative structure, one surround speaker is provided at a rear right position and another surround speaker is provided at a rear left position with respect to the listener so as to reproduce the same surround signal. In some cases, it is recommended to use two surround speakers in this manner. In this case, the sound image localization control of the surround signal may be performed so that the acoustic characteristic of the sound from each surround speaker is reproduced by the transfer function correction circuit 7 and the reflection circuit 8.

Hereinafter, a structure of the DSP 4 in the case of the "Dolby EX mode" will be described. Dolby EX is a new multiple-channel reproduction system currently proposed by Dolby Laboratories Inc. According to Dolby EX, a surround back signal is generated from the surround L signal and the surround R signal, and a speaker for the surround back signal is added to the speaker arrangement shown in FIG. 30. Currently, it has not been decided whether Dolby EX will be adopted for the DVD Standards. The following description will be given with the expectation of Dolby EX being adopted for the DVD Standards in the future. Even if Dolby EX is not adopted for the DVD Standards, there is a possibility that Dolby EX is adopted in sound sources other than DVD. The following description is applicable to such sound sources.

Figure 18:
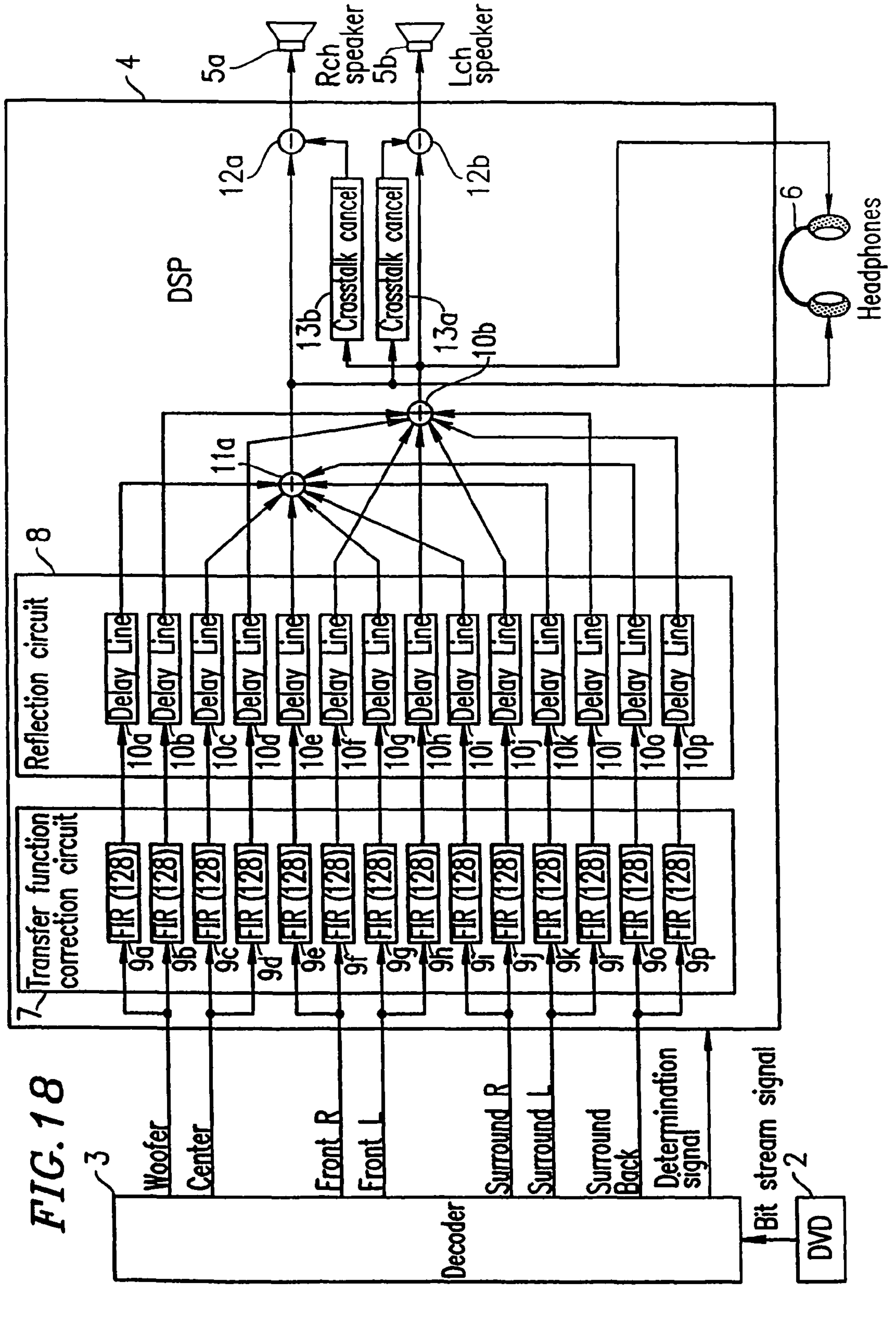
FIG. 18 is a block diagram illustrating an exemplary structure of the DSP 4 in the case of the "Dolby EX mode"

FIG. 18 shows an exemplary structure of the DSP 4 for the "Dolby EX mode".

The DSP 4 shown in FIG. 18 is different from the DSP 4 shown in FIG. 4 in that the former includes FIR filters 9*o* and 9*p* in the transfer function correction circuit 7 and the delay lines 10*o* and 10*p* in the reflection circuit 8, in addition to the structure of the DSP 4 shown in FIG. 4.

In FIG. 18, identical elements to those described with reference to FIG. 4 bear identical reference numerals and will not be described. The fundamental operation of the DSP 4 shown in FIG. 18 is similar to that of the DSP 4 shown in FIG. 4 and will not be described in detail. In the case of the "Dolby EX mode", the arrangement of speakers to be reproduced is, for example, shown in FIG. 19.

Figure 19:
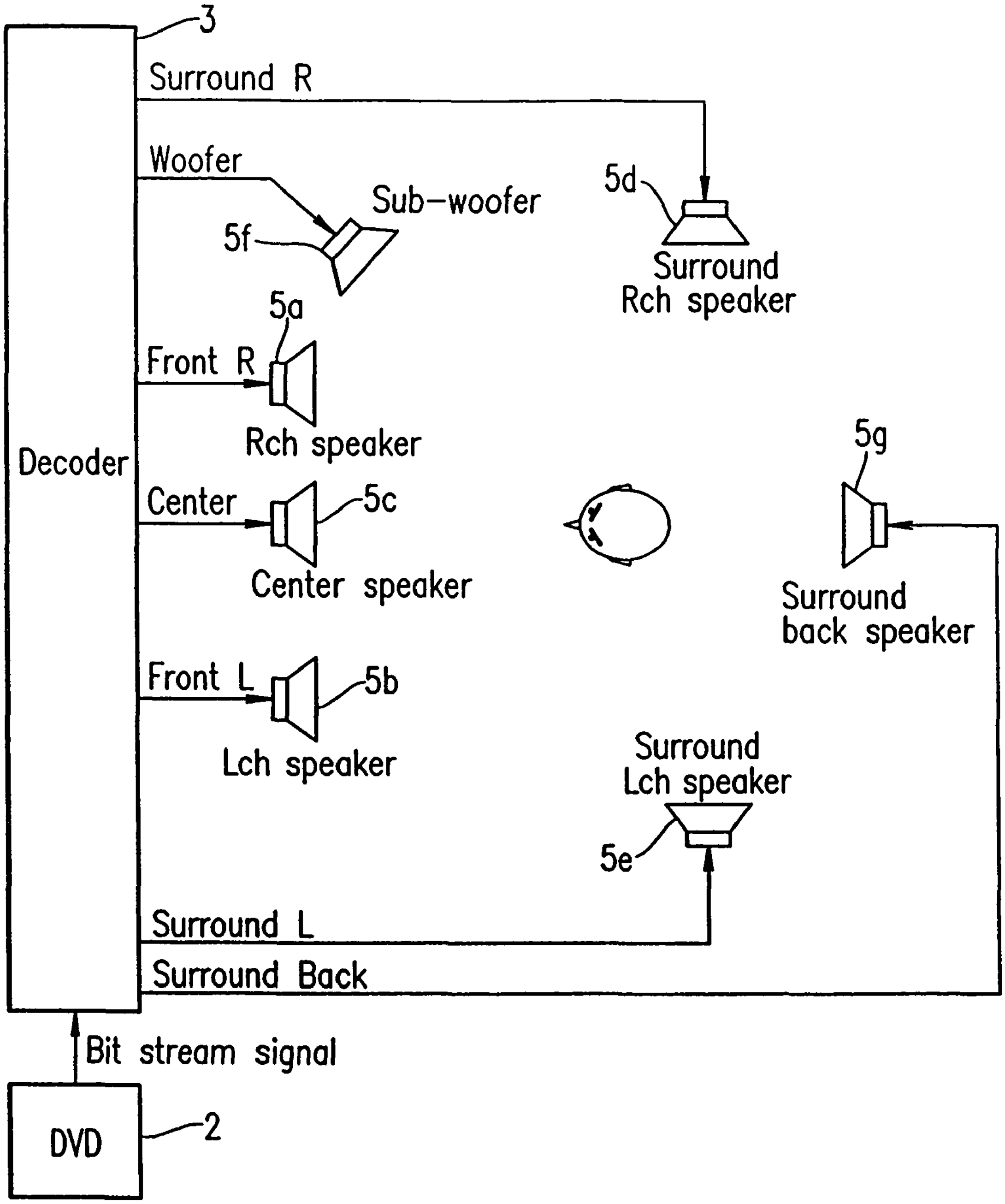
FIG. 19 shows an exemplary arrangement of speakers to be reproduced in the case of the "Dolby EX mode"

The FIR filters 9*o* and 9*p* and the delay lines 10*o* and 10*p* perform sound image localization control so that the sound field and the sound image localization reproduced by a sound back speaker 5*g* shown in FIG. 19 is realized by the speakers 5*a* and 5*b* or by the headphones 6.

In the conventional 5.1-ch modes such as Dolby AC-3 and DTS systems, only two channels (an L channel and an R channel) are provided for a surround signal. The speakers 5*d* and 5*e* for the surround signal are located at positions of ±110 degrees with respect to the listener. (Since a position exactly in front of the listener is referred to as 0 degrees, the positions of ±110 degrees are a rear right position and a rear left position with respect to the listener.) Due to such locations of the speakers 5*d* and 5*e*, when the acoustic image is at a position exactly behind the listener or in the vicinity thereof, the fixed position of the acoustic image is inside the head of the listener. In the reproduction using an actual multiple-channel speaker arrangement, the same problem occurs. The reason for this is as follows. Since the surround Rch speaker 5*d* and the surround Lch speaker 5*e* are far from each other, the phantom-image-localized speaker generated by the speakers 5*d* and 5*e* is not fixed at a position between the speakers 5*d* and 5*e* as desired, but in the head of the listener. This phenomenon is the same as the "missing of the center sound" phenomenon described with reference to FIG. 14.

In the "Dolby EX mode", the surround back speaker 5*g* is located at a position exactly behind the listener. Therefore, the "missing of the center sound" phenomenon is avoided.

The DSP 4 for the "Dolby EX mode" improves the surround sound field and the sound image localization as described above, but additionally requires the calculation amount and the memory capacitor for the FIR filters 9*o* and 9*p* and the delay lines 10*o* and 10*p* as compared to the DSP 4 shown in FIG. 4. In the example shown in FIG. 18, the FIR filters 9*a* through 9*p* each have 128 taps. Thus, the calculation amount and the memory capacitor of the FIR filters 9*a* through 9*p* correspond to 128 taps/filter×14=1792 taps.

Therefore, in the case of the "Dolby EX mode", the structure of the DSP 4 shown in FIG. 18 is used as the fundamental structure, and the calculation amount and the memory capacitor required for processing the surround back signal in the "5.1-ch mode with woofer" and the "5.1-ch mode without woofer" may be assigned to the predetermined processing (for example, sound image localization control of the center signal). Alternatively, the DSP 4 in the case of the "5.1-ch mode with woofer" may have the structure shown in FIG. 20.

In the example of FIG. 19, one surround back speaker 5*g* is provided to the rear of the listener as in the case of the "Dolby prologic mode". In an alternative structure, one surround back speaker is provided at a rear right position and another surround back speaker is provided at a rear left position with respect to the listener so as to reproduce the same surround back signal. In some cases, it is recommended to use two surround speakers in this manner. In this case, the sound image localization control of the surround back signal may be performed so that the acoustic characteristic of the sound from each surround back speaker is reproduced by the transfer function correction circuit 7 and the reflection circuit 8.

Figure 20:
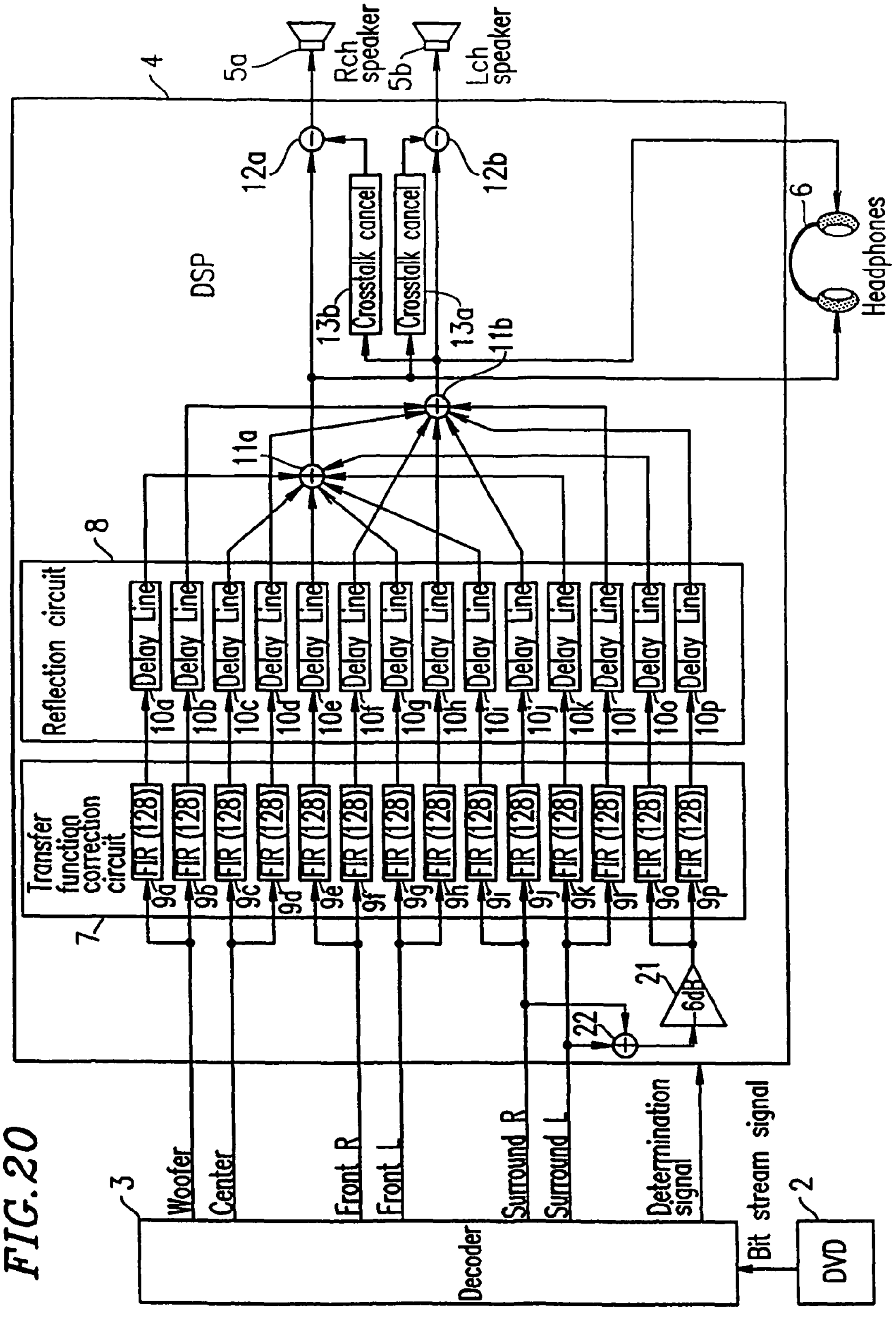
FIG. 20 is a block diagram illustrating an exemplary structure of the DSP 4 in the case of the "5.1-ch mode with woofer"

FIG. 20 shows an exemplary structure of the DSP 4 for the "5.1-ch mode with woofer".

The DSP 4 shown in FIG. 20 is different from the DSP 4 shown in FIG. 4 in that the former includes an adder 22 and a level adjuster 21, and also includes FIR filters 9*o* and 9*p* in the transfer function correction circuit 7 and the delay lines 10*o* and 10*p* in the reflection circuit 8, in addition to the structure of the DSP 4 shown in FIG. 4.

In FIG. 20, identical elements to those described with reference to FIG. 4 bear identical reference numerals and will not be described. The fundamental operation of the DSP 4 shown in FIG. 20 is similar to that of the DSP 4 shown in FIG. 4 and will not be described in detail. The adder 22 adds the surround L signal and the surround R signal to generate a surround back signal. The level adjuster 21 performs level adjustment of the surround back signal to output the post-level adjustment surround back signal to the FIR filters 9*o* and 9*p*.

The FIR filters 9*o* and 9*p* and the delay lines 10*o* and 10*p* perform sound image localization control of the post-level adjustment surround back signal.

It is assumed that the surround L signal includes a signal component SB and a signal component SL and that the surround R signal includes a signal component SB and a signal component SR. Namely, the component of the surround L signal is SB+SL, and the component of the surround R signal is SB+SR. Herein, SB represents a component commonly included in the surround L signal and the surround R signal. SL represents a component which is included in the surround L signal but not included in the surround R signal. SR represents a component which is included in the surround R signal but not included in the surround L signal.

The adder 22 adds the surround L signal and the surround R signal, and therefore the component of the addition signal output from the adder 22 is 2SB+SL+SR. The level adjuster 21 attenuates the level of the addition signal to ½, and thus the components of the signal output from the level adjuster 21 is SB+(SL+SR)/2.

As can be appreciated, the signal output from the level adjuster 21 has the inphase component which is commonly included in the surround L signal and the surround R signal emphasized. The inphase component which is commonly included in the surround L signal and the surround R signal is a component phantom-image-localized as a composite sound between the surround Rch speaker 5*d* and the surround Lch speaker 5*e* shown in FIG. 21 for performing 5.1-ch reproduction. Namely, the structure of the DSP 4 shown in FIG. 20 simulates the reproduction sound field provided by the speaker arrangement shown in FIG. 21 through the speakers 5*a* and 5*b* or through the headphones 6.

Figure 21:
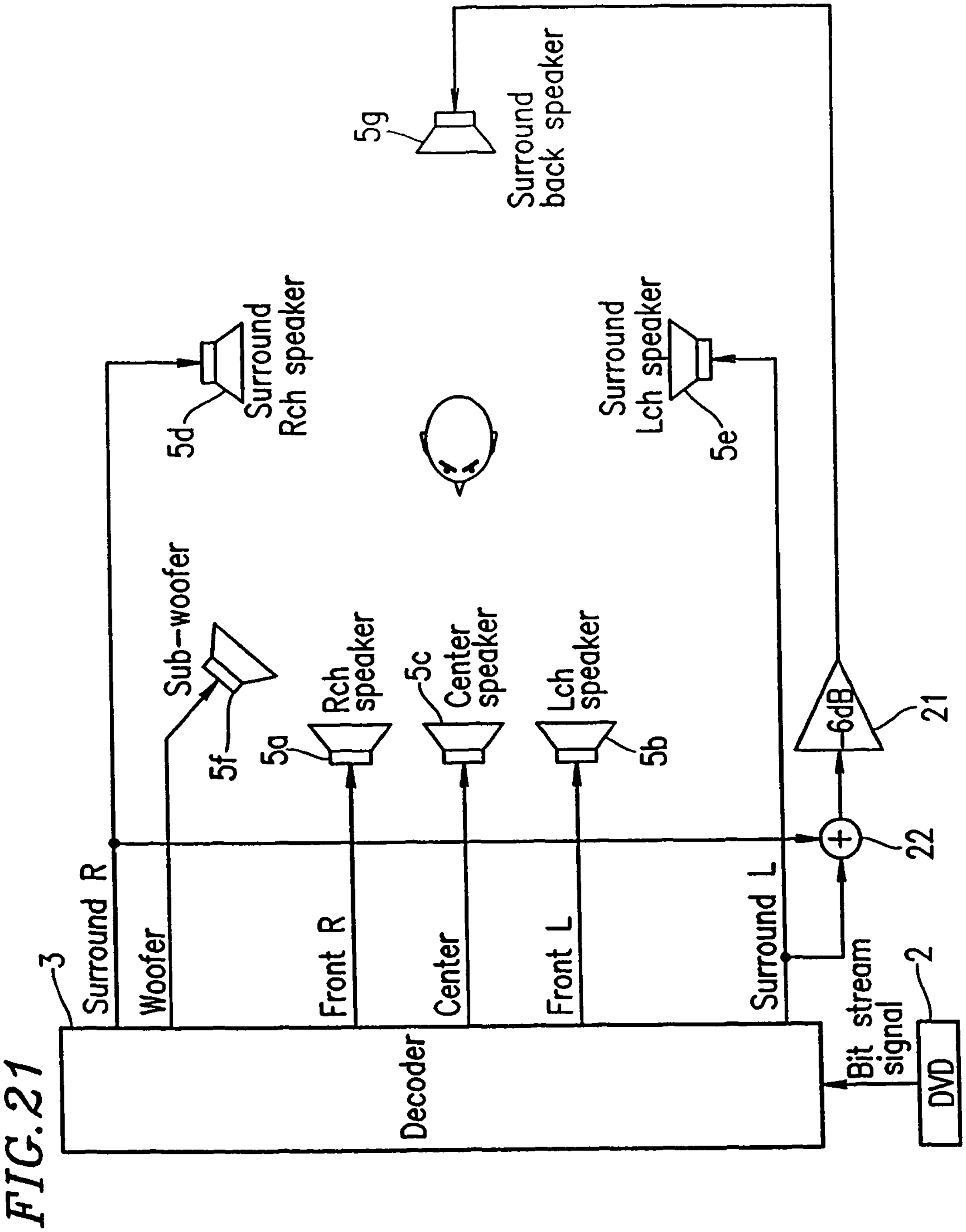
FIG. 21 shows an exemplary arrangement of speakers to be reproduced in the case of the "5.1-ch mode with woofer"

The speaker arrangement shown in FIG. 21 causes the listener to better perceive that the sound image is localized since it reproduces the surround back signal by the surround back speaker 5*g*. For reproducing the surround back signal by the speakers 5*a* and 5*b*, or by the headphones 6, it is significantly more effective to first generate the surround back signal and then perform sound image localization control of the surround back signal using the FIR filters 9*o* and 9*p* as shown in FIG. 20 than to perform sound image localization control of the surround Rch speaker and the surround Lch speaker using the FIR filters 9*i* through 9*l* and then phantom-image-localize the surround back sound as shown in FIG. 4.

Figure 30:
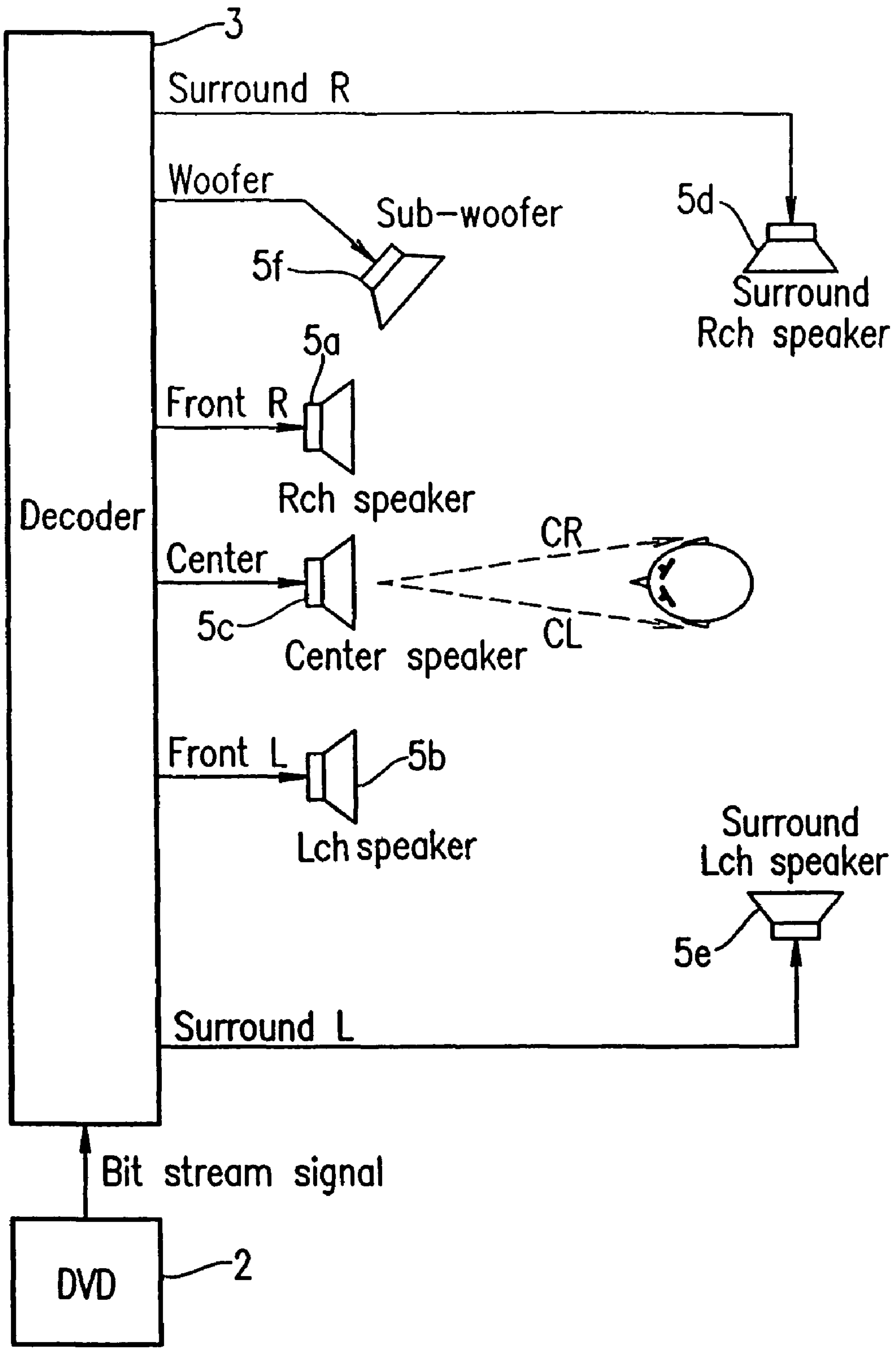
FIG. 30 shows an arrangement of speakers for reproducing 5.1-channel audio signals using the conventional signal processing apparatus.
Figure 31:
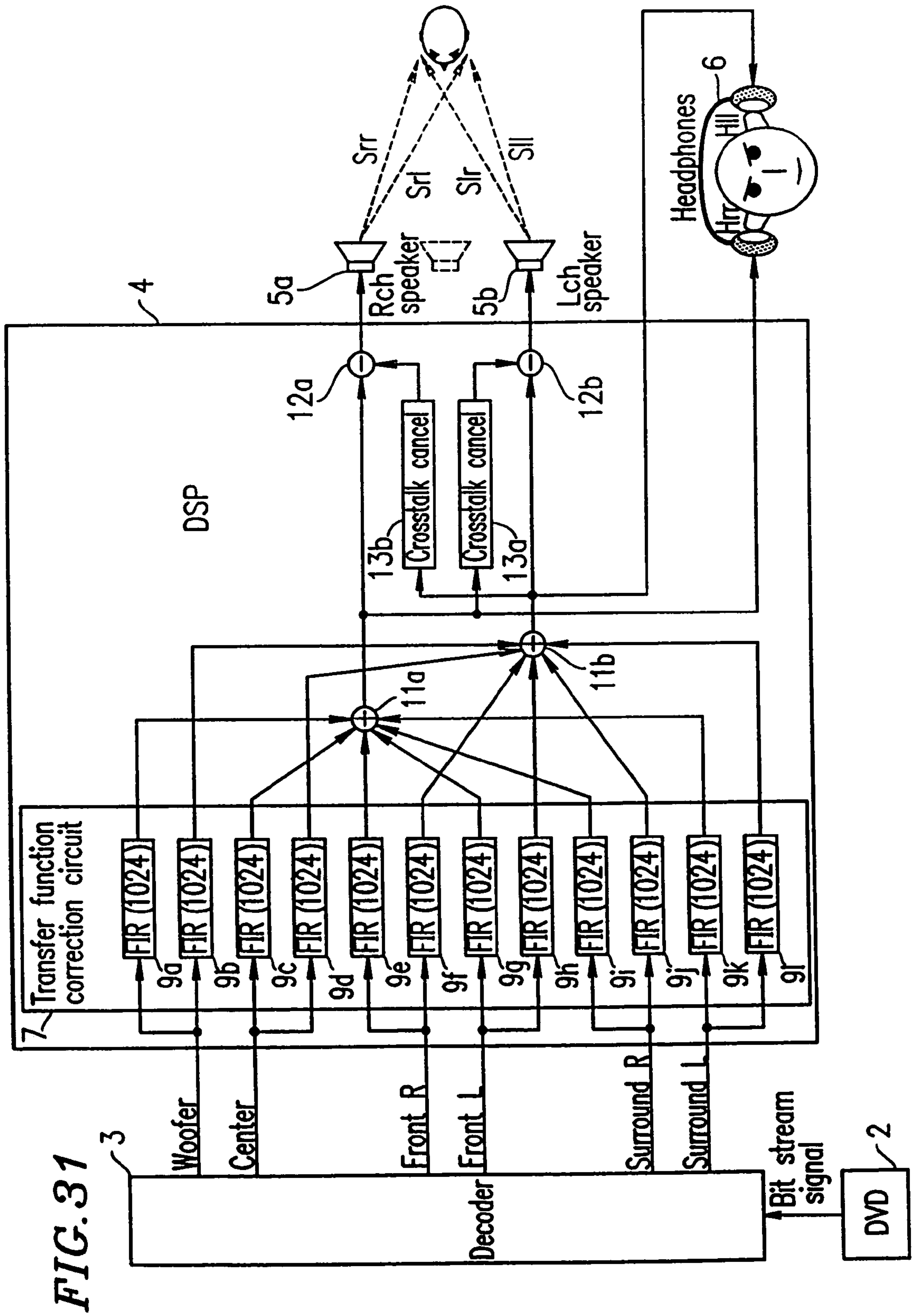
FIG. 31 is a block diagram illustrating a structure of another conventional signal processing apparatus.
Figure 32:
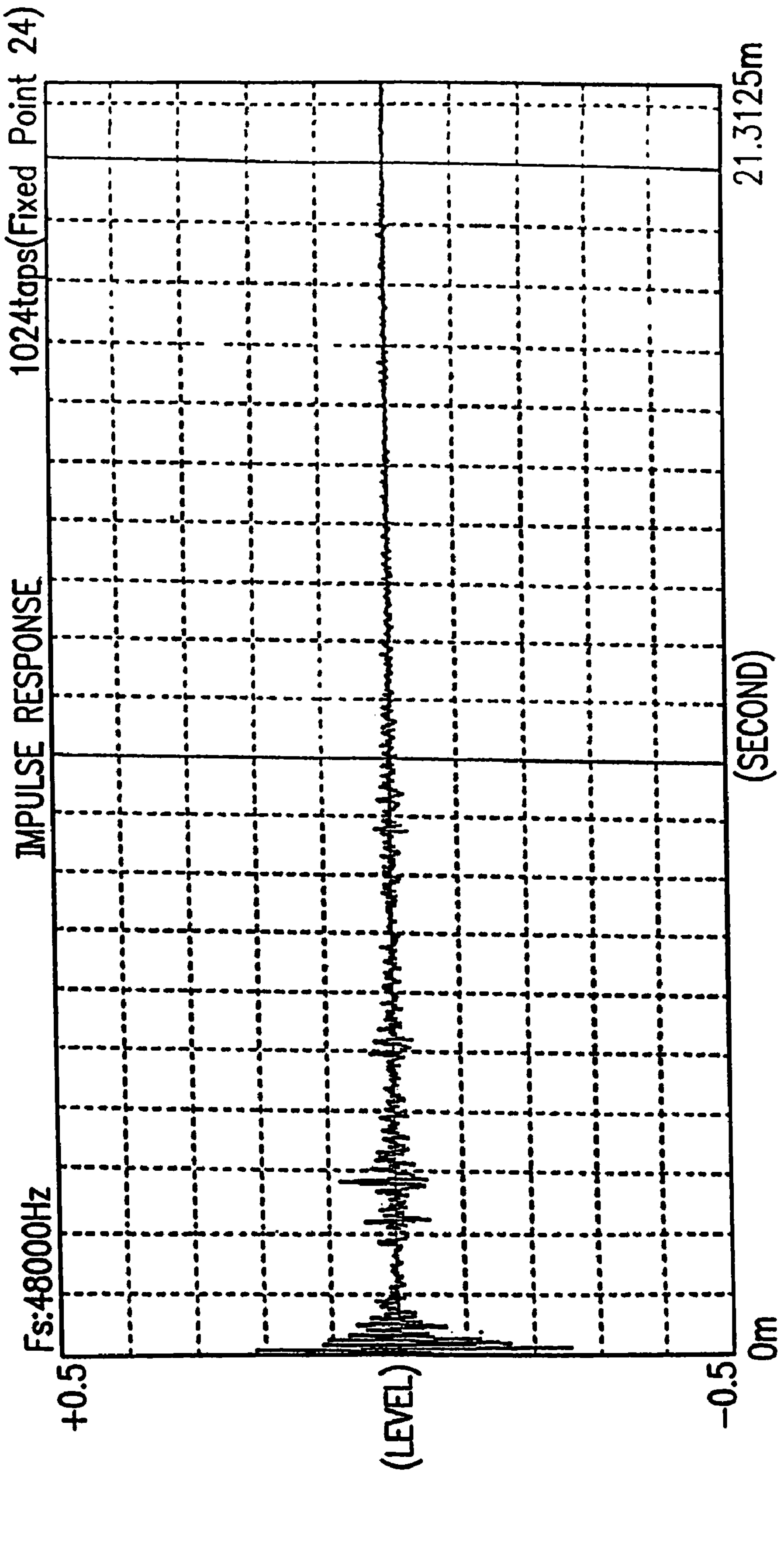
FIG. 32 shows coefficients of FIR filters included in the transfer function correction circuit 7 in the conventional signal processing apparatus shown in FIG. 31.
Figure 33:
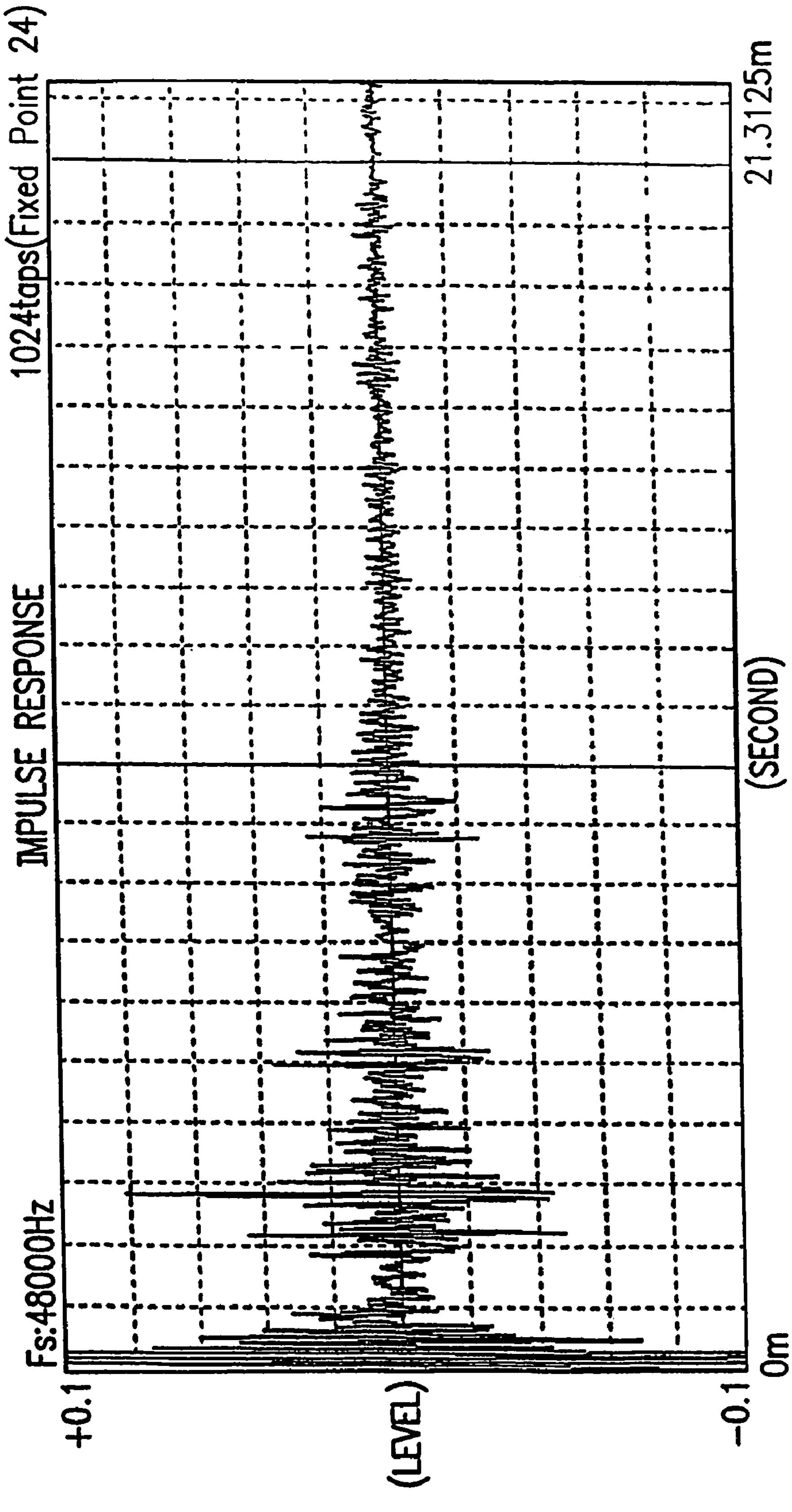
FIG. 33 shows the coefficients of FIR filters included in the transfer function correction circuit 7 in the conventional signal processing apparatus shown in FIG. 31.

In the case where the surround Rch speaker and the surround Lch speaker in FIG. 30 are excessively far from each other, the surround back sound generated at the phantom-image-localized speaker is not well reproduced, resulting in a so-called "missing of the center sound" phenomenon. By contrast, the structure shown in FIG. 21 reproduces the surround back sound from the actual speaker 5*g*, and therefore the "missing of the center sound" phenomenon does not occur. The structure shown in FIG. 21 also allows the Rch speaker 5*d* and the Lch speaker 5*e* to be significantly far from each other, and therefore the listener's perception of sound image localization and sound expansion is further improved.

As described above, the DSP 4 shown in FIG. 20 generates a surround back signal from the surround L signal and the surround R signal and performs sound image localization control of the surround back signal. The DSP 4 shown in FIG. 20, although in the "5.1-ch mode with woofer", can provide an effect similar to that of the "Dolby EX mode".

In the example of FIG. 21, one surround back speaker 5*g* is provided to the rear of the listener as in the case of the "Dolby EX mode". In an alternative structure, one surround back speaker is provided at a rear right position and another surround back speaker is provided at a rear left position with respect to the listener so as to reproduce the same surround back signal. In some cases, it is recommended to use two surround speakers in this manner. In this case, the sound image localization control of the surround back signal may be performed so that the acoustic characteristic of the sound from each surround back speaker is reproduced by the transfer function correction circuit 7 and the reflection circuit 8.

Figure 22:
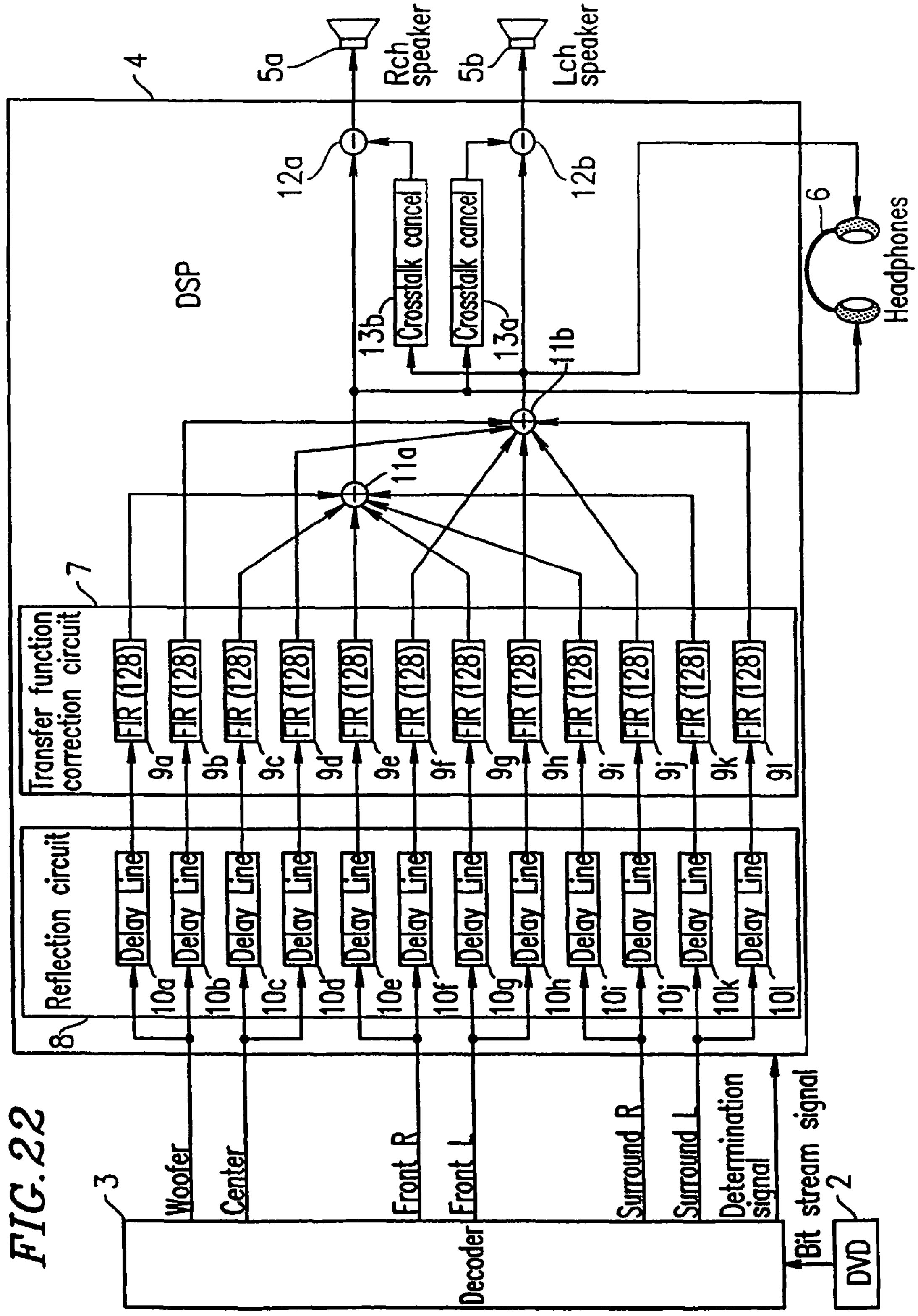
FIG. 22 shows a variation of the structure of the transfer function correction circuit 7 and the reflection circuit 8 in the DSP 4.

In the first example, as shown in FIG. 4, the DSP 4 processes the output signal from the transfer function correction circuit 7 by the reflection circuit 8. The structure of the DSP 4 is not limited to this. The transfer function correction circuit 7 and the reflection circuit 8 may be provided in the opposite order. Namely, as shown in FIG. 22, the DSP 4 may have a structure of processing the output signals from the reflection circuit 8 by the transfer function correction circuit 7. This is also applicable to the DSP 4 shown in FIGS. 8, 10, 12, 14, 16, 18 and 20.

Figure 23:
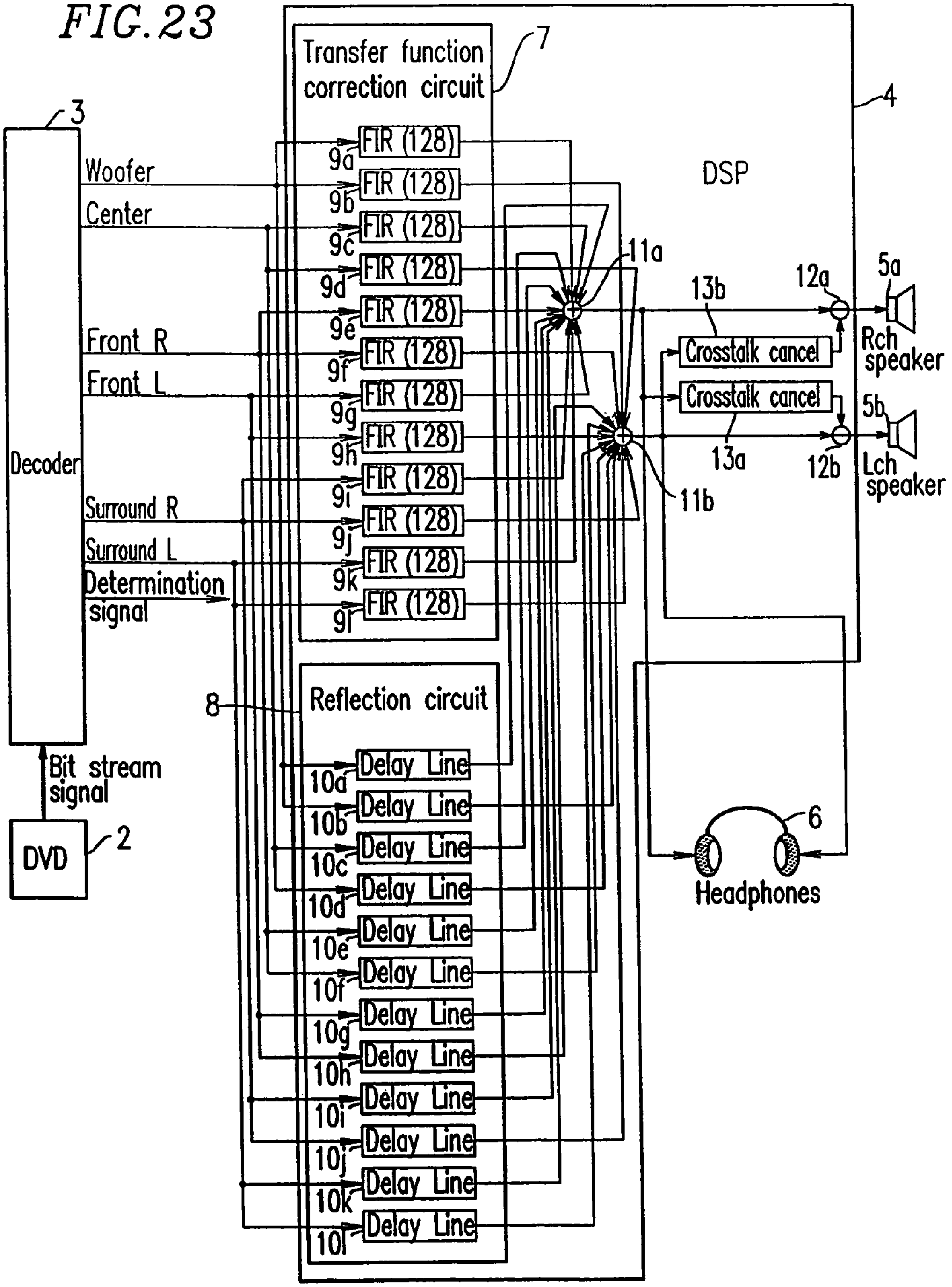
FIG. 23 shows another variation of the structure of the transfer function correction circuit 7 and the reflection circuit 8 in the DSP 4.
Figure 24:
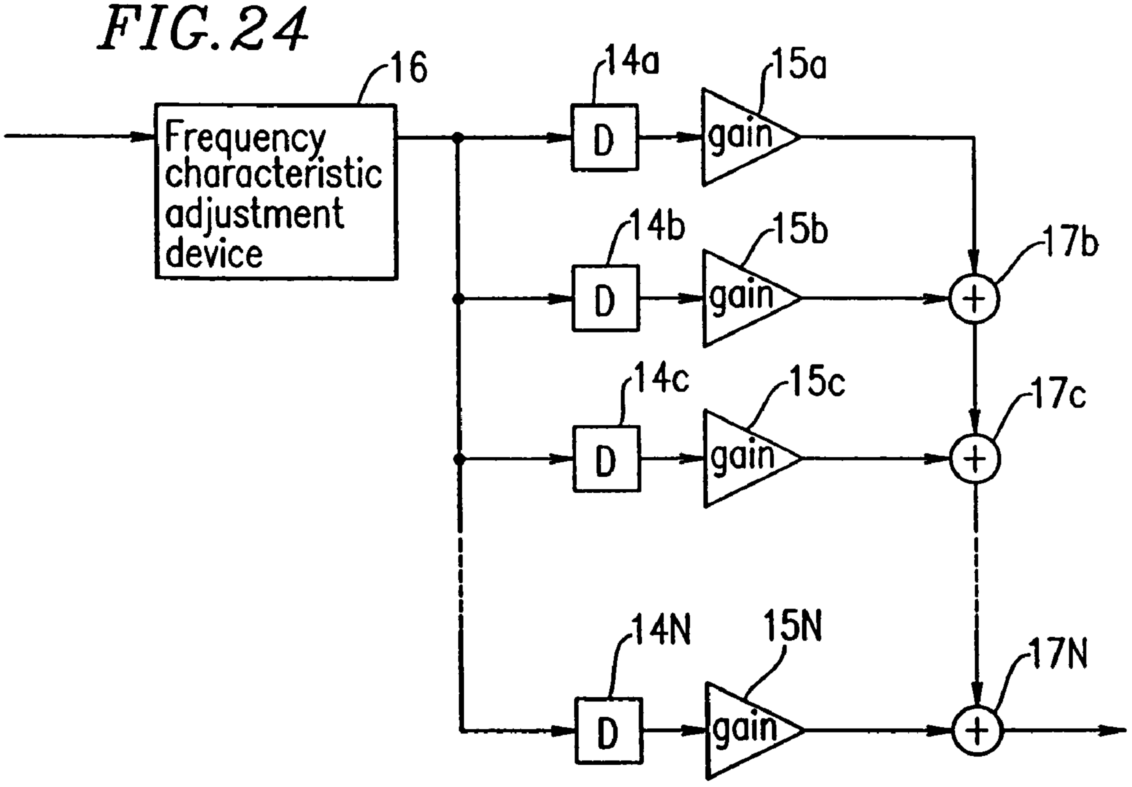
FIG. 24 is a block diagram illustrating an internal structure of a delay line included in the reflection circuit 8.

In the first example, as shown in FIG. 4, the transfer function correction circuit 7 and the reflection circuit 8 are connected in series. The structure of the DSP 4 is not limited to this. As shown in FIG. 23, the DSP 4 may include the transfer function correction circuit 7 and the reflection circuit 8 which are connected in parallel. In this case, the reflection circuit 8 needs to have a structure as shown in FIG. 24. This is also applicable to the DSP 4 shown in FIGS. 8, 10, 12, 14, 16, 18 and 20.

In the first example, the decoder 3 and the DSP 4 have independent circuit configurations from each other. The present invention is not limited to this. The DSP 4 may include a function of the decoder 3.

In the first example, the DVD player 2 and the DSP 4 have independent circuit configurations from each other. The present invention is not limited to this. The DVD player 2 may include functions of the decoder 3 and the DSP 4.

In the first example, the DVD player (DVD-Video DVD-Audio) acts as the sound source 2. The sound source 2 is not limited to the DVD player. The sound source 2 may be an STB (set top box) for digital broadcasting or, in the future, may be a device for performing electronic data distribution.

The audio codec of the multiple-channel signals is not limited to the AC-3, DTS or Dolby prologic system. Any audio codec, such as MPEG2 or MC, may be used so long as the system handles multiple-channel signals and the sound image localization control is set so as to provide an optimum mode and an optimum calculation amount for the number of channels.

In the first example, the total calculation amount of the signal processing performed by the DSP 4 is adjusted by the number of taps of each of the filters included in the transfer function correction circuit 7. Alternatively, the total calculation amount may be adjusted by the number (N) of delay devices and the number (N) of the level adjusters included in each of the delay lines in the reflection circuits 8. In other words, the total calculation amount may be adjusted by increasing or decreasing the number of the reflection components.

In the first example, the program is selected or switched so that the calculation amount performed by the DSP 4 is controlled in accordance with the audio codec or the number of channels among various input attributes. The program may be selected or switched so that the calculation amount performed by the DSP 4 is controlled in accordance with the sampling frequency. For example, when the sampling frequency is lowered, the calculation remainder is generated in the calculation time. Therefore, the number of taps or the number of reflection components may be increased so as to enhance the calculation precision. Alternatively, the calculation remainder may be assigned to other types of processing (for example, a reverberation function or a key control function in a "karaoke" device, or equalizer processing for sound quality adjustment).

Figure 38:
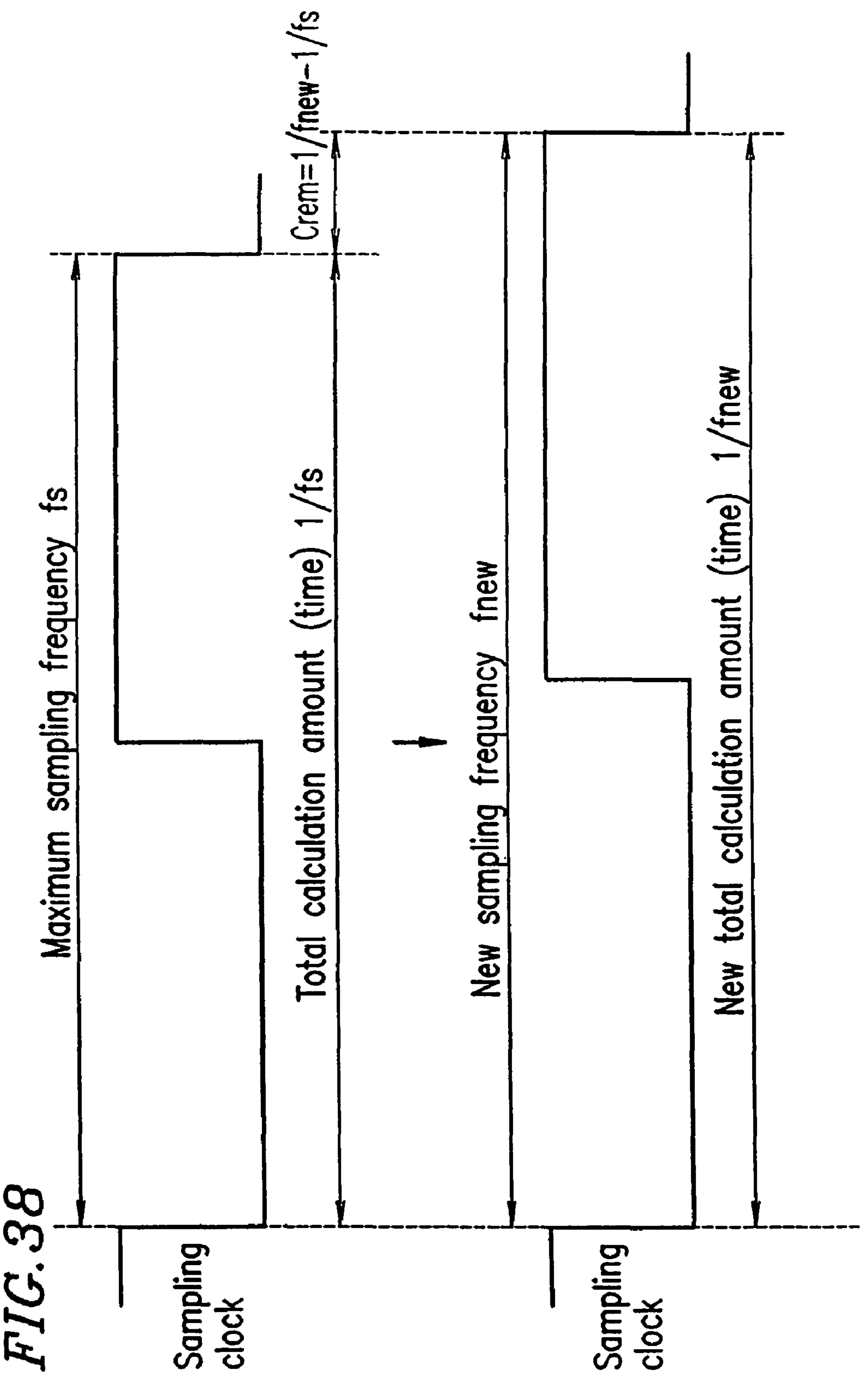
FIG. 38 schematically shows how a calculation remainder generated by a change in an input attribute of an input signal (the sampling frequency) is assigned to processing of the input signal.

FIG. 38 schematically shows how the calculation remainder generated by the change in the input attribute of the input signal (sampling frequency) is assigned to processing of the input signal.

It is assumed that a maximum sampling frequency in the DSP 4 is fs. When the sampling frequency is fs, the calculation time (the total calculation amount) of the DSP 4 is 1/fs. When the sampling frequency is reduced to a new sampling frequency fnew, the calculation time (the total calculation amount) of the DSP 4 is 1/fnew. Where the calculation remnant generated by the reduction in the sampling frequency is Crem, Crem=1/fnew−1/fs.

As described above, when the input attribute is changed so as to reduce the sampling frequency, the DSP 4 assigns at least a part of the calculation remnant generated by the reduction in the sampling frequency to processing of the input signal. Thus, the calculation remnant, which is excessive, can be effectively utilized. The calculation remnant Crem may be arbitrarily used.

The new calculation time (total calculation amount) 1/fnew after the input attribute of the input signal is changed is sufficient as long as it is 1/fs or more.

In the first example, the sound image localization control is mainly described as an example of signal processing. The present invention is not limited to this but is applicable to any other type of signal processing.

Example 2

Figure 25:
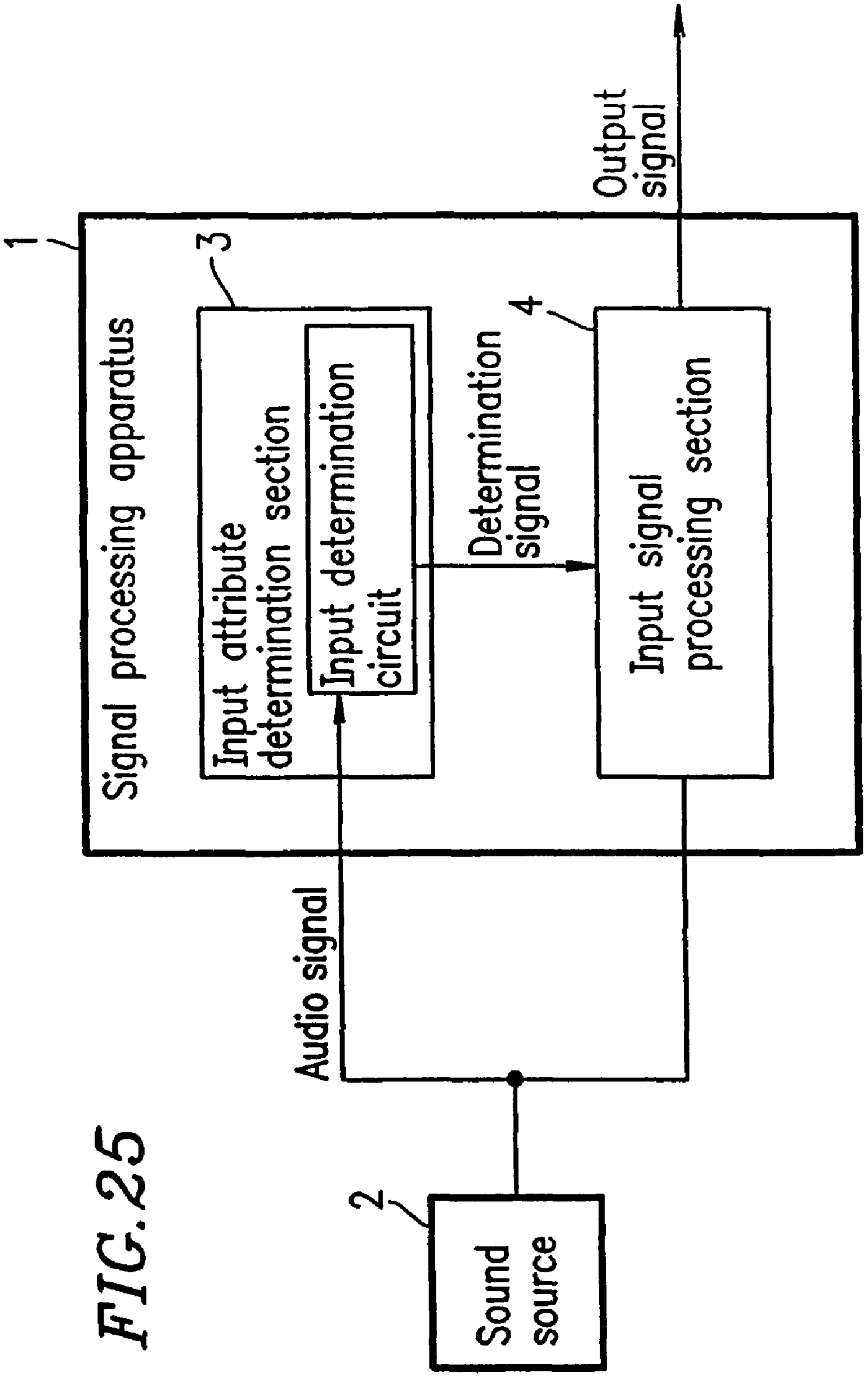
FIG. 25 is a block diagram illustrating an exemplary schematic structure of a signal processing apparatus 1 according to a second example of the present invention.

FIG. 25 shows an exemplary schematic structure of a signal processing apparatus 1 according to a second example of the present invention.

The signal processing apparatus 1 includes an input attribute determination section 3 for determining an input attribute of an input signal, and an input signal processing section 4 for processing the input signal.

A sound source 2 outputs multiple-channel audio signals to the input attribute determination section 3 and to the input signal processing section 4.

The input attribute determination section 3 includes an input determination circuit for receiving the multiple-channel audio signals from the sound source 2 as an input signal and for detecting the level of each of the multiple-channel audio signals to determine the input attribute of the input signal (for example, the number of channels of the audio signals). The determination result provided by the input determination circuit is output to the input signal processing section 4 as a determination signal.

The input signal processing section 4 receives the multiple-channel audio signals from the sound source 2 as an input signal, receives the determination signal from the input determination circuit, and processes the multiple-channel audio signals based on the determination signal. The multiple-channel audio signals processed by the input signal processing section 4 are output from the input signal processing section 4 as an output signal.

The signal processing for each input attribute is performed so that the contents of the signal processing is changed in accordance with the type of input attribute but the total calculation amount of the signal processing is substantially constant. For example, when one input attribute has a smaller number of channels, the calculation amount assigned per channel can be increased. In this manner, the effect of the signal processing can be improved or additional functions other than signal processing, which was originally to be provided, can also be provided.

In the example shown in FIG. 25, unlike the examples shown in FIGS. 1 and 3, input attribute information is not read from a recording medium or a decoder. Instead, the number of channels is determined by detecting the level of each of the multiple-channel audio signals decoded. Therefore, even an analog output signal from an DVD-Audio player or a CD player can be handled.

Hereinafter, the structure and operation of the signal processing apparatus 1 will be described in more detail using sound image localization control as an exemplary signal processing process performed by the signal processing apparatus 1.

Figure 26:
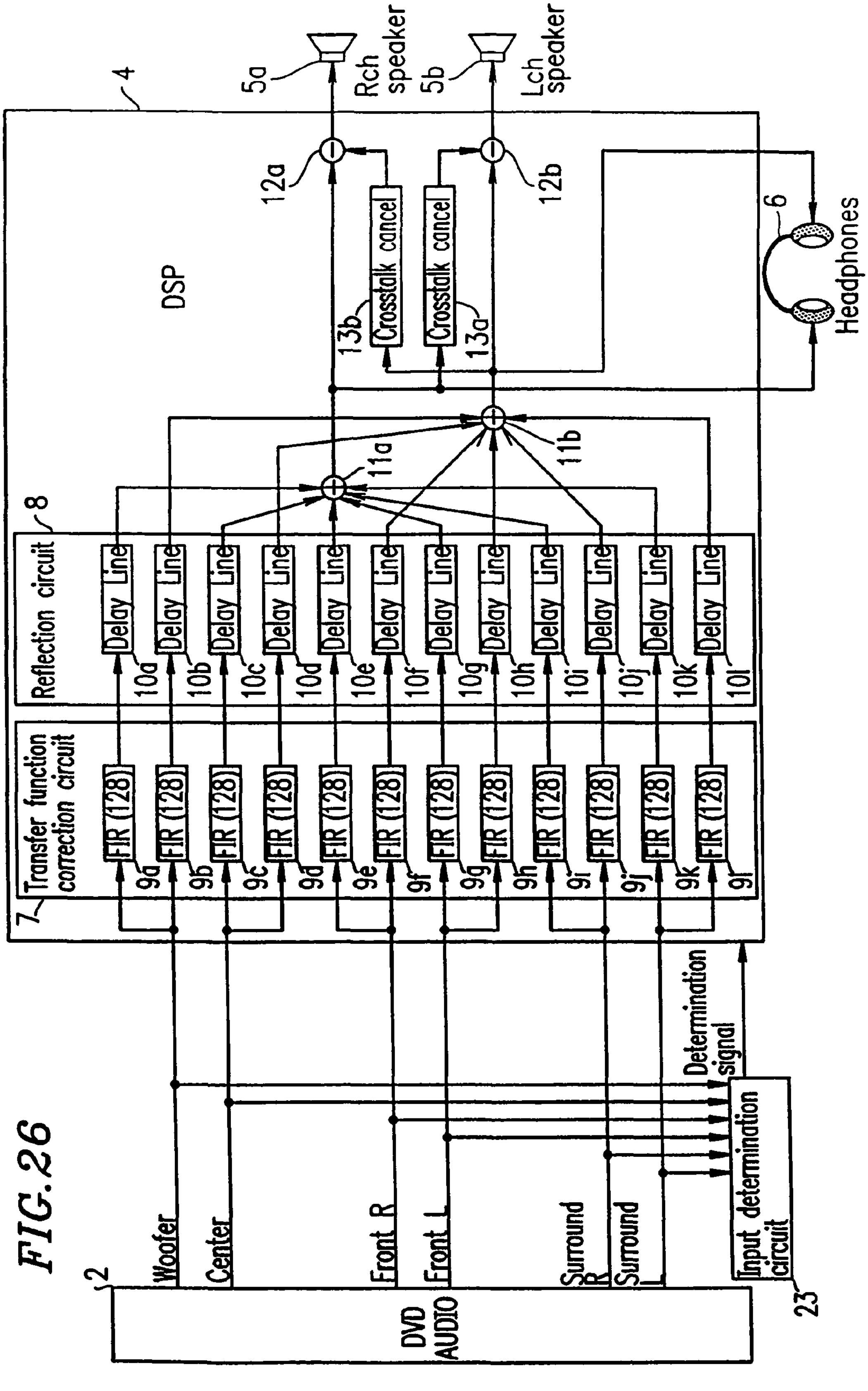
FIG. 26 is a block diagram illustrating an exemplary detailed structure of the signal processing apparatus 1 shown in FIG. 25.

FIG. 26 shows an exemplary detailed structure of the signal processing apparatus 1 shown in FIG. 25.

The signal processing apparatus 1 shown in FIG. 26 includes an input determination circuit 23 acting as the input attribute determination section 3 and a DSP (digital signal processor) acting as the input signal processing section 4. Instead of the DSP, an MPU (microprocessor unit) may be used.

The input determination circuit 23 receives multiple-channel audio signals from a DVD-Audio player acting as the sound source 2 as an input signal and generates a determination signal based on the level of each of the multiple-channel audio signals. The determination signal represents the determination result of the input attribute of the input signal.

The DSP 4 receives the multiple-channel audio signals from the sound source 2 as an input signal and performs the sound image localization control of the multiple-channel audio signals. The DSP 4 includes a transfer function correction circuit 7 and a reflection circuit 8.

The transfer function correction circuit 7 includes FIR filters 9*a* through 9*l*. The transfer function correction circuit 7 performs predetermined processing of multiple-channel audio signals which are output from the DVD-Audio player 2 and outputs output signals representing the processing results to the reflection circuit 8.

The reflection circuit 8 includes delay lines 10*a* through 10*l*. The reflection circuit 8 performs predetermined processing on the output signals from the transfer function correction circuit 7 and outputs output signals representing the processing results.

An adder 11*a* adds a part of the output signals from the reflection circuit 8 and outputs the resultant addition signal to the speaker 5*a* or the headphones 6.

An adder 11*b* adds a part of the output signals from the reflection circuit 8 and outputs the resultant addition signal to the speaker 5*b* or the headphones 6.

Subtractors 12*a* and 12*b* and crosstalk cancel circuits 13*a* and 13*b* have functions described above with reference to FIG. 34.

An amplifier used for reproducing the sound using the speakers 5*a* and 5*b* and the headphones 6 is omitted from FIG. 26.

The functions of the transfer function correction circuit 7, the reflection circuit 8, the adders 11*a* and 11*b*, the subtractors 12*a* and 12*b*, and the crosstalk cancel circuits 13*a* and 13*b* are implemented by a single program or a plurality of programs executed by the DSP 4.

The structure of the DSP 4 shown in FIG. 26 is fundamentally similar to that of the DSP 4 of FIG. 4. Therefore, the sound image localization control will not be described in detail.

The DSP 4 shown in FIG. 26 is different from the DSP 4 shown in FIG. 4 in that the former receives the determination signal representing the determination results of the input attribute of the input signal (for example, the number of channels of the audio signals) from the input determination circuit decoder 23, instead of the decoder 3 shown in FIG. 4, and alters the type of processing to be performed on the multiple-channel audio signals based on the determination signal. For example, the input determination circuit 23 performs the optimum sound image localization control for the number of channels of the audio signals.

For example, the input determination circuit 23 detects the level of each of the plurality of analog signals output from the DVD-Audio player 2, and determines the number of channels in which the signals are present based on the detected levels. The reason why the number of channels is determined by detecting the level of each analog signal decoded is because in the case of DVD-Audio, the digital output has not been defined unlike DVD-Video. When a conventional sound source such as a CD player or an FM radio, the structure of FIG. 26 is required in order to handle analog signals.

As described above, use of the input determination circuit 26 allows the signal processing apparatus 1 to handle analog signals from the DVD-Audio player or a conventional CD player.

The structure shown in FIG. 26 is used for the "5.1-ch mode with woofer". The DSP 4 has a function of changing its own structure (for example, the structure of the transfer function correction circuit 7 or the reflection circuit 8) in accordance with the mode of the sound image localization control corresponding to the current number of channels. Such a change of the structure of the DSP 4 can be achieved by, for example, changing the program to be executed by the DSP 4.

As described in the first example, the sound image localization control can be performed in four modes of "5.1-ch mode without woofer", "Dolby prologic mode", "PCM 2-ch mode" and "Dolby EX mode", in addition to the "5.1-ch mode with woofer". The operation of the DSP 4 can be switched between these modes in accordance with the current number of channels.

In the DSP 4 shown in FIG. 26, the transfer function correction circuit 7 and the reflection circuit 8 may be provided in the opposite order. Namely, as shown in FIG. 22, the DSP 4 may have a structure of processing the output signals from the reflection circuit 8 by the transfer function correction circuit 7.

In the second example, the transfer function correction circuit 7 and the reflection circuit 8 are connected in series. The structure of the DSP 4 is not limited to this. As shown in FIG. 23, the DSP 4 may include the transfer function correction circuit 7 and the reflection circuit 8 which are-connected in parallel. In this case, the reflection circuit 8 needs to have a structure as shown in FIG. 24.

In the second example, the input determination circuit 23 and the DSP 4 have independent circuit configurations from each other. The present invention is not limited to this. The DSP 4 may include a function of the input determination circuit 23.

In the second example, the DVD player 2 and the DSP 4 have independent circuit configurations from each other. The present invention is not limited, to this. The DVD player 2 may include functions of the input determination circuit 23 and the DSP 4.

In the second example, the DVD-Audio player acts as the sound source 2. The sound source 2 is not limited to the DVD-Audio player. The sound source 2 may be an STB (set top box) for digital broadcasting or, in the future, may be a device for performing electronic data distribution.

In the second example, the total calculation amount of the signal processing performed by the DSP 4 is adjusted by the number of taps of each of the FIR filters included in the transfer function correction circuit 7. Alternatively, the total calculation amount may be adjusted by the number (N) of delay devices and the number (N) of the level adjusters included in each of the delay lines in the reflection circuits 8. In other words, the total calculation amount may be adjusted by increasing or decreasing the number of the reflection components.

As described above with reference to FIGS. 37 and 38, the total calculation amount is sufficient as long as it is Cmax·Nx/Nmax or more, or 1/fs or more.

In the second example, sound image localization control is described as an example. The present invention is not limited to this type of signal processing. The present invention is applicable to, for example, a reverberation function in a "karaoke" device, or equalizer processing for sound quality adjustment.

Example 3

Figure 27:
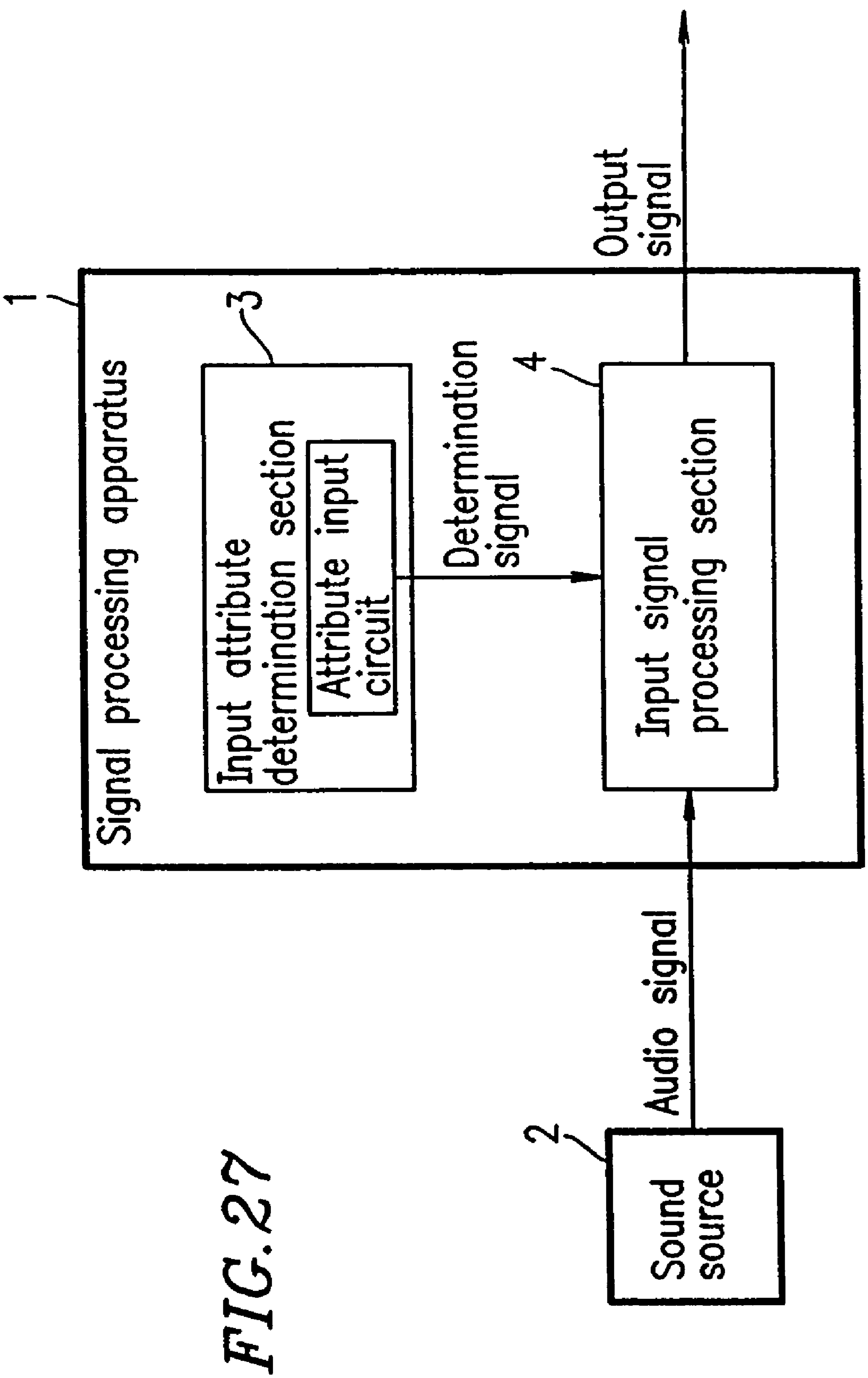
FIG. 27 is a block diagram illustrating an exemplary schematic structure of a signal processing apparatus 1 according to a third example of the present invention.

FIG. 27 shows an exemplary schematic structure of a signal processing apparatus 1 according to a third example of the present invention.

The signal processing apparatus 1 includes an input attribute determination section 3 for determining an input attribute of an input signal, and an input signal processing section 4 for processing the input signal.

A sound source 2 outputs multiple-channel audio signals to the input signal processing section 4.

The input attribute determination section 3 includes an attribute input circuit for allowing the user to input, to the signal processing circuit 1, input attribute information representing an input attribute of the input signal (at least one of the type of the audio codec, the sampling frequency, and the number of channels of multiple-channel audio signals). The attribute determination circuit determines the input attribute based on the input attribute information input by the user. The determination result provided by the attribute input circuit is output to the input signal processing section 4 as a determination signal.

The input signal processing section 4 receives the multiple-channel audio signals from the sound source 2 as ah input signal, receives the determination signal from the attribute input circuit, and processes the multiple-channel audio signals based on the determination signal. The multiple-channel audio signals processed by the input signal processing section 4 are output from the input signal processing section 4 as an output signal.

The signal processing for each input attribute is performed so that the contents of the signal processing is changed in accordance with the type of input attribute but the total calculation amount of the signal processing is substantially constant. For example, when one input attribute has a smaller number of channels, the calculation amount assigned per channel can be increased. In this manner, the effect of the signal processing can be improved or additional functions other than signal processing, which was originally to be provided, can also be provided.

In the example shown in FIG. 27, unlike the examples shown in FIGS. 1, 3 and 25, the user (viewer/listener) inputs the input attribute of the input signal to the signal processing apparatus 1 himself/herself.

Hereinafter, the structure and operation of the signal processing apparatus 1 will be described in more detail using sound image localization control as an exemplary signal processing process performed by the signal processing apparatus 1.

Figure 28:
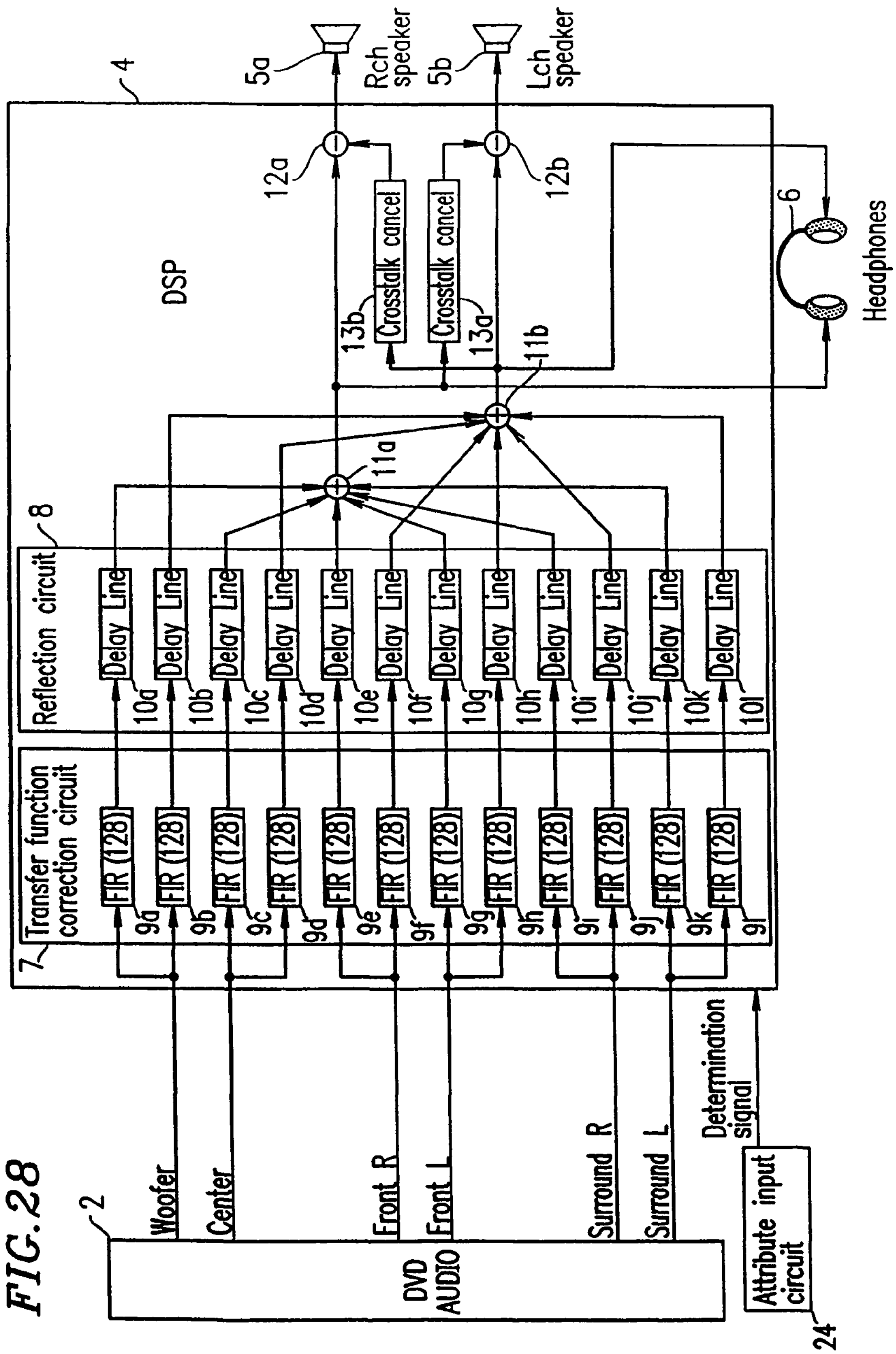
FIG. 28 is a block diagram illustrating an exemplary detailed structure of the signal processing apparatus 1 shown in FIG. 27.
Figure 29:
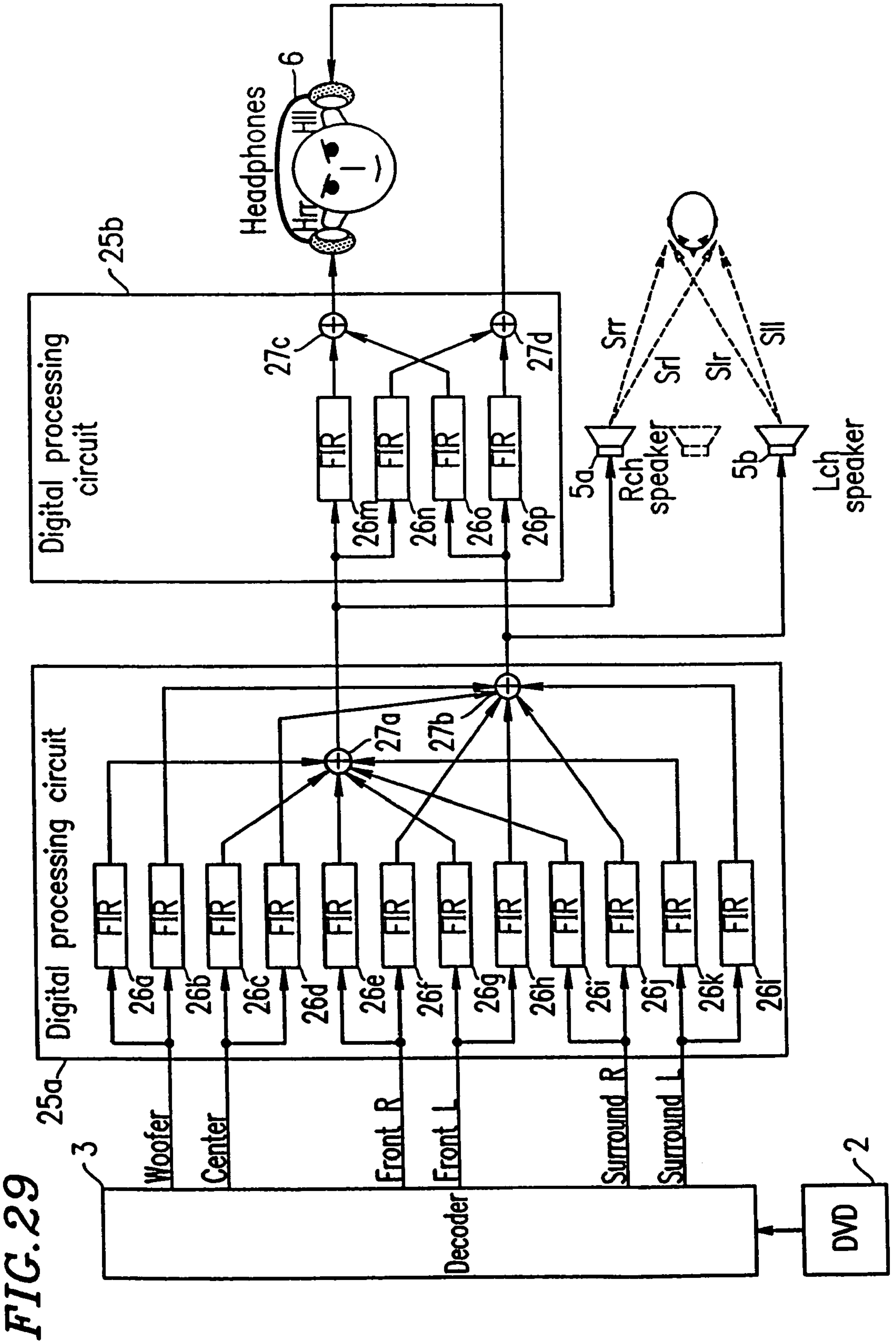
FIG. 29 is a block diagram illustrating a structure of a conventional signal processing apparatus.

FIG. 28 shows an exemplary detailed structure of the signal processing apparatus 1 shown in FIG. 27.

The signal processing apparatus 1 shown in FIG. 28 includes an attribute input circuit 24 acting as the input attribute determination section 3 and a DSP (digital signal processor) acting as the input signal processing section 4. Instead of the DSP, an MPU (microprocessor unit) may be used.

The attribute input circuit 24 receives input attribute information representing the input attribute of the input signal from the user and generates a determination signal based on the input attribute information. The determination signal represents the determination result of the input attribute of the input signal.

The DSP 4 receives the multiple-channel audio signals from the sound source 2 as an input signal and performs the sound image localization control of the multiple-channel audio signals. The DSP 4 includes a transfer function correction circuit 7 and a reflection circuit 8.

The transfer function correction circuit 7 includes FIR filters 9*a* through 9*l*. The transfer function correction circuit 7 performs predetermined processing of multiple-channel audio signals which are output from the DVD-Audio player 2 and outputs output signals representing the processing results to the reflection circuit 8.

The reflection circuit 8 includes delay lines 10*a* through 10*l*. The reflection circuit 8 performs predetermined processing on the output signals from the transfer function correction circuit 7 and outputs output signals representing the processing results.

An adder 11*a* adds a part of the output signals from the reflection circuit 8 and outputs the resultant addition signal to the speaker 5*a* or the headphones 6.

An adder 11*b* adds a part of the output signals from the reflection circuit 8 and outputs the resultant addition signal to the speaker 5*b* or the headphones 6.

Subtractors 12*a* and 12*b* and crosstalk cancel circuits 13*a* and 13*b* have functions described above with reference to FIG. 34.

An amplifier used for reproducing the sound using the speakers 5*a* and 5*b* and the headphones 6 is omitted from FIG. 28.

The functions of the transfer function correction circuit 7, the reflection circuit 8, the adders 11*a* and 11*b*, the subtractors 12*a* and 12*b*, and the crosstalk cancel circuits 13*a* and 13*b* are implemented by a single program or a plurality of programs executed by the DSP 4.

The structure of the DSP 4 shown in FIG. 28 is fundamentally similar to that of the DSP 4 of FIG. 26. Therefore, the sound image localization control will not be described in detail.

The DSP 4 shown in FIG. 28 is different from the DSP 4 shown in FIG. 26 in that the former receives the determination signal representing the determination results of the input attribute of the input signal (for example, the type of the audio codec or the number of channels of the audio signals) from the attribute input circuit 24, instead of the decoder 3 shown in FIG. 26, and alters the type of processing to be performed on the multiple-channel audio signals based on the determination signal. For example, the attribute input circuit 24 performs the optimum sound image localization control for the number of channels of the audio codec.

For example, the audio codec is usually determined for each disk, each index or each tune to be played by the DVD-Audio player 2. The audio codec rarely repeatedly changes within one disk, one index or one tune. In some cases, data is recorded so that one of a plurality of audio codecs, such as Dolby AC-3 or Dolby prologic, can be selected for each disk, each index or each tune, but even in such a case, the user selects one of them for reproduction. Unless the user does not select any mode, the reproduction is done with an initially set mode. Even when the data is recorded in a plurality of modes, the data is reproduced in one of the plurality of modes.

Once the audio codec of the disk to be played by the user is set by the user using the attribute input circuit 24, it is not necessary to change the mode in accordance with the disk, index or tune. Therefore, the attribute input circuit 24 can be realized with a simple configuration. As compared to the attribute input circuit 24, the input determination circuit 23 shown in FIG. 26 has a complicated circuit configuration since the input determination circuit 23 needs to perform, for example, detection of the level of each signal, averaging, and attribute determination. When the DSP 4 is built into the DVD-Audio player 2, the user need only enter the information into the attribute input circuit 24 via the DVD-Audio player 2. Therefore, the attribute input circuit 24 dedicated for the DSP 4 is not necessary.

In the DSP 4 shown in FIG. 28, the transfer function correction circuit 7 and the reflection circuit 8 may be provided in the opposite order. Namely, as shown in FIG. 22, the DSP 4 may have a structure of processing the output signals from the reflection circuit 8 by the transfer function correction circuit 7.

In the third example, the transfer function correction circuit 7 and the reflection circuit 8 are connected in series. The structure of the DSP 4 is not limited to this. As shown in FIG. 23, the DSP 4 may include the transfer function correction circuit 7 and the reflection circuit 8 which are connected in parallel. In this case, the reflection circuit 8 needs to have a structure as shown in FIG. 24.

In the third example, the input determination circuit 23 and the DSP 4 have independent circuit configurations from each other. The present invention is not limited to this. The DSP 4 may include a function of the input determination circuit 23.

In the third example, the DVD player 2 and the DSP 4 have independent circuit configurations from each other. The present invention is not limited to this. The DVD player 2 may include functions of the attribute input circuit 24 and the DSP 4.

In the third example, the DVD-Audio player acts as the sound source 2. The sound source 2 is not limited to the DVD-Audio player. The sound source 2 may be an STB (set top box) for digital broadcasting or, in the future, may be a device for performing electronic data distribution.

The audio codec of the multiple-channel signals is not limited to the AC-3, DTS or Dolby prologic system. Any audio codec, such as MPEG2 or AAC, may be used so long as the system handles multiple-channel signals and the sound image localization control is set so as to provide an optimum mode and an optimum calculation amount for the number of channels.

In the third example, the total calculation amount of the signal processing performed by the DSP 4 is adjusted by the number of taps of each of the FIR filters included in the transfer function correction circuit 7. Alternatively, the total calculation amount may be adjusted by the number (N) of delay devices and the number (N) of the level adjusters included in each of the delay lines in the reflection circuits 8. In other words, the total calculation amount may be adjusted by increasing or decreasing the number of the reflection components.

In the third example, the program is selected or switched so that the calculation amount performed by the DSP 4 is controlled in accordance with the audio codec or the number of channels among various input attributes. The program may be selected or switched so that the calculation amount performed by the DSP 4 is controlled in accordance with the sampling frequency. For example, when the sampling frequency is lowered, the calculation remainder is generated in the calculation time. Therefore, the number of taps or the number of reflection components may be increased so as to enhance the calculation precision. Alternatively, the calculation remainder may be assigned to other types of processing (for example, a reverberation function or a key control function in a "karaoke" device, or equalizer processing for sound quality adjustment).

As described above with reference to FIGS. 37 and 38, the total calculation amount is sufficient as long as it is Cmax·Nx/Nmax or more, or 1/fs or more.

In the third example, sound image localization control is described as an example. The present invention is not limited to this type of signal processing.

According to the present invention, the input signal processing section determines whether the input attribute has been changed or not based on the determination result provided by the input attribute determination section. When a calculation remainder is generated in the input signal processing section by the change in the input attribute, at least a part of the calculation remainder is assigned to processing of the input signal. Thus, the calculation remainder, which is excessive, can be effectively utilized. Therefore, signal processing can constantly be performed using, for example, a maximum possible calculation amount or the vicinity thereof. As a result, when the number of input channels is small or when the sampling frequency is low, the precision or effect of signal processing can be improved.

The above-mentioned effective utilization of the calculation remainder is especially useful for sound image localization control. The calculation remainder allows the number of taps of each of digital filters included in the transfer function correction circuit to be increased, or the number of reflection components provided by the reflection circuit to be increased. Therefore, the effects of sound image localization control, sound quality, and the listener's perception of sound expansion can be enhanced.

Especially when the number of input channels of the audio signals is two (a front L signal and a front R signal), the front L signal and the front R signal are added together and level-adjusted so as to generate a center signal and the center signal is processed with sound image localization control. The listener's perception of the center sound obtained in this manner is superior to the center sound phantom-image-localized using only the front L signal and the front R signal without performing the above-mentioned control.

When the number of input channels of the audio signals is two (a front L signal and a front R signal), the front R signal is subtracted from the front L signal (or the front L signal is subtracted from the front R signal) so as to generate a surround signal and the surround signal is processed with sound image localization control. This improves the listener's perception of the sound expansion in the direction to the rear of the listener as compared to the case when only the front L signal and the front R signal are used without performing the above-mentioned control.

In the case of the 5.1 channel audio signals such as the AC-3 or DTS system, or in the case of 5 channel audio signals, the surround L signal and the surround R signal are added together and level-adjusted so as to generate a surround back signal and the surround back signal is processed with sound image localization. The listener's perception of the rear center sound obtained in this manner is superior to the rear center sound phantom-image-localized using only the surround L signal and the surround R signal without performing the above-mentioned control.

Even when the number of input channels or the audio codec is changed, the program can be initialized so that the influence of disruption which breaks the continuous flow of the audio data before and after the change of the audio codec, such as generation of a pop sound, can be prevented.

In one embodiment of the invention, a signal processing apparatus includes an input determination circuit for determining the number of input channels of the audio signals by detecting the level of each of the plurality of input audio signals, or an attribute input circuit for allowing the user to input the number of input channels or the audio codec of the audio signals. Due to such circuits, the above-described effects are provided when a conventional sound source such as a CD player or a radio tuner is used.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A signal processing apparatus, comprising:

an input attribute determination section for determining an input attribute representing at least one of a type of an audio codec, a sampling frequency and a number of channels of an input signal; and an input signal processing section including a plurality of programs executed by a digital signal processor or a microprocessor unit, for processing the input signal, wherein the input signal processing section determines whether the input attribute has been changed based on a determination result provided by the input attribute determination section and controls a calculation amount of the plurality of programs by switching the plurality of programs in accordance with the determination result provided by the input attribute determination section.

2. A signal processing apparatus according to claim 1, wherein when the input attribute is changed so as to reduce the sampling frequency of the input signal, the input signal processing section selects a program from the plurality of programs, said program assigning at least a part of a calculation remainder generated by the reduction in the sampling frequency to the processing of the input signal and/or to a secondary processing activity directed towards providing an additional function.

3. A signal processing apparatus according to claim 2, wherein the additional function is a reverberation function.

4. A signal processing apparatus according to claim 2, wherein the additional function is a key control.

5. A signal processing apparatus according to claim 2, wherein the additional function is an equalizer control which provides processing for adjustment of a sound characteristic of the input signal.

6. A signal processing apparatus according to claim 1, wherein when the input attribute is changed so as to reduce the number of channels of the input signal, the input signal processing section selects a program from the plurality of programs, said program assigning at least a part of a calculation remainder generated by the reduction in the number of channels to the processing of the input signal and/or to a secondary processing activity directed towards providing an additional function.

7. A signal processing apparatus according to claim 6, wherein the additional function is a reverberation function.

8. A signal processing apparatus according to claim 6, wherein the additional function is a key control.

9. A signal processing apparatus according to claim 6, wherein the additional function is an equalizer control which provides processing for adjustment of a sound characteristic of the input signal.

10. A signal processing apparatus according to claim 1, wherein when the input attribute is changed so as to reduce a calculation amount based on the audio codec of the input signal, the input signal processing section selects a program from the plurality of programs said program assigning at least a part of a calculation remainder generated by the reduction in the calculation amount to the processing of the input signal and/or to a secondary processing activity directed towards providing an additional function.

11. A signal processing apparatus according to claim 10, wherein the additional function is a reverberation function.

12. A signal processing apparatus according to claim 10, wherein the additional function is a key control.

13. A signal processing apparatus according to claim 10, wherein the additional function is an equalizer control which provides for adjustment of a sound characteristic of the input signal.

14. A signal processing apparatus according to claim 1, wherein where a maximum sampling frequency is fs, the input signal processing section controls the processing of the input signal so that a calculation time of the input signal is 1/fs or more regardless of a change in the sampling frequency.

15. A signal processing apparatus according to claim 1, wherein where a maximum number of input channels is Nmax and a total calculation amount of the input signal processing section when the number of input channels is maximum is Cmax the input signal processing section controls the processing of the input signal so that the total calculation amount of the input signal is Cmax·Nx/Nmax or more when the number of input channels is Nx, where Nx is an arbitrary integer in the range of 1 through Nmax.

16. A signal processing apparatus according to claim 1, wherein the input signal processing section controls the processing of the input signal so that a total calculation amount of the input signal processing section is substantially constant regardless of the change in the input attribute.

17. A signal processing apparatus according to claim 1, wherein when the input attribute is changed, the input signal processing section initializes one of the plurality of programs in use.

18. A signal processing apparatus according to claim 1, wherein:

input attribute information representing the input attribute is recorded on a recording medium, and the input attribute determination section determines the input attribute based on the input attribute information recorded on the recording medium.

19. A signal processing apparatus according to claim 1, wherein the input attribute determination section receives an attribute signal which is output from a decoder for generating an audio signal, and determines the input attribute based on the attribute signal.

20. A signal processing apparatus according to claim 1, wherein:

the input attribute determination section includes a decoder for receiving a bit stream signal from a sound source as an input signal and generating an audio signal by decoding the bit stream signal, and the decoder determines the input attribute during decoding of the bit stream signal.

21. A signal processing apparatus according to claim 1, wherein the input attribute determination section includes an input determination circuit for receiving a plurality of audio signals as the input signal and determining the input attribute by detecting a level of each of the plurality of audio signals.

22. A signal processing apparatus according to claim 1, wherein:

the input attribute determination section includes an attribute input circuit for allowing a user to input, to the signal processing apparatus, input attribute information representing the input attribute, and the attribute input circuit determines the input attribute based on the input attribute information.

23. A signal processing apparatus according to claim 1, wherein the input signal processing section includes:

a transfer function correction circuit for mainly reproducing an acoustic characteristic of a direct sound component from a plurality of virtual speakers provided at predetermined positions to each of the ears of the listener, and a reflection circuit for mainly reproducing an acoustic characteristic of a reflection component from the plurality of virtual speakers to each of the ears of the listener.

24. A signal processing apparatus according to claim 23, wherein the input signal processing section adds an output from the transfer function correction circuit and an output from the reflection circuit to generate an addition signal, and inputs the addition signal to two speakers or headphones, to perform sound image localization control so that an acoustic characteristic of a sound reproduced by the two speakers or the headphones is substantially equal to an acoustic characteristic of a sound reproduced by the plurality of virtual speakers.

25. A signal processing apparatus according to claim 23, wherein the input signal processing section inputs an output from the transfer function correction circuit to the reflection circuit an inputs an output from the reflection circuit to two speakers or headphones, to perform sound image localization control so that an acoustic characteristic of a sound reproduced by the two speakers or the headphones is substantially equal to an acoustic characteristic of a sound reproduced by the plurality of virtual speakers.

26. A signal processing apparatus according to claim 23, wherein:

the transfer function correction circuit includes a plurality of digital filters, and the input signal processing section controls the processing of the input signal by adjusting a number of taps of at least one of the plurality of digital filters in accordance with the change in the input attribute.

27. A signal processing apparatus according to claim 23, wherein:

the reflection circuit includes a plurality of delay devices and a plurality of level adjusters which are respectively connected in series to the plurality of delay devices, and the input signal processing section controls the processing of the input signal by adjusting a number of the plurality of delay devices and a number of the plurality of level adjusters in accordance with the change in the input attribute.

28. A signal processing apparatus according to claim 1, wherein the input signal is two channel audio signals including a front L signal and a front R signal, the input signal processing section adds the front L signal and the front R signal and adjusts the level of the resultant signal to generate a center signal, and performs sound image localization control of the center signal.

29. A signal processing apparatus according to claim 1, wherein when the input signal is two channel audio signals including a front L signal and a front R signal, the input signal processing section obtains a difference between the front L signal and the front R signal to generate a surround signal, and performs sound image localization control of the surround signal.

30. A signal processing apparatus according to claim 1, wherein when the input signal is 5.1-channel or 5-channel audio signals including a surround L signal and a surround R signal, the input signal processing section adds the surround L signal and the surround R signal and adjusts the level of the resultant signal to generate a surround back signal, and performs sound image localization control of the surround back signal.

* * * * *